(12) United States Patent
Masui et al.

(10) Patent No.: US 7,433,584 B2
(45) Date of Patent: Oct. 7, 2008

(54) VARIABLE-MAGNIFICATION OPTICAL SYSTEM AND IMAGE-TAKING APPARATUS THEREWITH

(75) Inventors: Atsuo Masui, Sakai (JP); Hiroyuki Matsumoto, Wakayama (JP); Yasushi Yamamoto, Kishiwada (JP)

(73) Assignee: Konica Minota Photo Imaging, Inc., Tokyo (JP)

( * ) Notice: Subject to any disclaimer, the term of this patent is extended or adjusted under 35 U.S.C. 154(b) by 547 days.

(21) Appl. No.: 11/238,334

(22) Filed: Sep. 29, 2005

(65) Prior Publication Data

US 2006/0285841 A1    Dec. 21, 2006

(30) Foreign Application Priority Data

Jun. 17, 2005    (JP) .............................. 2005-177288

(51) Int. Cl.
*G03B 17/00*    (2006.01)
*G02B 9/14*    (2006.01)
*G02B 15/14*    (2006.01)

(52) U.S. Cl. ...................... 396/72; 348/240.3; 359/678; 359/683; 359/689

(58) Field of Classification Search ................... 396/72, 396/77, 79; 359/678, 683, 687, 689–690, 359/676, 694–695; 348/240.3
See application file for complete search history.

(56) References Cited

U.S. PATENT DOCUMENTS

| | | | |
|---|---|---|---|
| 6,771,432 B2 * | 8/2004 | Mihara | 359/687 |
| 7,075,732 B2 * | 7/2006 | Watanabe et al. | 359/689 |
| 2006/0274426 A1 * | 12/2006 | Sueyoshi | 359/676 |

FOREIGN PATENT DOCUMENTS

| | | |
|---|---|---|
| JP | 8-248318 A | 9/1996 |
| JP | 9-146000 A | 6/1997 |

* cited by examiner

*Primary Examiner*—Bot LeDynh
(74) *Attorney, Agent, or Firm*—Sidley Austin LLP

(57) ABSTRACT

A variable-magnification optical system has, from the object side to the image side, at least a first lens group having a positive optical power, a second lens group having a negative optical power, and a third lens group having a positive optical power. The first lens group includes an optical prism that changes the optical path, and a prescribed conditional formula is fulfilled.

21 Claims, 24 Drawing Sheets

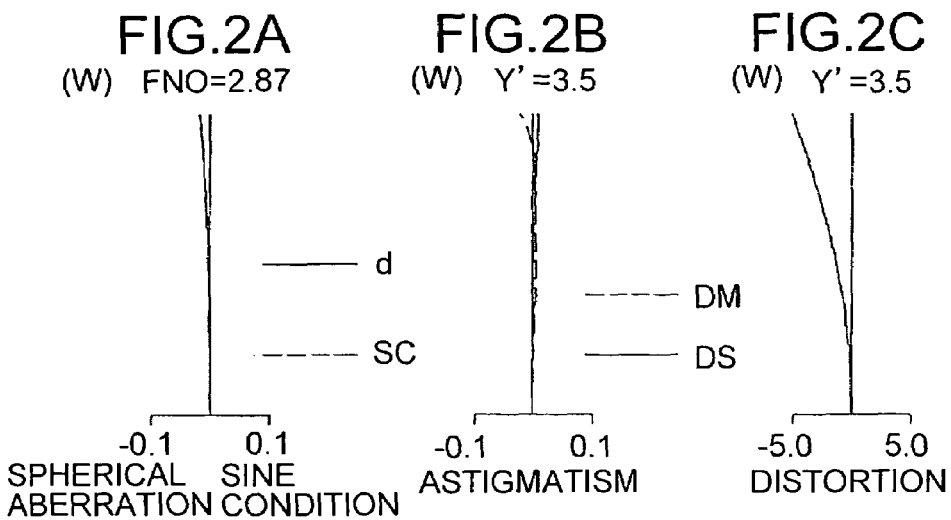
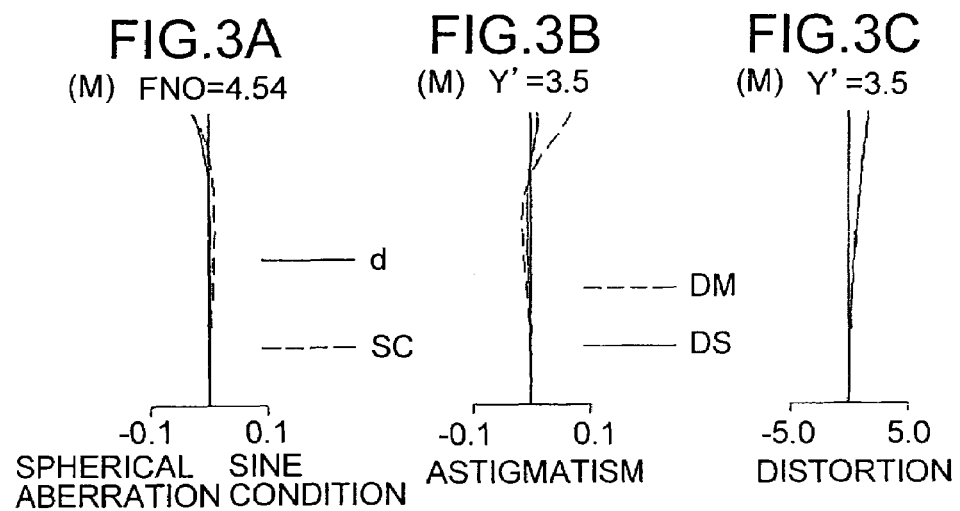
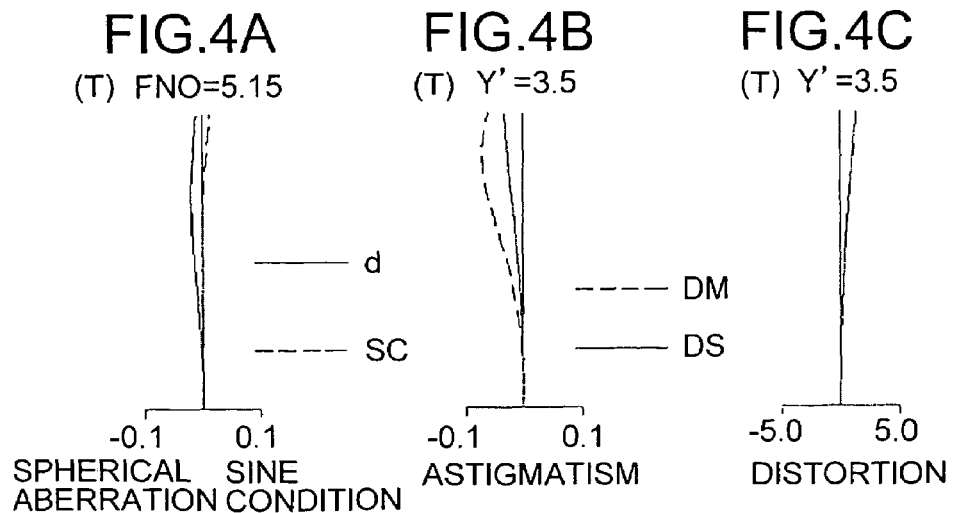

(W) FNO=2.74

-0.1  0.1
SPHERICAL SINE
ABERRATION CONDITION
— d
--- SC (W) Y'=3.5

-0.1  0.1
ASTIGMATISM
--- DM
— DS (W) Y'=3.5

-5.0  5.0
DISTORTION (M) FNO=4.30

-0.1  0.1
SPHERICAL SINE
ABERRATION CONDITION
— d
--- SC (M) Y'=3.5

-0.1  0.1
ASTIGMATISM
--- DM
— DS (M) Y'=3.5

-5.0  5.0
DISTORTION (T) FNO=5.24

-0.1  0.1
SPHERICAL SINE
ABERRATION CONDITION
— d
--- SC (T) Y'=3.5

-0.1  0.1
ASTIGMATISM
--- DM
— DS (T) Y'=3.5

-5.0  5.0
DISTORTION

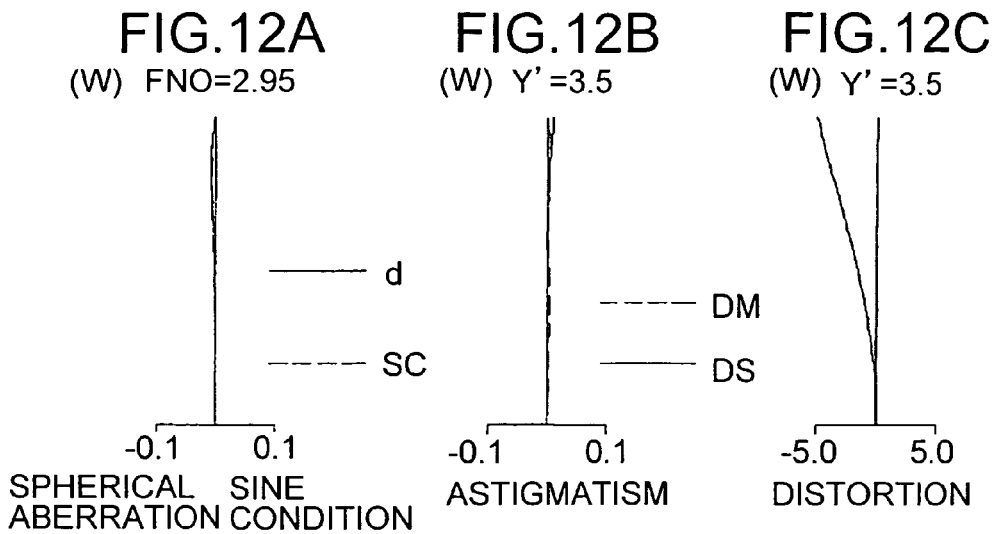
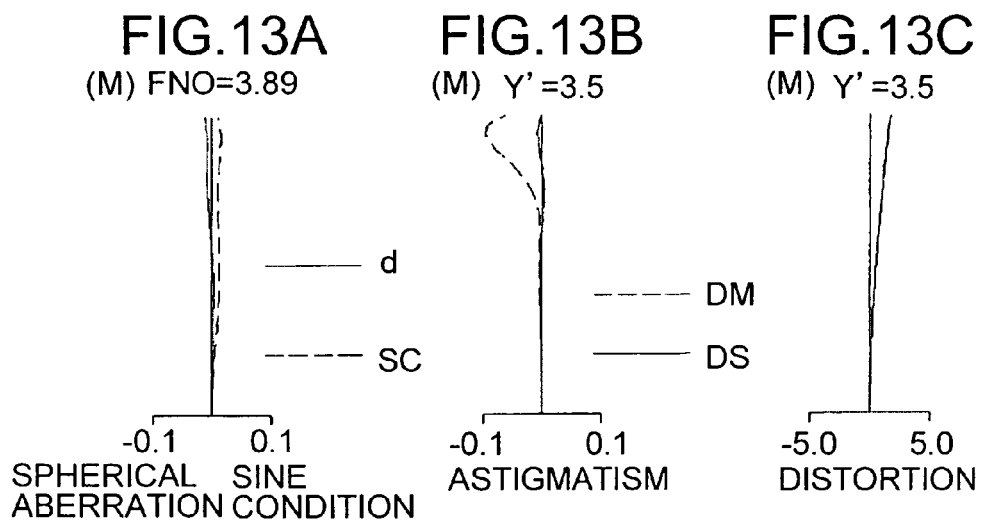
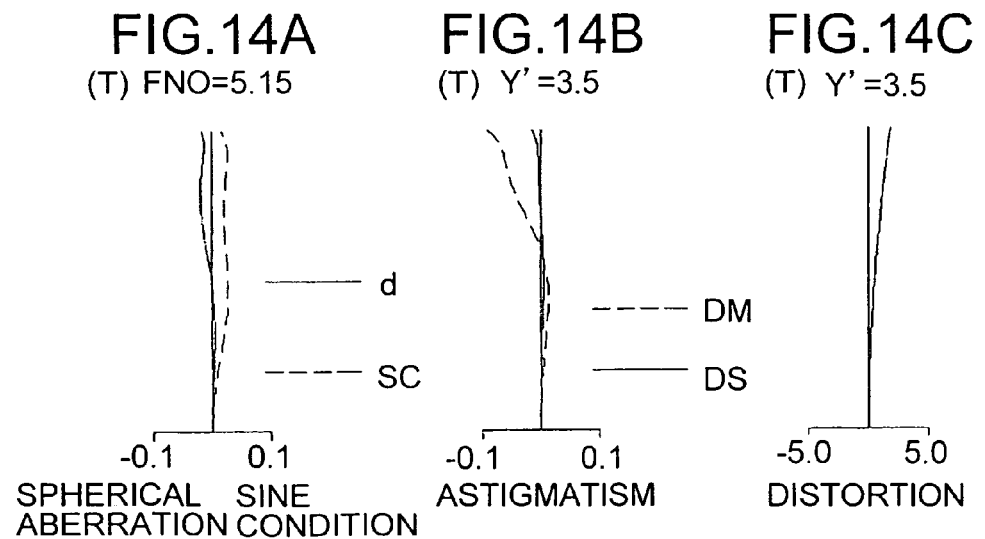

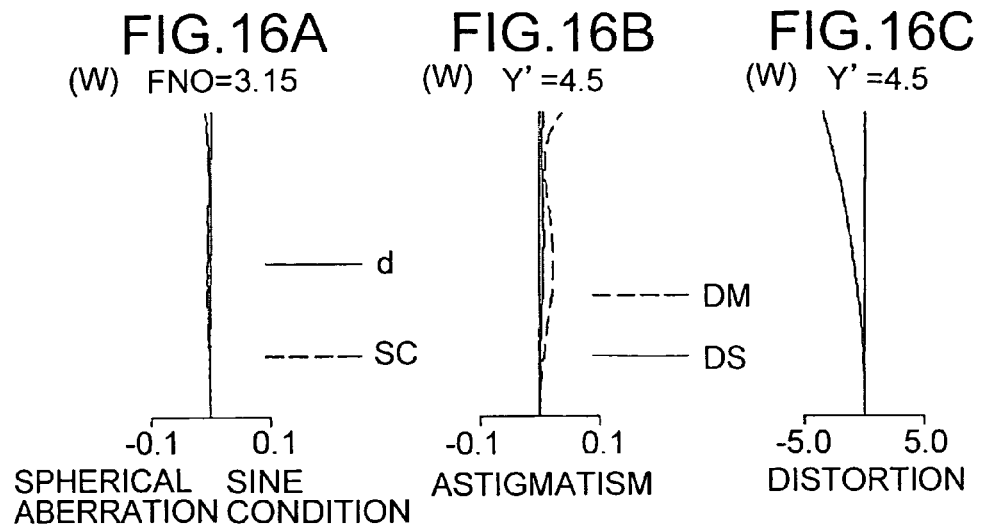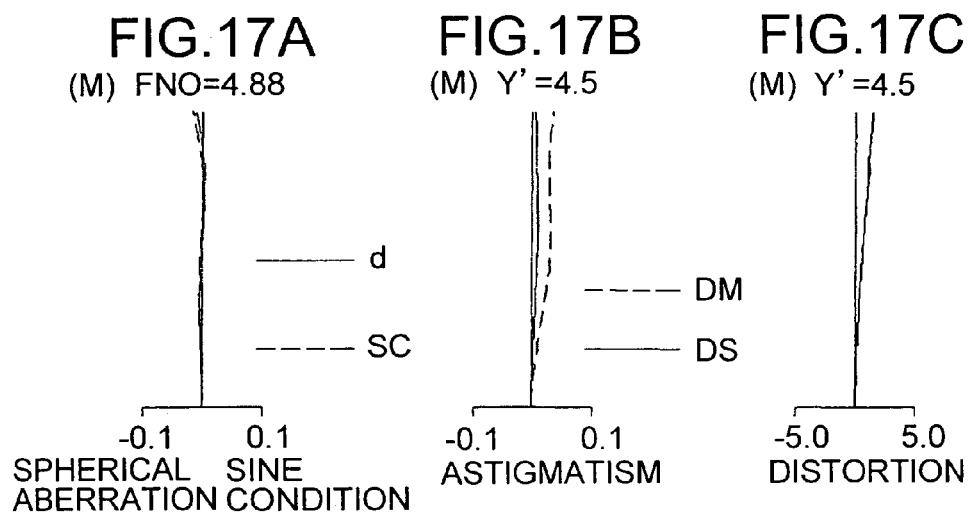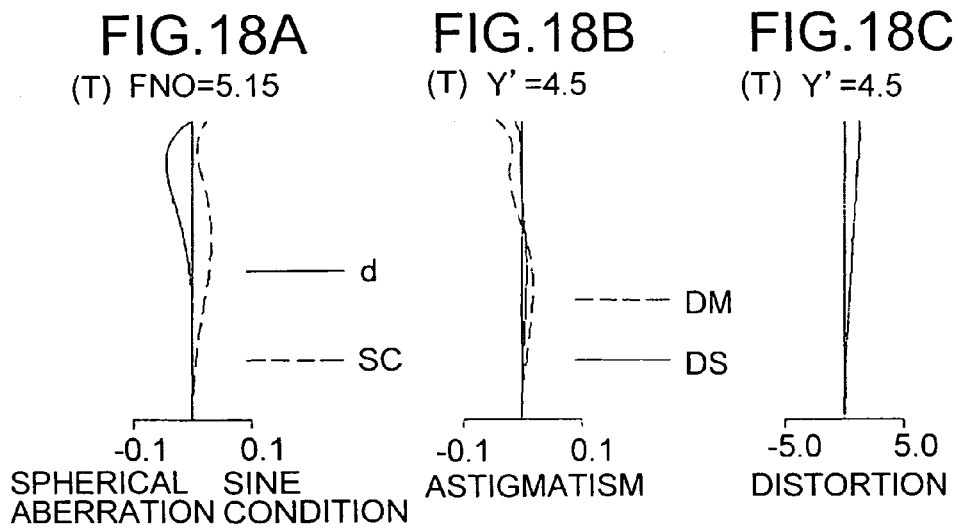

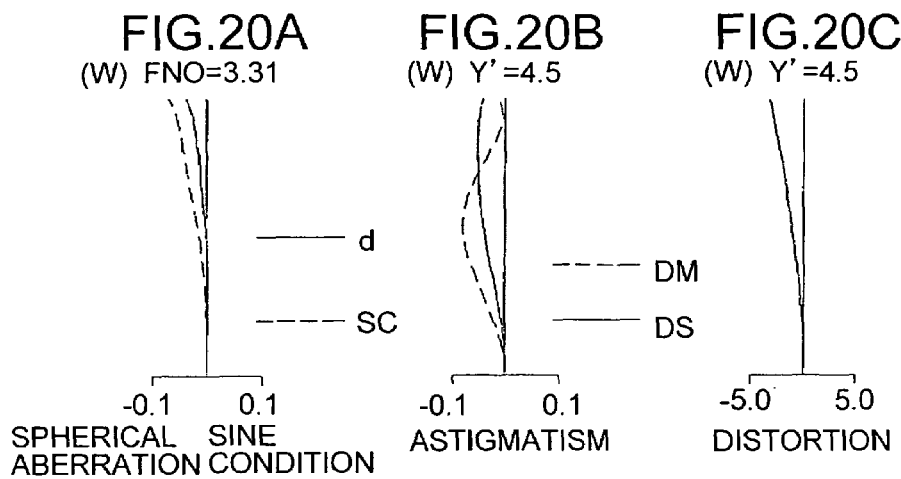
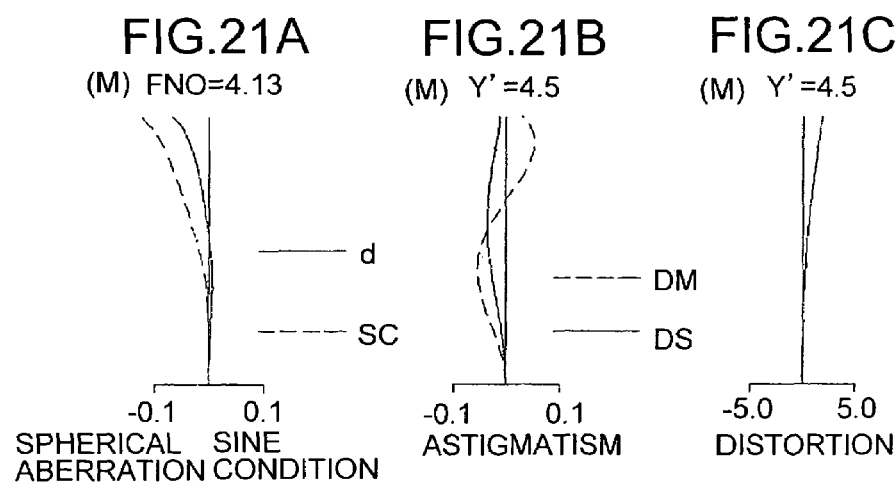
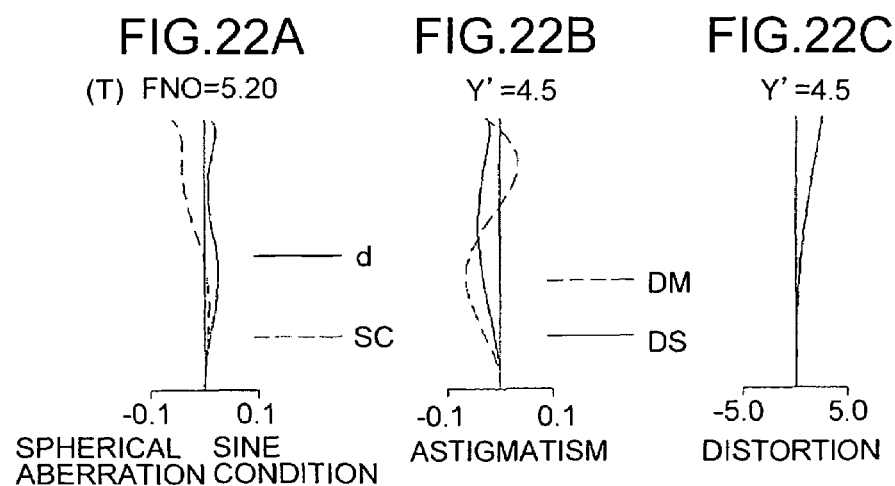

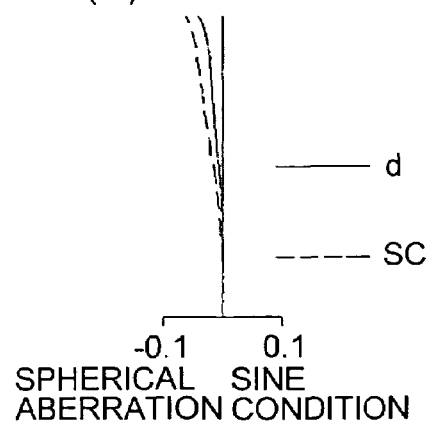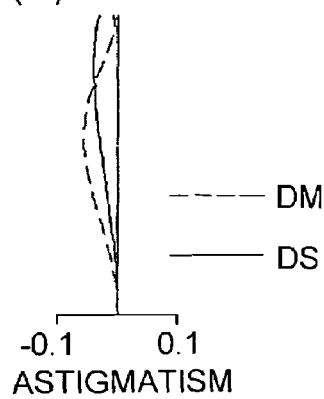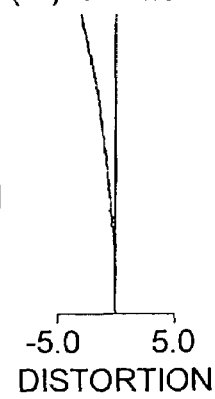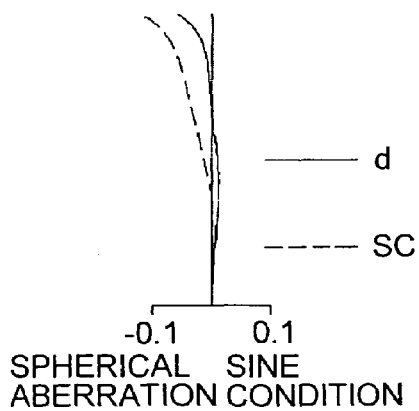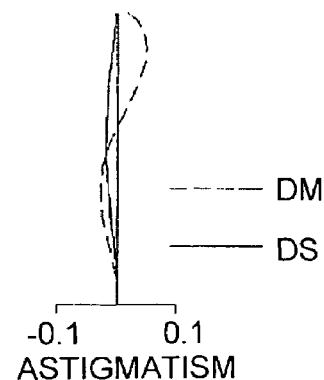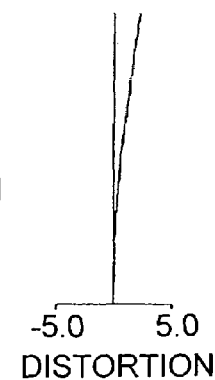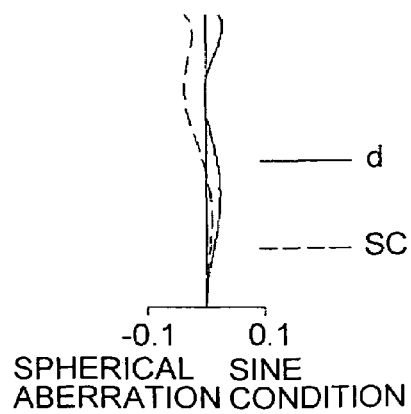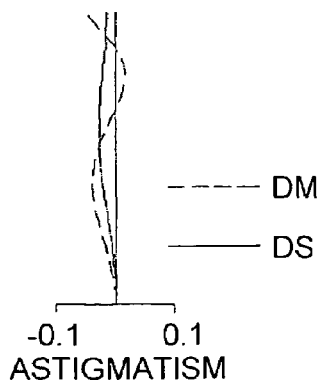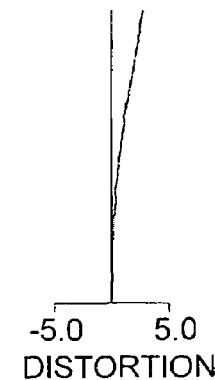

(W) FNO=3.35

SPHERICAL ABERRATION SINE CONDITION (W) Y'=4.5

ASTIGMATISM (W) Y'=4.5

DISTORTION (M) FNO=4.42

SPHERICAL ABERRATION SINE CONDITION (M) Y'=4.5

ASTIGMATISM (M) Y'=4.5

DISTORTION (T) FNO=5.93

SPHERICAL ABERRATION SINE CONDITION (T) Y'=4.5

ASTIGMATISM (T) Y'=4.5

DISTORTION (W) FNO=3.19

—— d
---- SC

-0.1  0.1
SPHERICAL SINE
ABERRATION CONDITION (W) Y'=4.5

---- DM
—— DS

-0.1  0.1
ASTIGMATISM (W) Y'=4.5

-5.0  5.0
DISTORTION (M) FNO=4.69

—— d
---- SC

-0.1  0.1
SPHERICAL SINE
ABERRATION CONDITION (M) Y'=4.5

---- DM
—— DS

-0.1  0.1
ASTIGMATISM (M) Y'=4.5

-5.0  5.0
DISTORTION (T) FNO=5.78

—— d
---- SC

-0.1  0.1
SPHERICAL SINE
ABERRATION CONDITION (T) Y'=4.5

---- DM
—— DS

-0.1  0.1
ASTIGMATISM (T) Y'=4.5

-5.0  5.0
DISTORTION

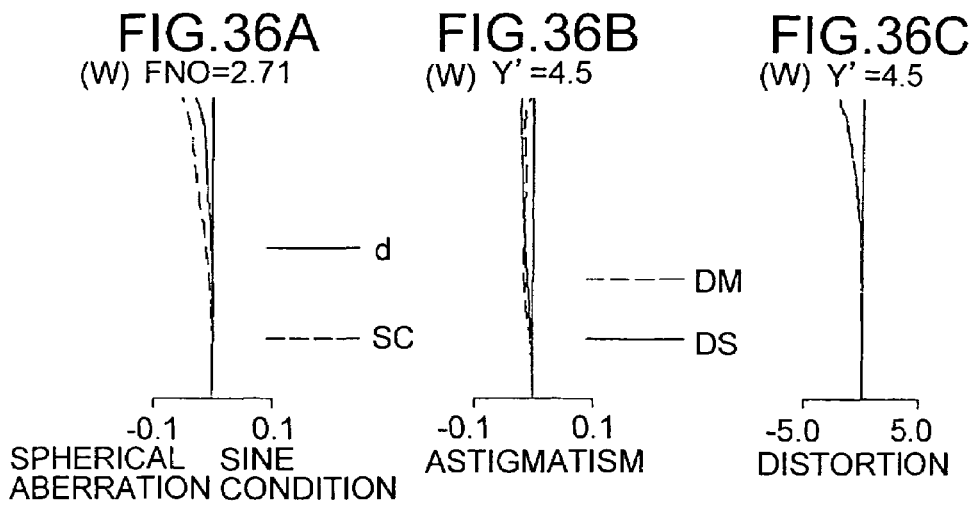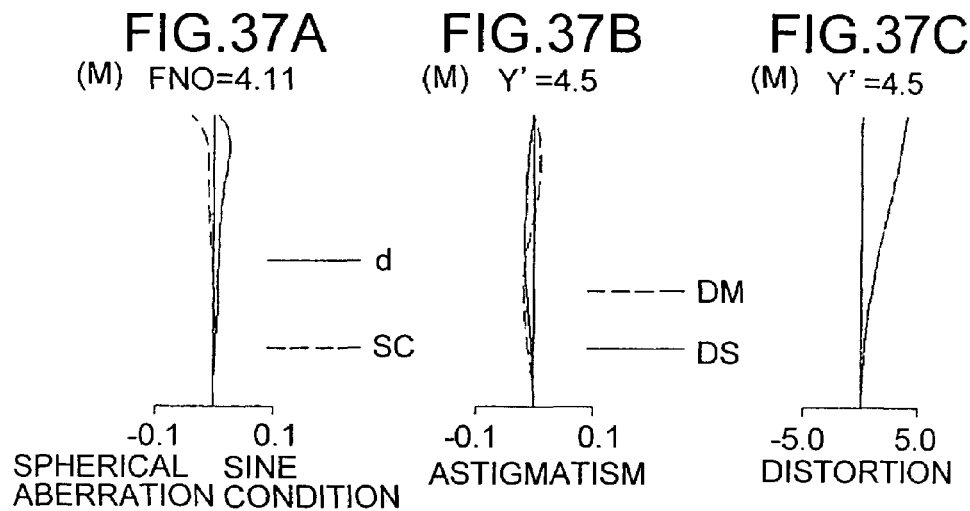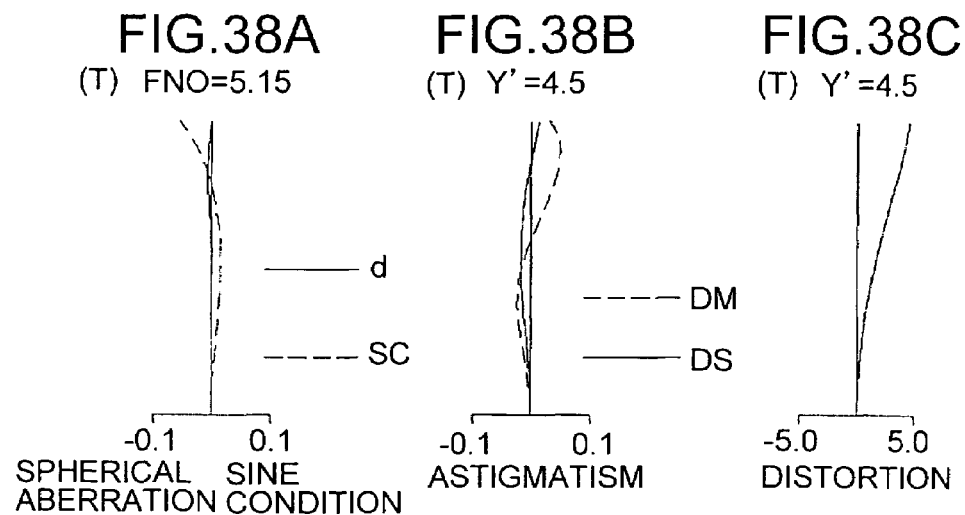

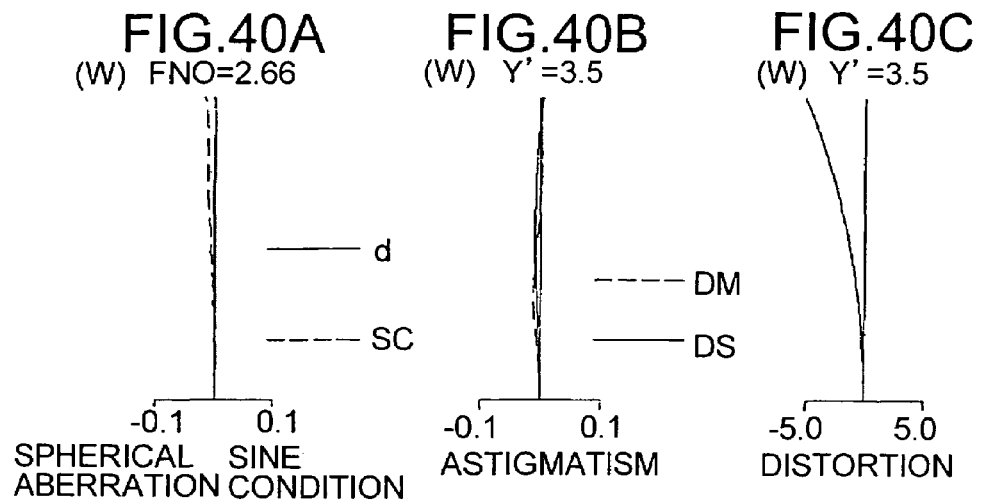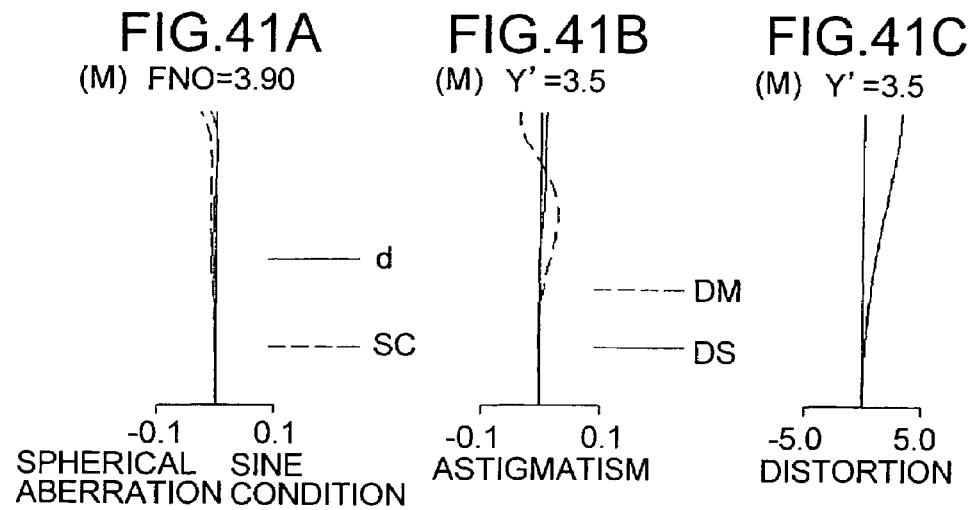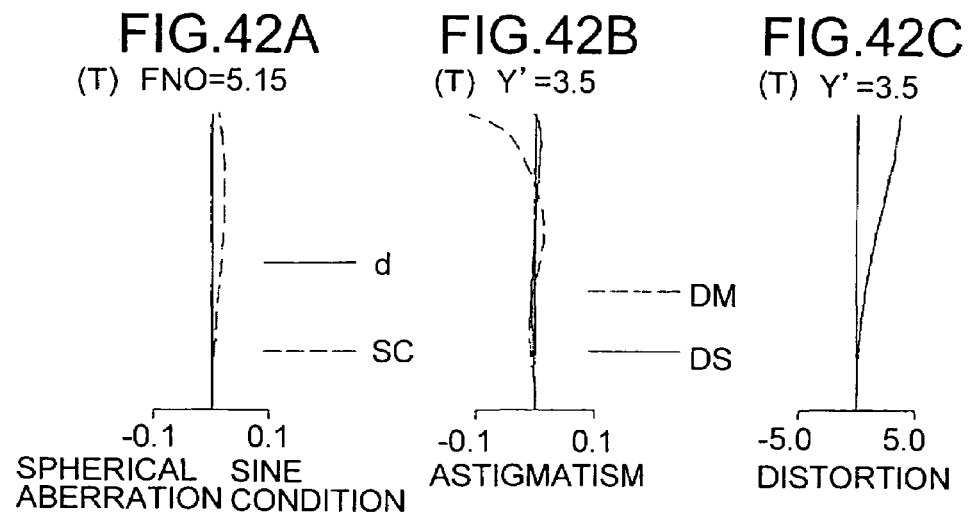

(W) FNO=3.77

SPHERICAL SINE
ABERRATION CONDITION (W) Y'=4.5

ASTIGMATISM (W) Y'=4.5

DISTORTION (M) FNO=5.09

SPHERICAL SINE
ABERRATION CONDITION (M) Y'=4.5

ASTIGMATISM (M) Y'=4.5

DISTORTION (T) FNO=5.20

SPHERICAL SINE
ABERRATION CONDITION (T) Y'=4.5

ASTIGMATISM (T) Y'=4.5

DISTORTION

VARIABLE-MAGNIFICATION OPTICAL SYSTEM AND IMAGE-TAKING APPARATUS THEREWITH

This application claims foreign priority is based on Japanese Patent Application No. 2005-177288 filed on Jun. 17, 2005, the contents of which are hereby incorporated by reference.

BACKGROUND OF THE INVENTION

1. Field of the Invention

The present invention relates to a variable-magnification optical system for use in a lens unit or the like, and to an image-taking apparatus incorporating such a variable-magnification optical system.

2. Description of Related Art

With the recent spread of personal computers (PCs), there has been increasing popularity in digital cameras (image-taking apparatuses), which permit easy capturing of images. In such digital cameras, as in cameras using silver-halide film (silver-halide film cameras), compactness (slimness) and high-performance (for example, high zooming and aberration-correcting capabilities) are eagerly sought for.

To meet these requirements, there have been developed image-taking apparatuses (video cameras and the like) that incorporate a variable-magnification optical system (zoom lens system) that includes a rectangular prism in the lens group (first lens group) closest to the object side. Examples of such image-taking apparatuses are disclosed in, to name a few, Japanese Patent Application Laid-open No. H8-248318, laid-open on Sep. 27, 1996 (hereinafter Patent Publication 1) and Japanese Patent Application Laid-open No. H9-146000, laid-open on Jun. 6, 1997 (hereinafter Patent Publication 2).

In these image-taking apparatuses, the rectangular prism bends the optical axis, and thereby serves to reduce the length of the first lens group, and thus the total length of the zoom lens system. This permits a zoom lens system with a so reduced total length to be arranged within the limited space inside the housing of an image-taking apparatus, and accordingly helps make the housing, and thus the image-taking apparatus itself, compact and slim.

The image-taking apparatuses of Patent Publications 1 and 2, however, have the following disadvantages. These image-taking apparatuses incorporate a variable-magnification optical system composed of a plurality of lens groups arranged in a positive-negative-positive-positive optical power arrangement. Thus, to achieve magnification variation (zooming), for example, the second lens group needs to be moved through a comparatively long distance.

Here, the distance through which the second lens group needs to be moved may make the variable-magnification optical system (zoom lens system) unduly long (make its total length unduly large). As a result, the image-taking apparatuses of Patent Publications 1 and 2 cannot be said to be made satisfactorily compact or otherwise favorably constructed.

SUMMARY OF THE INVENTION

In view of the conventionally encountered disadvantages discussed above, it is an object of the present invention to provide a variable-magnification optical system or the like in which, through appropriate setting of the optical powers (refractive powers) of a first to a third lens group (in particular, a second lens group), a proper balance is achieved among the movement distances of the individual lens groups for zooming and thereby the total length of the variable-magnification optical system is successfully reduced.

To achieve the above object, according to the present invention, a variable-magnification optical system is provided with a plurality of lens groups through which light from an object is imaged on an image sensor. Here, the plurality of lens groups include, from the object side to the image side, at least a first lens group having a positive optical power, a second lens group having a negative optical power, and a third lens group having a positive optical power. Moreover, the first lens group includes a first optical axis changing element that changes the optical axis.

In this variable-magnification optical system according to the present invention, it is preferable that conditional formula (1) below be fulfilled:

$$0.1 < |f2/\sqrt{fw \times ft}| < 0.45 \qquad (1)$$

where
- f2 represents the focal length of the second lens group;
- fw represents the focal length of the entire variable-magnification optical system at the wide-angle end; and
- ft represents the focal length of the entire variable-magnification optical system at the telephoto end.

Alternatively, in the variable-magnification optical system according to the present invention, it is preferable that conditional formula (2) below be fulfilled:

$$0.5 < f1/\sqrt{fw \times ft} < 1.4 \qquad (2)$$

where
- f1 represents the focal length of the first lens group;
- fw represents the focal length of the entire variable-magnification optical system at the wide-angle end; and
- ft represents the focal length of the entire variable-magnification optical system at the telephoto end.

Alternatively, in the variable-magnification optical system according to the present invention, it is preferable that conditional formula (3) below be fulfilled:

$$0.3 < f3/\sqrt{fw \times ft} < 1.0 \qquad (3)$$

where
- f3 represents the focal length of the third lens group;
- fw represents the focal length of the entire variable-magnification optical system at the wide-angle end; and
- ft represents the focal length of the entire variable-magnification optical system at the telephoto end.

Conditional formula (1), (2), or (3) relates to the optical power of a particular lens group. Moreover, conditional formula (1), (2), or (3) defines, based on the optical power of the particular lens group, a conditional range that should preferably be fulfilled to achieve a proper balance between reduction of the total length of the variable-magnification optical system (with a view to making it compact) and reduction of various aberrations.

By observing the upper limit of conditional formula (1), (2), or (3), it is possible to prevent the variable-magnification optical system from becoming unduly long (to prevent its total length from becoming unduly large). On the other hand, by observing the lower limit of conditional formula (1), (2), or (3), it is possible to prevent the various aberrations attributable to the optical powers of the individual lens groups from becoming extremely large (to prevent degradation of optical performance). Thus, according to the present invention, within the range defined by conditional formula (1), (2), or (3), it is possible to realize a variable-magnification optical system that is compact but nevertheless offers good optical performance.

The above and other objects and features of the present invention will be clear in light of the detailed description of preferred embodiments below with reference to the accompanying drawings.

BRIEF DESCRIPTION OF THE DRAWINGS

FIG. 2A is a spherical aberration diagram of the variable-magnification optical system of Example 1 at the wide-angle end (W);

FIG. 2B is a astigmatism diagram of the variable-magnification optical system of Example 1 at the wide-angle end (W);

FIG. 2C is a distortion diagram of the variable-magnification optical system of Example 1 at the wide-angle end (W);

FIG. 3A is a spherical aberration diagram of the variable-magnification optical system of Example 1 at the middle-focal-length position (M);

FIG. 3B is a astigmatism diagram of the variable-magnification optical system of Example 1 at the middle-focal-length position (M);

FIG. 3C is a distortion diagram of the variable-magnification optical system of Example 1 at the middle-focal-length position (M);

FIG. 4A is a spherical aberration diagram of the variable-magnification optical system of Example 1 at the telephoto end (T);

FIG. 4B is a astigmatism diagram of the variable-magnification optical system of Example 1 at the telephoto end (T);

FIG. 4C is a distortion diagram of the variable-magnification optical system of Example 1 at the telephoto end (T);

FIG. 12A is a spherical aberration diagram of the variable-magnification optical system of Example 3 at the wide-angle end (W);

FIG. 12B is a astigmatism diagram of the variable-magnification optical system of Example 3 at the wide-angle end (W);

FIG. 12C is a distortion diagram of the variable-magnification optical system of Example 3 at the wide-angle end (W);

FIG. 13A is a spherical aberration diagram of the variable-magnification optical system of Example 3 at the middle-focal-length position (M);

FIG. 13B is a astigmatism diagram of the variable-magnification optical system of Example 3 at the middle-focal-length position (M);

FIG. 13C is a distortion diagram of the variable-magnification optical system of Example 3 at the middle-focal-length position (M);

FIG. 14A is a spherical aberration diagram of the variable-magnification optical system of Example 3 at the telephoto end (T);

FIG. 14B is a astigmatism diagram of the variable-magnification optical system of Example 3 at the telephoto end (T);

FIG. 14C is a distortion diagram of the variable-magnification optical system of Example 3 at the telephoto end (T);

FIG. 16A is a spherical aberration diagram of the variable-magnification optical system of Example 4 at the wide-angle end (W);

FIG. 16B is a astigmatism diagram of the variable-magnification optical system of Example 4 at the wide-angle end (W);

FIG. 16C is a distortion diagram of the variable-magnification optical system of Example 4 at the wide-angle end (W);

FIG. 17A is a spherical aberration diagram of the variable-magnification optical system of Example 4 at the middle-focal-length position (M);

FIG. 17B is a astigmatism diagram of the variable-magnification optical system of Example 4 at the middle-focal-length position (M);

FIG. 17C is a distortion diagram of the variable-magnification optical system of Example 4 at the middle-focal-length position (M);

FIG. 18A is a spherical aberration diagram of the variable-magnification optical system of Example 4 at the telephoto end (T);

FIG. 18B is a astigmatism diagram of the variable-magnification optical system of Example 4 at the telephoto end (T);

FIG. 18C is a distortion diagram of the variable-magnification optical system of Example 4 at the telephoto end (T);

FIG. 20A is a spherical aberration diagram of the variable-magnification optical system of Example 5 at the wide-angle end (W);

FIG. 20B is a astigmatism diagram of the variable-magnification optical system of Example 5 at the wide-angle end (W);

FIG. 20C is a distortion diagram of the variable-magnification optical system of Example 5 at the wide-angle end (W);

FIG. 21A is a spherical aberration diagram of the variable-magnification optical system of Example 5 at the middle-focal-length position (M);

FIG. 21B is a astigmatism diagram of the variable-magnification optical system of Example 5 at the middle-focal-length position (M);

FIG. 21C is a distortion diagram of the variable-magnification optical system of Example 5 at the middle-focal-length position (M);

FIG. 22A is a spherical aberration diagram of the variable-magnification optical system of Example 5 at the telephoto end (T);

FIG. 22B is a astigmatism diagram of the variable-magnification optical system of Example 5 at the telephoto end (T);

FIG. 22C is a distortion diagram of the variable-magnification optical system of Example 5 at the telephoto end (T);

FIG. 24A is a spherical aberration diagram of the variable-magnification optical system of Example 6 at the wide-angle end (W);

FIG. 24B is a astigmatism diagram of the variable-magnification optical system of Example 6 at the wide-angle end (W);

FIG. 24C is a distortion diagram of the variable-magnification optical system of Example 6 at the wide-angle end (W);

FIG. 25A is a spherical aberration diagram of the variable-magnification optical system of Example 6 at the middle-focal-length position (M);

FIG. 25B is a astigmatism diagram of the variable-magnification optical system of Example 6 at the middle-focal-length position (M);

FIG. 25C is a distortion diagram of the variable-magnification optical system of Example 6 at the middle-focal-length position (M);

FIG. 26A is a spherical aberration diagram of the variable-magnification optical system of Example 6 at the telephoto end (T);

FIG. 26B is a astigmatism diagram of the variable-magnification optical system of Example 6 at the telephoto end (T);

FIG. 26C is a distortion diagram of the variable-magnification optical system of Example 6 at the telephoto end (T);

FIG. 36A is a spherical aberration diagram of the variable-magnification optical system of Example 9 at the wide-angle end (W);

FIG. 36B is a astigmatism diagram of the variable-magnification optical system of Example 9 at the wide-angle end (W);

FIG. 36C is a distortion diagram of the variable-magnification optical system of Example 9 at the wide-angle end (W);

FIG. 37A is a spherical aberration diagram of the variable-magnification optical system of Example 9 at the middle-focal-length position (M);

FIG. 37B is a astigmatism diagram of the variable-magnification optical system of Example 9 at the middle-focal-length position (M);

FIG. 37C is a distortion diagram of the variable-magnification optical system of Example 9 at the middle-focal-length position (M);

FIG. 38A is a spherical aberration diagram of the variable-magnification optical system of Example 9 at the telephoto end (T);

FIG. 38B is a astigmatism diagram of the variable-magnification optical system of Example 9 at the telephoto end (T);

FIG. 38C is a distortion diagram of the variable-magnification optical system of Example 9 at the telephoto end (T);

FIG. 40A is a spherical aberration diagram of the variable-magnification optical system of Example 10 at the wide-angle end (W);

FIG. 40B is a astigmatism diagram of the variable-magnification optical system of Example 10 at the wide-angle end (W);

FIG. 40C is a distortion diagram of the variable-magnification optical system of Example 10 at the wide-angle end (W);

FIG. 41A is a spherical aberration diagram of the variable-magnification optical system of Example 10 at the middle-focal-length position (M);

FIG. 41B is a astigmatism diagram of the variable-magnification optical system of Example 10 at the middle-focal-length position (M);

FIG. 41C is a distortion diagram of the variable-magnification optical system of Example 10 at the middle-focal-length position (M);

FIG. 42A is a spherical aberration diagram of the variable-magnification optical system of Example 10 at the telephoto end (T);

FIG. 42B is a astigmatism diagram of the variable-magnification optical system of Example 10 at the telephoto end (T);

FIG. 42C is a distortion diagram of the variable-magnification optical system of Example 10 at the telephoto end (T);

DETAILED DESCRIPTION OF PREFERRED EMBODIMENTS

Embodiment 1

An embodiment (Embodiment 1) of the present invention will be described below with reference to the drawings.

1. Digital Camera

Figure 5:
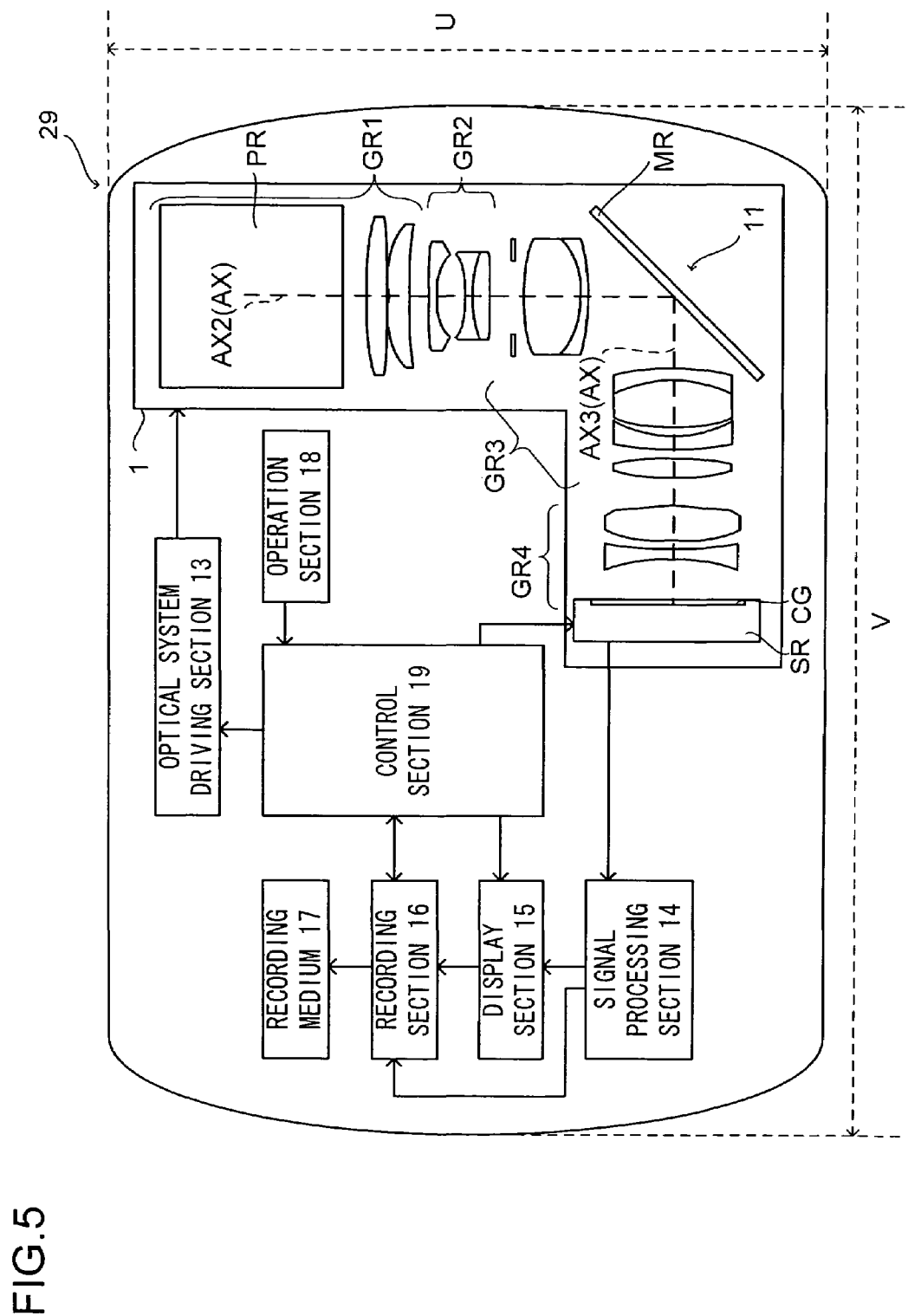
FIG. 5 is a diagram schematically showing the construction, as seen from the back, of a digital camera embodying the invention.
Figure 6:
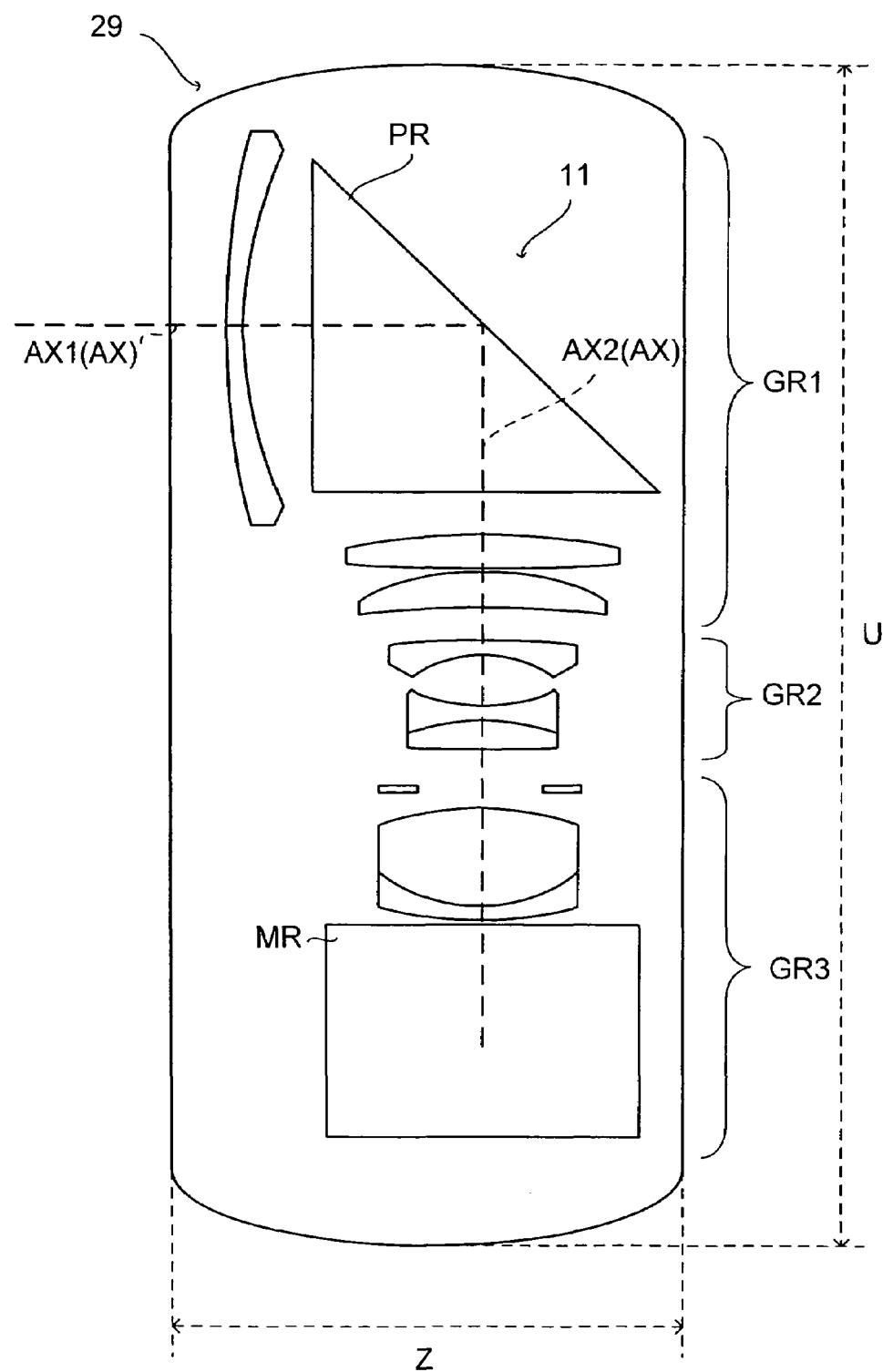
FIG. 6 is a diagram schematically showing the construction, as seen from a side, of a digital camera embodying the invention.

FIGS. 5 and 6 are diagrams schematically showing the construction of a digital camera 29, as an example of an image-taking apparatus embodying the invention. FIG. 5 shows the interconnection among individual internal blocks, and also shows a lens unit 1 (including a variable-magnification optical system 11 and an image sensor SR) incorporated in the digital camera 29. On the other hand, FIG. 6 is a side view of the digital camera 29, and shows, in particular, the variable-magnification optical system 11 included in the lens unit 1.

As shown in FIG. 5, the digital camera 29 includes a variable-magnification optical system 11, an optical system driving section 13, an image sensor SR, a signal processing section 14, a display section 15, a recording section 16, a recording medium 17, an operation section 18, and a control section 19.

The variable-magnification optical system 11 directs the light from the shooting target to the image sensor SR in such a way that the light is imaged on the light-receiving surface (image-sensing surface) of the image sensor SR. Hence, the variable-magnification optical system 11 may be called an image-forming or image-taking optical system. The variable-magnification optical system 11 will be described in detail later.

The optical system driving section 13 includes several driving motors (optical system driving motors) and transmission mechanisms (optical system transmission mechanisms) for transmitting the driving force of the motors to the lens groups constituting the variable-magnification optical system 11 (the driving motors and transmission mechanisms are not illustrated). By using these driving motors and transmission mechanisms, the optical system driving section 13 sets the focal length or focal position of the variable-magnification optical system 11. Specifically, the optical system driving section 13 sets the focal length or focal position according to instructions from the control section 19.

The image sensor SR is, for example, a CCD (charge-coupled device) area sensor or a CMOS (complementary metal oxide semiconductor) sensor. The image sensor SR receives the light that has passed through the variable-magnification optical system 11, and converts it into an electrical signal (sensed data). The image sensor SR then feeds the sensed data to the signal processing section 14.

The signal processing section 14 processes the electronic data (sensed data) from the image sensor SR, and produces, based on the sensed data, sensed-image data. The signal processing section 14 starts and stops its processing according to instructions from the control section 19. Moreover, according to instructions from the control section 19, the signal processing section 14 feeds the sensed-image data to the display section 15 and to the recording section 16.

The display section 15 is built with, for example, a liquid crystal display panel. The display section 15 displays the sensed-image data from the signal processing section 14, the status of use of the digital camera 29, and other indications and information.

The recording section 16 records the sensed-image data produced by the signal processing section 14 to the recording medium 17 according to instructions from the control section 19. Moreover, according to instructions from the control section 19 based on how the operation section 18 and other parts are operated, the recording section 16 reads sensed-image data from the recording medium 17.

The recording medium 17 may be, for example, of the type that is unremovably built in the digital camera 29 or, like a flash memory, of the type that is removably loaded in the digital camera 29. The only requirement about the recording medium 17 is that it be a medium (such as an optical disk or semiconductor memory) that permits sensed-image data and other data to be recorded thereto.

The operation section 18 accepts various kinds of operation and instructions from the user or the like, and then feeds them to the control section 19. The operation section 18 includes, for example, a shutter release button and an operation dial.

The control section 19 functions as a control center that controls, among others, the operation of the digital camera 29 as a whole. Thus, the control section 19 centrally controls the operation of the digital camera 29 by controlling the driving of the individual members thereof in an organized manner.

2. Lens Unit

Now, the lens unit 1, which includes the variable-magnification optical system 11 and the image sensor SR, will be described with reference to FIGS. 1, 5 and 6. The example of the lens unit 1 shown in FIGS. 5 and 6 is housed inside the digital camera 29. The lens unit 1 is so designed as to bend the light beam that passes therethrough by the use of an optical prism PR or a reflective mirror MR.

The lens unit 1, however, does not necessarily have to be a lens system (bending optical system) that bends the light beam as described above (that is, the optical prism PR and the reflective mirror MR shown in FIGS. 5 and 6 may be omitted). In fact, for the sake of convenience, the reflective mirror MR is omitted in FIG. 1 (lens construction diagram), which shows, in a straightened form, the lens unit 1 shown in FIGS. 5 and 6. The optical axis of the lens unit 1 is represented by AX (AX1 to AX3, see FIGS. 5 and 6).

Figure 1:
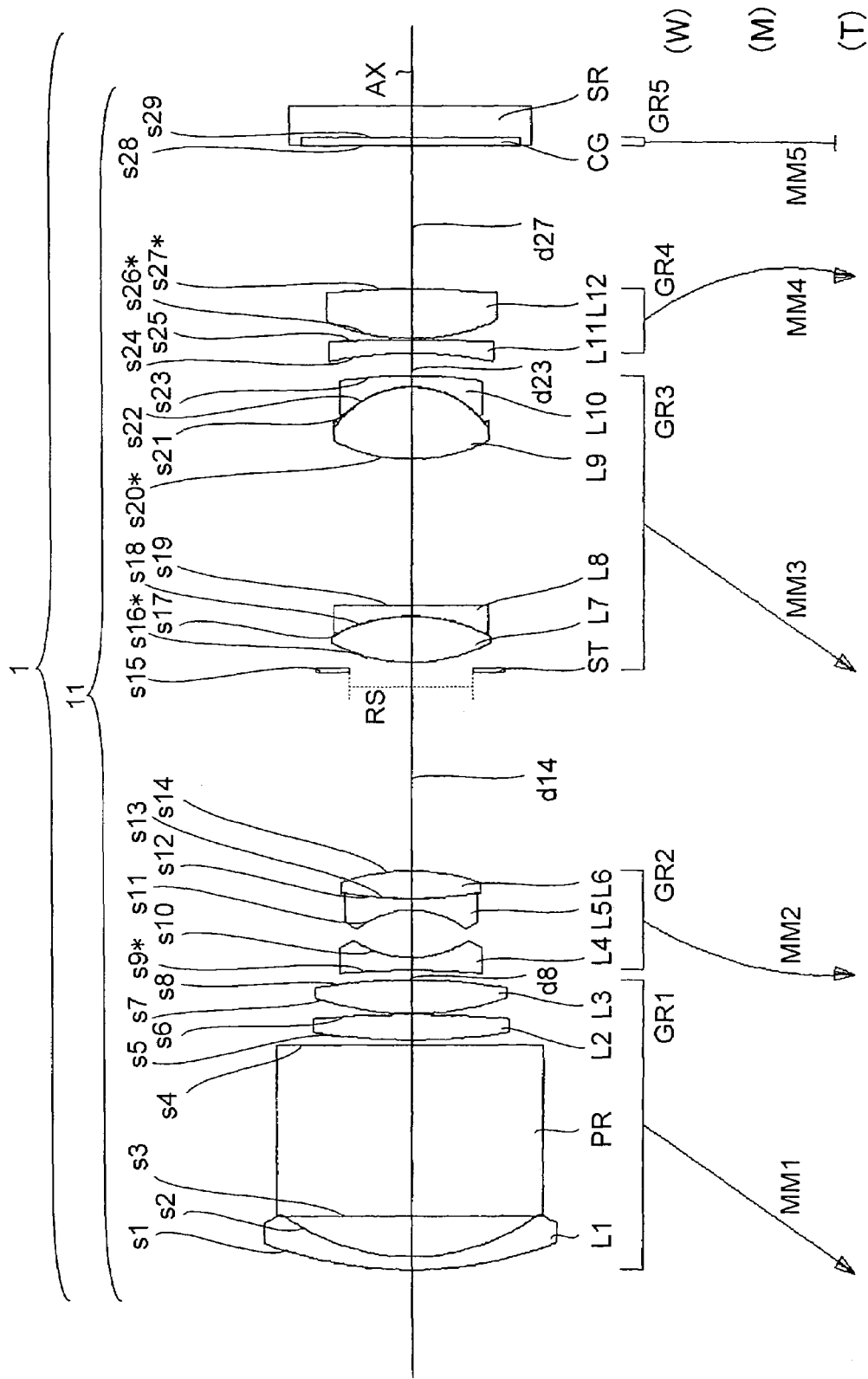
FIG. 1 is a lens construction diagram of a lens unit incorporating the variable-magnification optical system of Example 1 of the invention.

In FIG. 1, GRi represents a lens group, Li represents a lens element, and si represents a surface (such as a transmissive surface). The numerical suffix "i" with which each symbol GRi, Li, or si ends indicates the place as counted from the object side to the image side at which the element it refers to is located among all the elements of the same kind. An aspherical surface is marked with an asterisk "*". The variable-magnification optical system 11 (and thus the lens unit 1) shown in FIG. 1 is referred to as Example 1.

2-1. Lens Unit Construction (Example 1)

The variable-magnification optical system 11 of the lens unit 1 includes, from the shooting target side (object side), a first lens group GR1, a second lens group GR2, a third lens group GR3, a fourth lens group GR4, and an image sensor unit SU. Since this image sensor unit SU takes the fifth place as counted from the object side, it is identified also by SU5 in the following description.

First Lens Group

The first lens group GR1 includes, from the object side, a first lens element L1, an optical prism PR, a second lens element L2, and a third lens element L3. The first lens group GR1 as a whole has a "positive" optical power (refractive power). It should be understood that an optical power is defined as the reciprocal of a focal length.

The first lens element (front lens element) is a negative meniscus lens element convex on the object side.

The optical prism (a first optical axis changing member) PR is a prism (for example, a rectangular prism) that bends at right angles the light beam incoming from the object side. The optical prism PR receives the light beam at an entrance surface s3 thereof, and lets the light beam exit therefrom at an exit surface s4 thereof.

The second lens element L2 is a positive lens element convex on both sides (a biconvex lens element). The third lens element L3 is a positive lens element convex on both sides.

Second Lens Group

The second lens group GR2 includes, from the object side, a fourth lens element (the most object side lens element) L4, a fifth lens element L5, and a sixth lens element L6. The second lens group GR2 as a whole has a "negative" optical power.

The fourth lens element L4 is a negative lens element having concave surface on both sides (a biconcave lens element). The fourth lens element L4 has (as its object-side surface) an aspherical surface s9 (an aspherical surface denotes a refractive optical surface having an aspherical shape, a surface exerting a refractive effect equivalent to that exerted by an aspherical surface, or the like).

The fifth lens element L5 is a negative lens element concave on both sides. The sixth lens element L6 is a positive lens element convex on both sides. The fifth and sixth lens elements L5 and L6 are cemented together at the surfaces s12 and s13 thereof to form a cemented lens element. The cementing together of the lens elements is achieved, for example, by the use of adhesive (likewise, any cemented lens element mentioned later is formed by cementing together the constituent lens elements thereof, for example, with adhesive).

Third Lens Group

The third lens group GR3 includes, from the object side, an optical aperture stop ST, a seventh lens element L7, an eighth lens element L8, a ninth lens element L9, and a tenth lens element Lb. The third lens group GR3 as a whole has a "positive" optical power.

The optical aperture stop ST is an aperture stop that permits the aperture diameter RS to be varied. The optical aperture stop ST is built integrally with the third lens group GR3. For the sake of convenience, in FIG. 1, the optical aperture stop ST itself is indicated as s15.

The seventh lens element L7 is a positive lens element convex on both sides. The seventh lens element L7 has an aspherical surface s16. The eighth lens element L8 is a negative meniscus lens element concave on the object side. The seventh and eighth lens elements L7 and L8 are cemented together at the surfaces s17 and s18 thereof to form a cemented lens element.

The ninth lens element L9 is a positive lens element convex on both sides. The ninth lens element L9 has an aspherical surface s20. The tenth lens element L10 is a negative meniscus lens element concave on the object side. The ninth and tenth lens elements L9 and L10 are cemented together at the surfaces s21 and s22 thereof to form a cemented lens element.

Fourth Lens Group

The fourth lens group GR4 includes, from the object side, an eleventh lens element L11 and a twelfth lens element L12. The fourth lens group GR4 as a whole has a "positive" optical power.

The eleventh lens element L11 is a negative meniscus lens element concave on the object side. The twelfth lens element L12 is a positive lens element convex on both sides. The twelfth lens element L12 has aspherical surfaces s26 and s27.

Image Sensor Unit

The image sensor unit SU includes, from the object side, a cover glass CG, which has two surfaces s28 and s29, and an image sensor SR. These are so arranged that the surface s29 of the cover glass CG is located very close to the light-receiving surface of the image sensor SR.

In the lens unit 1 of Example 1, the image sensor SR is kept at a fixed position (that is, the image sensor unit SU is stationary). The cover glass CG may function as an optical filter (for example, an infrared cut filter) that has a predetermined cut-off frequency characteristic determined by the pixel pitch of the image sensor SR (although the cover glass CG itself has no optical power).

2-2. Construction Data of the Variable-Magnification Optical System (Example 1)

Tables 1 and 2 show the construction data of the variable-magnification optical system 11 of Example 1.

In Table 1, a symbol in the form of "ri" represents the radius of curvature (in mm) of a surface si. An aspherical surface is marked with an asterisk (*). A symbol in the form of "di" represents the axial distance (in mm) between the i-th surface si and the (i+1)-th surface si+1. For any axial distance that varies with zooming, three values are given that are, from left, the value of di at the wide-angle end (W), that at the middle-focal-length position (M), and that at the telephoto end (T).

Symbols in the forms of "Ni" and "vi" represent the refractive index Nd and the Abbe number vi, respectively, of the medium filling a given axial distance di. Here, the refractive index Nd and the Abbe number vi are those for the d-line (having a wavelength of 587.56 nm).

Shown together in Table 1 are the focal length f (in mm) and f-number FNO of the entire system as observed at each of the following different "focal length positions": the wide-angle end (shortest-focal-length position) (W); the middle-focal-length position (M); and the telephoto end (longest-focal-length position) (T).

Here, an aspherical surface is defined by formula (i) below.

$$X(H) = C_0 \cdot H^2 / (1 + \sqrt{1 - \epsilon \cdot C_0^2 \cdot H^2}) + \Sigma Aj \cdot H^j \quad (i)$$

where

H represents the height in a direction perpendicular to the optical axis AX;

X(H) represents the displacement along the optical axis (the sag) at the height h;

$C_0$ represents the paraxial curvature (=1/ri);

$\epsilon$ represents the quadric surface parameter;

j represents the order of the aspherical surface; and

Aj represents the aspherical coefficient of order j.

Table 2 shows the data related to the aspherical surfaces. The coefficient of any term that does not appear in the table equals 0 (zero). For all the data shown, "E-n" represent "$\times 10^{-n}$".

2-3. Movement of the Individual Lens Groups in the Lens Unit

Zooming

Now, the movement of the individual lens groups (GR1 to GR4) will be described with reference to FIG. 1. In the lens unit 1, zooming (magnification variation or the like) is achieved by varying the distances between the individual lens groups along the optical axis AX.

For example, in the lens unit 1 shown in FIG. 1, zooming is achieved by moving part of the lens groups (namely, the first to third lens groups GR1 to GR3) toward the object side while moving the rest of the lens groups (namely, the fourth lens group GR4) toward the image side.

During this zooming, the distances (group-to-group distances) between the individual lens groups vary. Accordingly, in FIG. 1, only those axial distances di that vary as zooming is performed are indicated by their respective symbols; specifically, only the axial distances d8, d14, d23, and d27 are shown.

In FIG. 1, arrows MMi schematically indicate the movement of the individual lens groups from the wide-angle end (W) to the middle-focal-length position (M) and further to the telephoto end (T). The numerical suffix "i" with which each symbol MMi ends indicates the place as counted from the object side to the image side at which the arrow it refers to is located, the number thus coinciding with that of the lens unit the arrow is relevant to.

FIGS. 2A to 2C, 3A to 3C, and 4A to 4C show the aberrations observed in the variable-magnification optical system 11 at different zoom positions. Specifically, FIGS. 2A to 2C show the aberrations observed at the wide-angle end (W), FIGS. 3A to 3C show the aberrations observed at the middle-focal-length position (M), and FIGS. 4A to 4C show the aberrations observed at the telephoto end (T).

FIGS. 2A, 3A, and 4A show spherical aberration (S.A.) and sine condition (S.C.). In these diagrams, a solid line d represents the spherical aberration (in mm) for the d-line, and a broken line SC represents the deviation (in mm) from the ideal sine condition. Shown together in these diagrams are the FNOs (f-numbers) at the respective focal length positions.

FIGS. 2B, 3B, and 4B show astigmatism. In these diagrams, a broken line DM represents the astigmatism (in mm) for the d-line as observed on the meridional surface, and a solid line DS represents the astigmatism (in mm) for the d-line as observed on the sagittal surface. Shown together in these diagrams are the values of Y' (in mm), which represents the maximum image height (the distance from the optical axis AX) on the light-receiving surface of the image-sensing device SR.

FIGS. 2C, 3C, and 4C show distortion. In these diagrams, a solid line represents the distortion (%) for the d-line. Shown together in these diagrams are the values of Y'.

3. Examples of Various Features of the Present Invention

As will be understood from the foregoing, a variable-magnification optical system 11 according to the invention includes, from the object side to the image side, at least a first lens group GR1 having a positive optical power, a second lens group GR2 having a negative optical power, and a third lens group GR3 having a positive optical power. Moreover, the first lens group GR1 includes a optical prism PR that changes the optical axis.

In addition, a variable-magnification optical system 11 according to the invention fulfills at least one of conditional formula (A), (B), or (C) below. Not all of these conditional formulae need to be fulfilled simultaneously. Fulfilling any of them brings the corresponding effects and benefits in the variable-magnification optical system 11. Needless to say, the more of the conditional formulae are fulfilled, the more effects and benefits are obtained.

Conditional formula (A) (conditional formula (1)) is as shown below.

$$0.1 < |f2/\sqrt{fw \times ft}| < 0.45 \quad (A)$$

where f2 represents the focal length of the second lens group;

fw represents the focal length of the entire variable-magnification optical system at the wide-angle end; and ft represents the focal length of the entire variable-magnification optical system at the telephoto end.

Conditional formula (B) (conditional formula (2)) is as shown below.

$$0.5 < f1/\sqrt{fw \times ft} < 1.4 \quad (B)$$

where f1 represents a focal length of the first lens group.

Conditional formula (C) (conditional formula (3)) is as shown below.

$$0.3 < f3/\sqrt{fw \times ft} < 1.0 \quad (C)$$

where f3 represents a focal length of the third lens group.

Conditional formulae (A), (B), or (C) relates to the focal length f2, f1, or f3, and thus the optical power (refractive power), of a particular lens group GR2, GR1, or GR3. Moreover, conditional formula (A), (B), or (C) defines, based on the optical power of the particular lens group GR2, GR1, or GR3, a conditional range that should preferably be fulfilled to achieve a proper balance between reduction of the total length of the variable-magnification optical system, and thus the total length of the lens unit 1 (with a view to making them compact), and reduction of various aberrations.

With respect to the geometric mean $\sqrt{fw \times ft}$ of the focal lengths fw and ft of the variable-magnification optical system at the wide-angle end (W) and the telephoto end (T), respectively, if the ratio thereto of the focal length f2, f1, or f3 of a particular lens group Gr2, Gr1, or Gr3 exceeds (is greater than) the upper limit of conditional formula (A), (B), or (C), this means that the focal length f2, f1, or f3 is comparatively long (that is, the corresponding optical power is comparatively weak).

Here, the weaker the optical power of the lens group Gr2, Gr1, or Gr3, the longer the distance through which the lens group Gr2, Gr1, or Gr3 needs to move for zooming (and thus the larger the variable-magnification optical system 11). On the other hand, generally, the weaker an optical power, the smaller the various aberrations (such as astigmatism) it produces.

Thus, disregarding the upper limit of conditional formula (A), (B), or (C) has the disadvantage of increasing the total length of the variable-magnification optical system 11 (making the lens unit 1 larger), but has the advantage of alleviating degradation (appearing as various aberrations) of optical performance.

By contrast, with respect to the geometric mean $\sqrt{fw \times ft}$ (the focal length at the middle-focal-length position (M)), if the ratio thereto of the focal length f2, f1, or f3 of a particular lens group Gr2, Gr1, or Gr3 exceeds (is smaller than) the lower limit of conditional formula (A), (B), or (C), this means that the focal length f2, f1, or f3 is comparatively short (that is, the corresponding optical power is comparatively strong).

Here, the stronger the optical power of the lens group Gr2, Gr1, or Gr3, the shorter the distance through which the lens group Gr2, Gr1, or Gr3 needs to move for zooming (and thus the smaller the variable-magnification optical system 1). On the other hand, the stronger the negative optical power given to the lens group Gr2, Gr1, or Gr3, the larger the various aberrations it produces (and thus the lower the optical performance obtained).

Thus, disregarding the lower limit of conditional formula (A), (B), or (C) has the disadvantage of aggravating degradation (appearing as various aberrations) of optical performance, but has the advantage of reducing the total length of the variable-magnification optical system 11 (making it more compact).

As will be understood from the foregoing, observing the upper limit of conditional formula (A), (B), or (C) helps prevent the total length of the variable-magnification optical system 11 from becoming unduly large (and thus prevent the lens unit 1 from becoming unduly large), and observing the lower limit of conditional formula (A), (B), or (C) helps prevent the optical power of a particular lens group GR2, GR1, or GR3 from causing extreme degradation of optical performance. Thus, according to the invention, within the range defined by conditional formula (A), (B), or (C), it is possible to realize a variable-magnification optical system 11 (lens unit 1) that is compact but nevertheless suffers less from degradation of optical performance (offers good optical performance).

The values of conditional formula (A), (B), or (C) as calculated in the variable-magnification optical system 11 of Example 1 are as follows (see Table 23 described later):

In Example 1, $|f2/\sqrt{fw \times ft}|=0.42$

In Example 1, $|f1/\sqrt{fw \times ft}|=1.29$

In Example 1, $|f3/\sqrt{fw \times ft}|=0.90$

According to the invention, for further compactness, the third lens group GR3 may include a reflective mirror MR or the like (a second optical axis changing element; see FIGS. 5 and 6) that changes the optical axis by reflecting the light beam, though the provision of such an element is not an absolute requirement. With this construction, it is possible to build, instead of a variable-magnification optical system 11 that extends along a straight line (that is, a straight-type variable-magnification optical system 11), a bent-type variable-magnification optical system 11 (that is, a variable-magnification bending optical system).

This permits increased flexibility in the arrangement of the variable-magnification optical system 11 (lens unit 1). Specifically, the variable-magnification optical system 11 (lens unit 1) so bent and thereby made compact can be arranged in a position suitable therefor inside the housing of the digital camera 29. This helps reduce the dimensions of the digital camera 29 in, among others, the height direction U and the horizontal direction V. Incidentally, the inclusion of the optical prism PR in the first lens group GR1 helps reduce the dimension of the digital camera 29 incorporating the lens unit 1 in the depth direction Z.

In the variable-magnification optical system 11, when the first and third lens groups GR1 and GR3 are moved for zooming, the group-to-group distance between them (the first and third lens groups GR1 and GR3) may be kept constant. For example, the first and third lens groups GR1 and GR3 are built integrally via a lens frame (linking member, not illustrated) so that they are moved simultaneously.

Keeping the first and third lens groups GR1 and GR3 in a linked state as described above helps simplify the structure (arrangement structure) needed for the arrangement of those lens groups GR1 and GR3. This makes it possible, for example, to house the two lens groups GR1 and GR3 in the same lens barrel (not illustrated). This helps make the lens barrel compact.

Moreover, there is now no need to provide separate sources of driving force for moving the first and third lens groups GR1 and GR3 (this helps simplify the structure (driving structure) needed for their movement). That is, the two lens groups, namely the first and third lens groups GR1 and GR3, can now be moved with a single source of driving force.

With the features described above, it is possible to realize a variable-magnification optical system 11 that is remarkably compact but can nevertheless suppress various aberrations. For more effective suppression or correction of various aberrations, a variable-magnification optical system 11 according to the invention may be further provided with the features described below.

For example, the lens unit 1 described above incorporates a variable-magnification optical system 11 including a plurality of lens groups (GR1 to GR4) arranged in a positive-negative-positive-positive optical power arrangement. Here, the second lens group GR2 needs to make diverge the light that has just been made to converge by the positive optical power of the first lens group GR1. Thus, the second lens group GR2 needs to have a comparatively strong optical power. This comparatively strong optical power tends to cause the second lens group GR2 to produce various aberrations.

To avoid this, according to the invention, at least one of the lens elements Li included in the second lens group GR2 fulfills conditional formula (D) below (see Table 1).

$$N_{2g} > 1.7 \quad (D)$$

where $N_{2g}$ represents the refractive index, for the d-line, of a lens element Li included in the second lens group GR2.

With this comparatively high refractive index, it is possible, for example on a lens element having a given focal length, to form a lens surface having a comparatively gentle curvature (a larger radius of curvature). This gentle curvature permits a variable-magnification optical system 11 according to the invention to suppress various aberrations.

For more effective correction of various aberrations, at least one lens element (in Example 1, the fourth lens element L4) may have an aspherical surface. With this aspherical lens surface, it is possible to effectively correct the distortion and other aberrations produced (in particular at the wide-angle end (W)) by the comparatively strong negative optical power.

To make the light incident on the image sensor SR highly telecentric, in a variable-magnification optical system 11 according to the invention, a fourth lens group GR4 having a positive optical power is disposed to follow the first to third lens groups GR1 to GR3 arranged in a positive-negative-positive optical power arrangement.

4. Other Examples

A variable-magnification optical system 11 according to the invention may be constructed in any other manner than specifically described above in connection with the variable-magnification optical system 11 of Example 1. Now, lens units 1 incorporating other variable-magnification optical systems 11 (Examples 2 and 3) that have the thus far described features and that thus offer the comparable effects and benefits will be presented.

In Examples 2 and 3 presented below, as in Example 1, the variable-magnification optical system 11 includes, from the shooting target side, a first lens group GR1, a second lens group GR2, a third lens group GR3, and a fourth lens group GR4 arranged in a positive-negative-positive-positive optical power arrangement. Moreover, on the image side of the fourth lens group GR4, an image sensor unit SU5 is disposed.

Variable-Magnification Optical System of Example 2 (see FIG. 7) First Lens Group The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive lens element convex on both sides.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative lens element concave on both sides (and having an aspherical surface s9 as the object-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as sl5; built integrally with the third lens group GR3), a seventh lens element L7, an eighth lens element L8, a ninth lens element L9, and a tenth lens element L10. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a positive lens element convex on both sides (and having an aspherical surface s20); and The tenth lens element L10 is a negative meniscus lens element concave on the object side.

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 only includes an eleventh lens element Lii. Used as this lens element is as follows:

The eleventh lens element L11 is a positive lens element convex on both sides (and having aspherical surfaces s24 and s25).

Image Sensor Unit

The cover glass CG of the image sensor unit SU5 has two surfaces s26 and s27 for protecting the light-receiving surface of the image sensor SR.

Construction Data of the Variable-Magnification Optical System (Example 2)

Tables 3 and 4 show the construction data of the variable-magnification optical system 11 of Example 2. In these tables, the same conventions apply as in Tables 1 and 2 described earlier.

Movement of the Individual Lens Groups in the Lens Unit

Zooming

Figure 7:
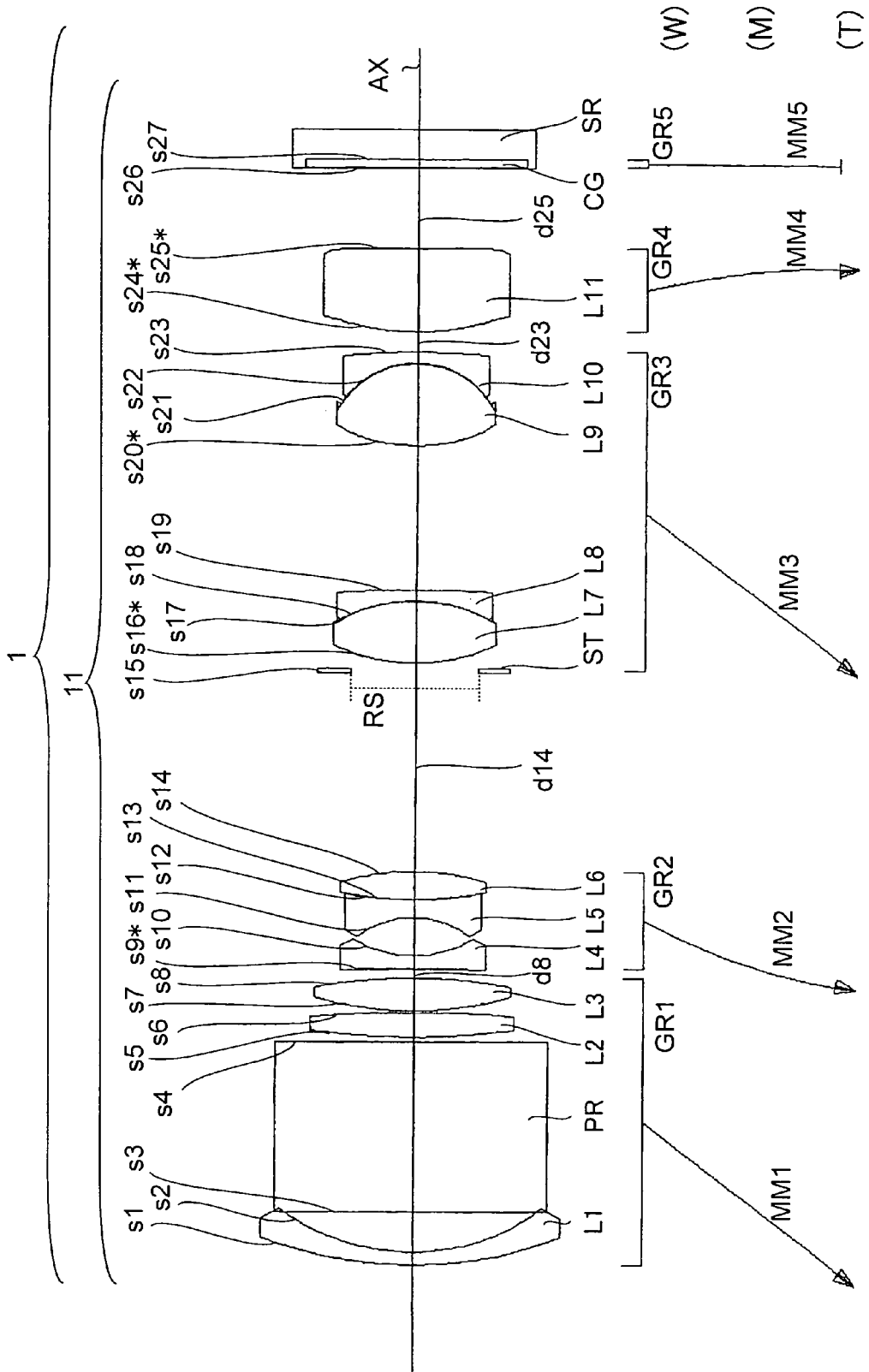
FIG. 7 is a lens construction diagram of a lens unit incorporating the variable-magnification optical system of Example 2 of the invention.
Figure 8A:
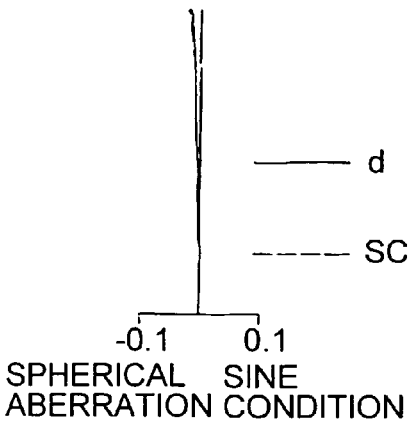
FIG. 8A is a spherical aberration diagram of the variable-magnification optical system of Example 2 at the wide-angle end (W)
Figure 8B:
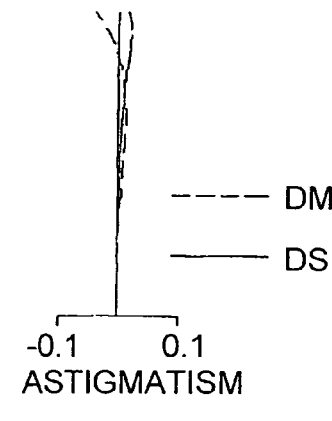
FIG. 8B is a astigmatism diagram of the variable-magnification optical system of Example 2 at the wide-angle end (W)
Figure 8C:
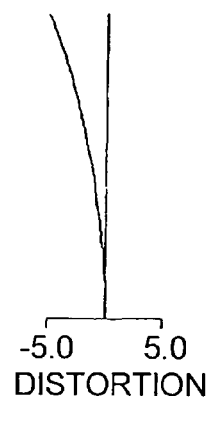
FIG. 8C is a distortion diagram of the variable-magnification optical system of Example 2 at the wide-angle end (W)
Figure 9A:
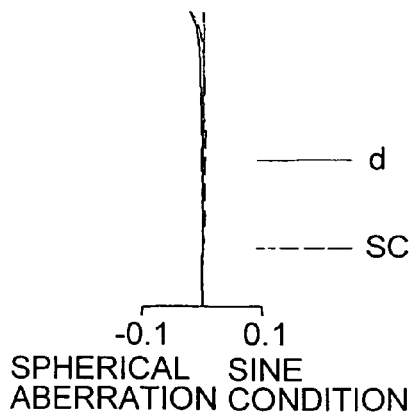
FIG. 9A is a spherical aberration diagram of the variable-magnification optical system of Example 2 at the middle-focal-length position (M)
Figure 9B:
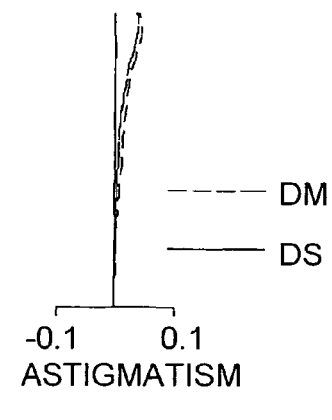
FIG. 9B is a astigmatism diagram of the variable-magnification optical system of Example 2 at the middle-focal-length position (M)
Figure 9C:
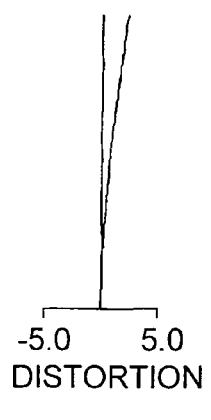
FIG. 9C is a distortion diagram of the variable-magnification optical system of Example 2 at the middle-focal-length position (M)
Figure 10A:
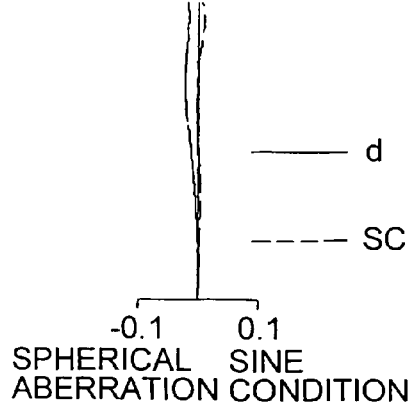
FIG. 10A is a spherical aberration diagram of the variable-magnification optical system of Example 2 at the telephoto end (T)
Figure 10B:
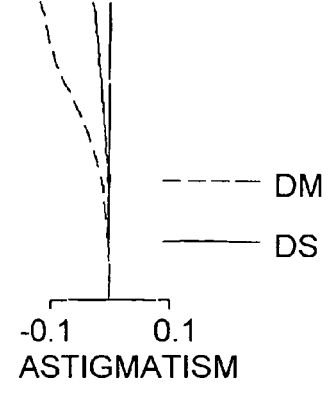
FIG. 10B is a astigmatism diagram of the variable-magnification optical system of Example 2 at the telephoto end (T)
Figure 10C:
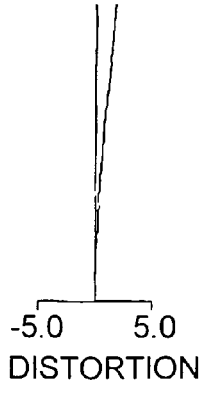
FIG. 10C is a distortion diagram of the variable-magnification optical system of Example 2 at the telephoto end (T)

In the variable-magnification optical system 11 of Example 2, as shown in FIG. 7, zooming is achieved by moving part of the lens groups (namely, the first to third lens groups GR1 to GR3) toward the object side while moving the rest of the lens groups (namely, the fourth lens group GR4) toward the image side. Accordingly, in FIG. 7, only those axial distances di that vary as zooming is performed are indicated by their respective symbols; specifically, only the axial distances d8, dl4, d23, and d25 are shown.

FIGS. 8A to 8C, 9A to 9C, and 10A to 10C show the aberrations observed in the variable-magnification optical system 11 of Example 2 at different zoom positions. In these diagrams, the same conventions apply as in FIGS. 2A to 2C, 3A to 3C, and 4A to 4C.

Figure 11:
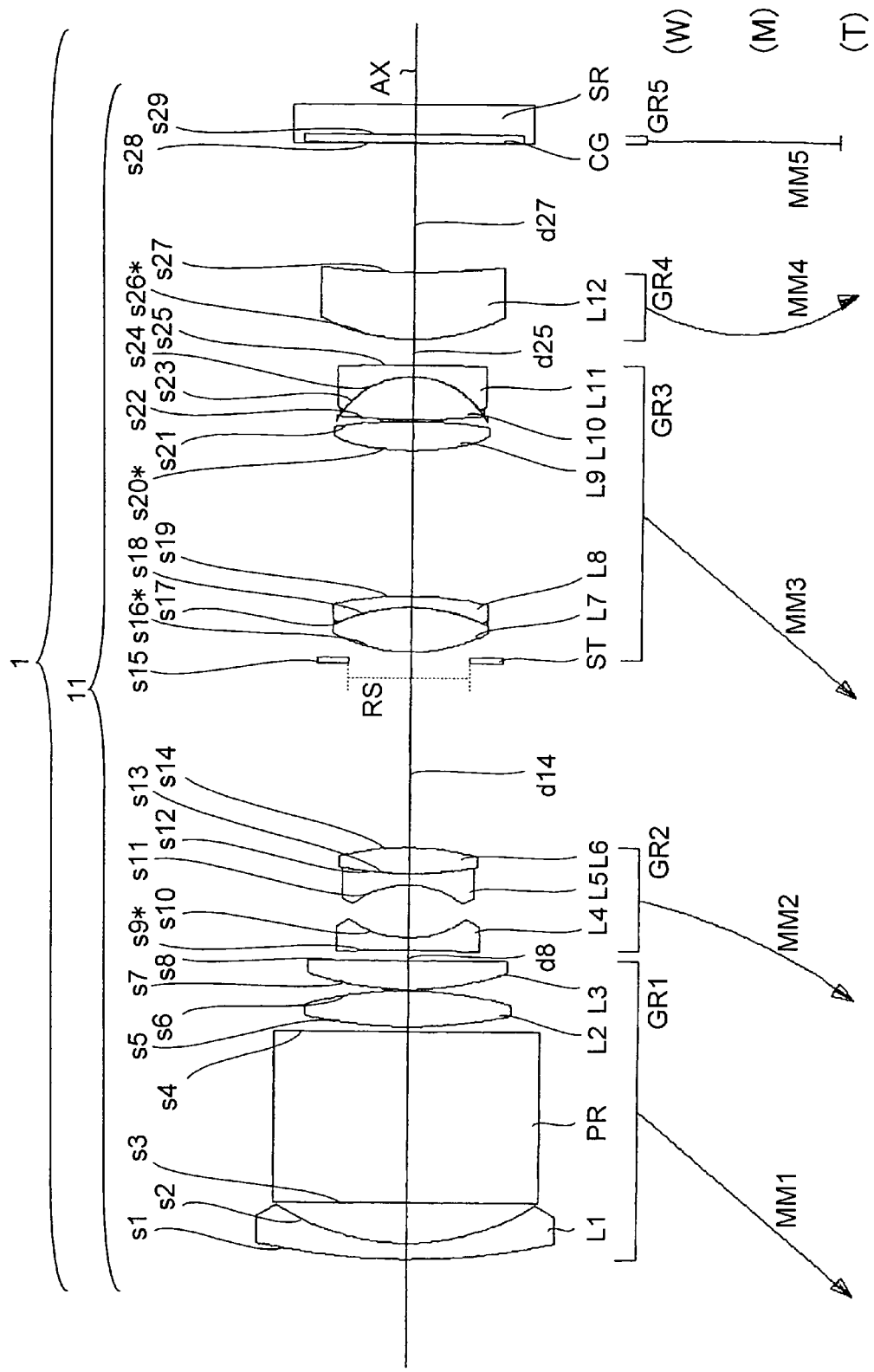
FIG. 11 is a lens construction diagram of a lens unit incorporating the variable-magnification optical system of Example 3 of the invention.

Variable-Magnification Optical System of Example 3 (see FIG. 11)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive lens element convex on both sides.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative lens element concave on both sides (and having an aspherical surface s9 as the object-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as s15; built integrally with the third lens group GR3), a seventh lens element L7, an eighth lens element L8, a ninth lens element L9, a tenth lens element L10, and an eleventh lens element L11. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a positive lens element convex on both sides (and having an aspherical surface s20);

The tenth lens element L10 is a positive lens element convex on both sides; and

The eleventh lens element L11 is a negative meniscus lens element concave on the object side.

The seventh and eighth lens elements L7 and L8 are cemented together at the surfaces s17 and s18 thereof to form a cemented lens element. The tenth and eleventh lens elements L10 and L11 are cemented together at the surfaces s23 and s24 thereof to form a cemented lens element.

Fourth Lens Group

The fourth lens group GR4 only includes a twelfth lens element L12. Used as this lens element is as follows:

The twelfth lens element L12 is a positive meniscus lens element convex on the object side (and having an aspherical surface s26).

Image Sensor Unit

The cover glass CG of the image sensor unit SU5 has two surfaces s28 and s29 for protecting the light-receiving surface of the image sensor SR.

Construction Data of the Variable-Magnification Optical System (Example 3)

Tables 5 and 6 show the construction data of the variable-magnification optical system 11 of Example 3. In these tables, the same conventions apply as in Tables 1 and 2 described earlier.

Movement of the Individual Lens Groups in the Lens Unit

Zooming

In the variable-magnification optical system 11 of Example 3, as shown in FIG. 11, zooming is achieved by moving all the lens groups (namely, the first to fourth lens groups GR1 to GR4) toward the object side, except that the fourth lens group GR4 first moves toward the object side but then makes a U-turn to move back toward the image side. Accordingly, in FIG. 11, only those axial distances di that vary as zooming is performed are indicated by their respective symbols; specifically, only the axial distances d8, dl4, d25, and d27 are shown.

FIGS. 12A to 12C, 13A to 13C, and 14A to 14C show the aberrations observed in the variable-magnification optical system 11 of Example 3 at different zoom positions. In these diagrams, the same conventions apply as in FIGS. 2A to 2C, 3A to 3C, and 4A to 4C.

Embodiment 2

Another embodiment (Embodiment 2) of the present invention will be described below. In the following description, such members as serve the same purposes as in Embodiment 1 are identified with common reference symbols, and no overlapping explanations will be repeated.

In the lens unit 1 of Embodiment 1, it is assumed that the most object-side lens element (the fourth lens element L4) of the second lens group GR2 has an aspherical surface as the object-side surface s9 thereof. The present invention, however, may be practiced with any other construction.

For example, the most object-side lens element Li of the second lens group GR2 may have an aspherical surface as the image-side surface si thereof. The variable-magnification optical system 11 may be so constructed as to include, instead of an image sensor unit SU including an image sensor SR and a cover glass CG, a lens group GRi including a lens element Li, a cover glass CG, and an image sensor SR.

1. Constructions of Lens Units Incorporating Various Variable-Magnification Optical Systems Hereinafter, other variable-magnification optical systems 11 (Examples 4 to 11) embodying the present invention will be presented. In Example 4, the variable-magnification optical system 11 is constructed as follows: instead of a reflective mirror MR (see FIGS. 5 and 6), an optical prism (second optical prism) PR' is included in the third lens group GR3; moreover, the most object-side lens element (the fourth lens element L4) in the second lens group GR2 has an aspherical surface as the image-side surface s10 thereof.

In Examples 5 to 11, the variable-magnification optical system 11 constructed as follows: there is provided a fourth lens group GR4 that includes a lens element Li, a cover glass CG, and an image sensor SR; moreover, the most object-side lens element (the fourth lens element L4) in the second lens group GR2 has an aspherical surface as the image-side surface s10 thereof.

In Examples 4 to 11 presented below, as in Examples 1 to 3, the variable-magnification optical system 11 includes, from the shooting target side, a first lens group GR1, a second lens group GR2, a third lens group GR3, and a fourth lens group GR4 arranged in a positive-negative-positive-positive optical power arrangement.

Figure 15:
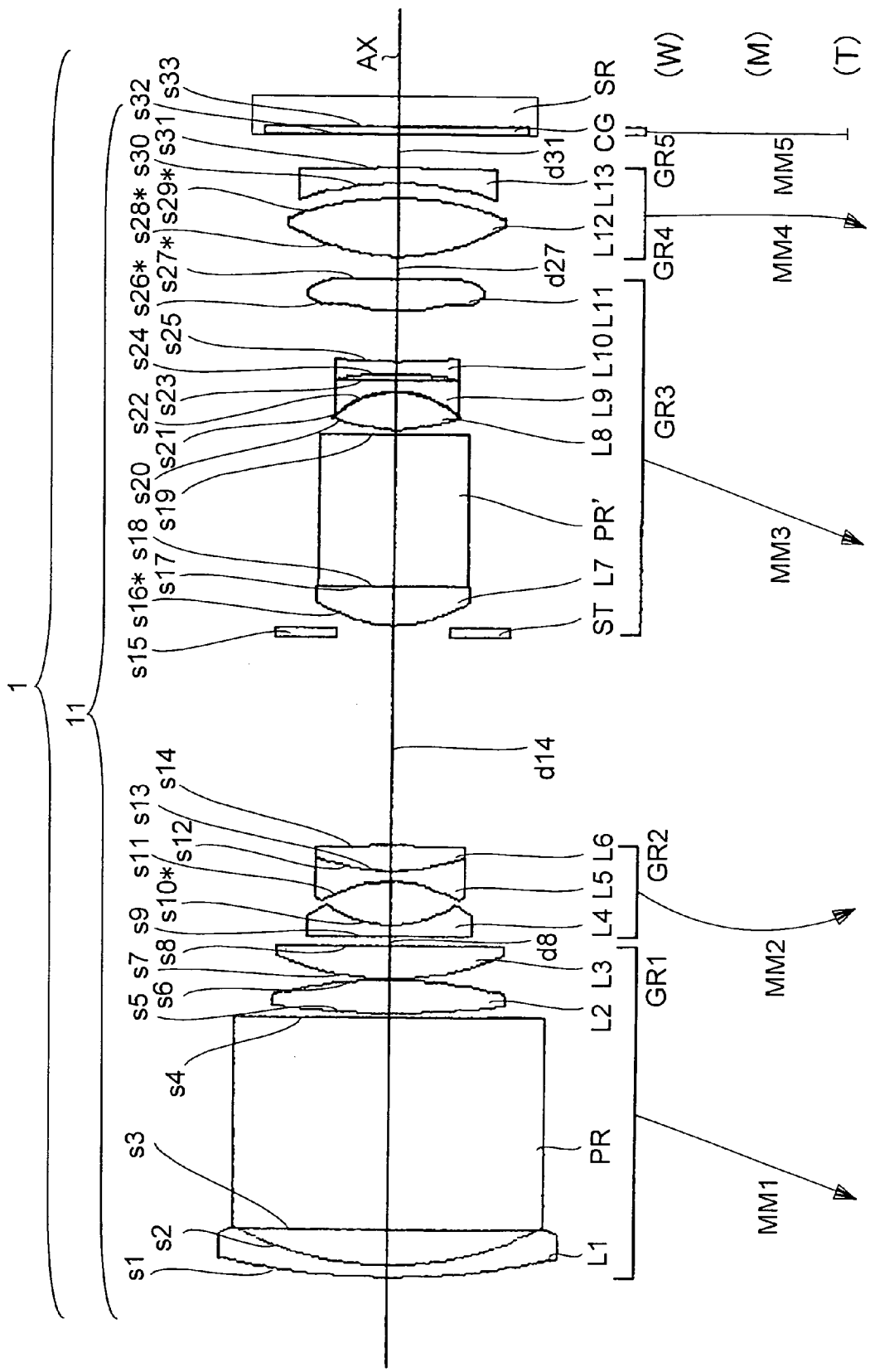
FIG. 15 is a lens construction diagram of a lens unit incorporating the variable-magnification optical system of Example 4 of the invention.

Variable-Magnification Optical System of Example 4 (See FIG. 15)

First Lens Group

The first lens group GR1 includes, from the object side, a first lens element L1, an optical prism (first optical prism) PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative meniscus lens element convex on the object side (and having an aspherical surface s9 as the object-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as sl5; built integrally with the third lens group GR3), a seventh lens element L7, an optical prism (second optical axis changing element) PR', an eighth lens element L8, a ninth lens element L9, a tenth lens element L10, and an eleventh lens element L11. Used as these lens elements (including the optical prism PR') are as follows:

The seventh lens element L7 is a plano-convex lens element convex on the object side (and having an aspherical surface s16);

The optical prism PR' is, for example, an optical prism similar to the optical prism PR;

The eighth lens element L8 is a positive lens element convex on both sides;

The ninth lens element L9 is a negative lens element concave on both sides; and

The tenth lens element L10 is a negative lens element concave on both sides; and The eleventh lens element L11 is a positive meniscus lens element convex on the object side (and having aspherical surfaces s26 and s27).

The seventh lens element L7 and the optical prism PR' are cemented together at the surfaces s17 and s18 thereof. The eighth and ninth lens elements L8 and L9 are cemented together at the surfaces s21 and s22 thereof to form a cemented lens element.

Fourth Lens Group

The fourth lens group GR4 includes, from the object side, a twelfth lens element L12 and a thirteenth lens element Ll3. Used as these lens elements are as follows:

The twelfth lens element L12 is a positive lens element convex on both sides (and having aspherical surfaces s28 and s29); and The thirteenth lens element L13 is a negative meniscus lens element concave on the object side.

Image Sensor Unit

The cover glass CG of the image sensor unit SU5 has two surfaces s32 and s33 for protecting the light-receiving surface of the image sensor SR. Moreover, as in Examples 1 to 3, the image sensor unit SU5 remains stationary.

Construction Data of the Variable-Magnification Optical System (Example 4)

Tables 7 and 8 show the construction data of the variable-magnification optical system 11 of Example 4. In these tables, the same conventions apply as in Tables 1 and 2 described earlier.

Movement of the Individual Lens Groups in the Lens Unit

Zooming

In the variable-magnification optical system 11 of Example 4, as shown in FIG. 15, zooming is achieved by moving at least part of the lens groups. Specifically, for zooming, the first to fourth lens groups GR1 to GR4 (that is, all the lens groups) move toward the object side, except that the second lens group GR2 first moves toward the object side but then makes a U-turn to move back toward the image side. Accordingly, in FIG. 15, only those axial distances di that vary as zooming is performed are indicated by their respective symbols; specifically, only the axial distances d8, d14, d27, and d31 are shown.

FIGS. 16A to 16C, 17A to 17C, and 18A to 18C show the aberrations observed in the variable-magnification optical system 11 of Example 4 at different zoom positions. In these diagrams, the same conventions apply as in FIGS. 2A to 2C, 3A to 3C, and 4A to 4C.

Figure 19:
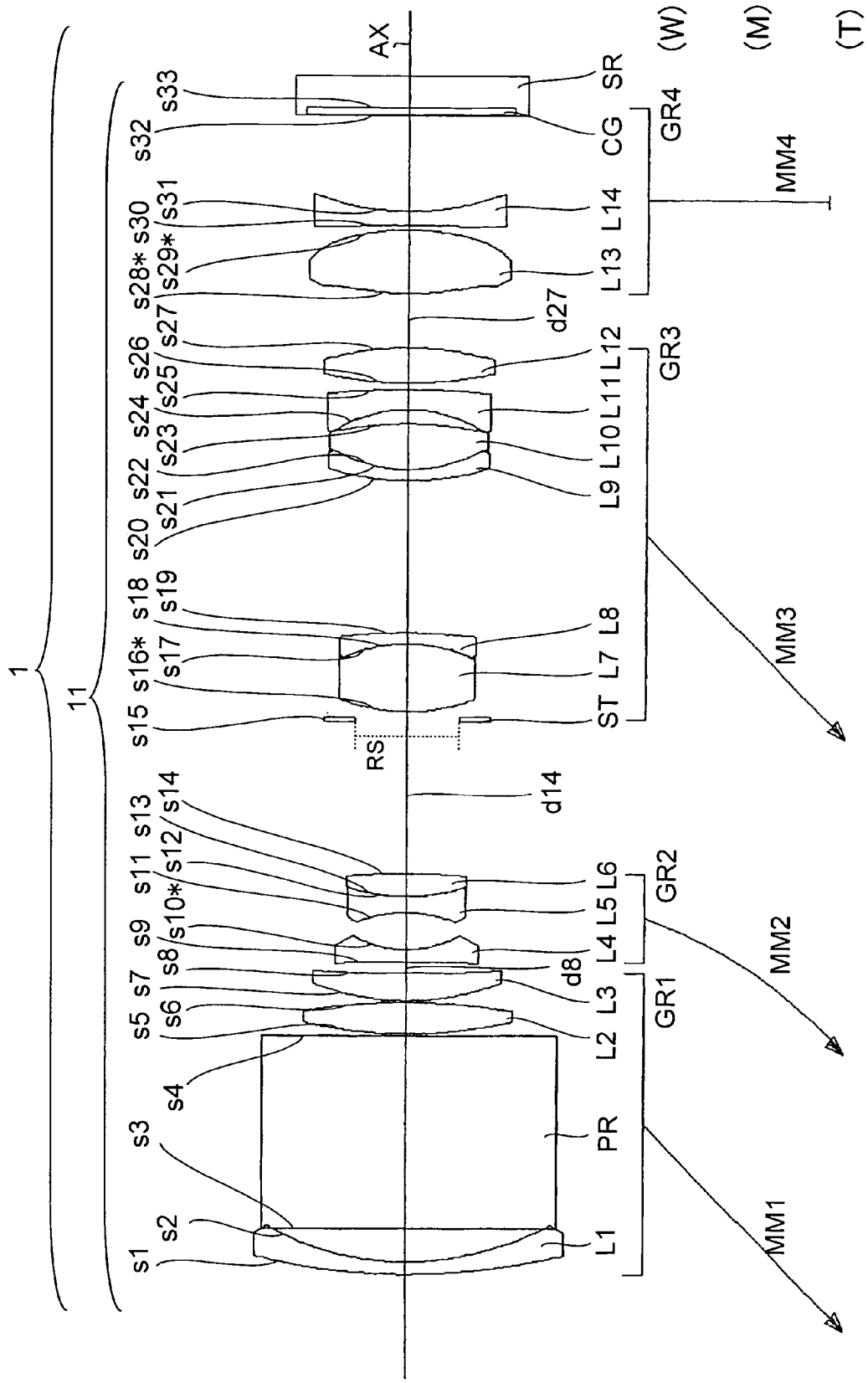
FIG. 19 is a lens construction diagram of a lens unit incorporating the variable-magnification optical system of Example 5 of the invention.

Variable-Magnification Optical System of Example 5 (See FIG. 19)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative lens element concave on both sides (and having an aspherical surface s10 as the image-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as si5; built integrally with the third lens group GR3), a seventh lens element L7, an eighth lens element L8, a ninth lens element L9, a tenth lens element L10, an eleventh lens element L11, and a twelfth lens element L12. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a negative meniscus lens element convex on the object side; and The tenth lens element L10 is a positive lens element convex on both sides;

The eleventh lens element L11 is a negative meniscus lens element concave on the object side; and The twelfth lens element L12 is a positive lens element convex on both sides.

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a thirteenth lens element L13, a fourteenth lens element L14, and a cover glass CG (having two surfaces s32 and s33). Used as these lens elements are as follows:

The thirteenth lens element L13 is a positive lens element convex on both sides (and having aspherical surfaces s28 and s29); and The fourteenth lens element L14 is a negative lens element concave on both sides.

Here, the cover glass CG included in the fourth lens group GR4 is stationary (this applies also to Examples 6 to 11 presented later).

Construction Data of the Variable-Magnification Optical System (Example 5)

Tables 9 and 10 show the construction data of the variable-magnification optical system 11 of Example 5. In these tables, the same conventions apply as in Tables 1 and 2 described earlier.

Movement of the Individual Lens Groups in the Lens Unit

Zooming

In the variable-magnification optical system 11 of Example 5, as shown in FIG. 19, zooming is achieved by moving at least part of the lens groups (namely, the first to third lens groups GR1 to GR3) toward the object side. Accordingly, in FIG. 19, only those axial distances di that vary as zooming is performed are indicated by their respective symbols; specifically, only the axial distances d8, d14, and d27 are shown.

FIGS. 20A to 20C, 21A to 21C, and 22A to 22C show the aberrations observed in the variable-magnification optical system 11 of Example 5 at different zoom positions. In these diagrams, the same conventions apply as in FIGS. 2A to 2C, 3A to 3C, and 4A to 4C.

Figure 23:
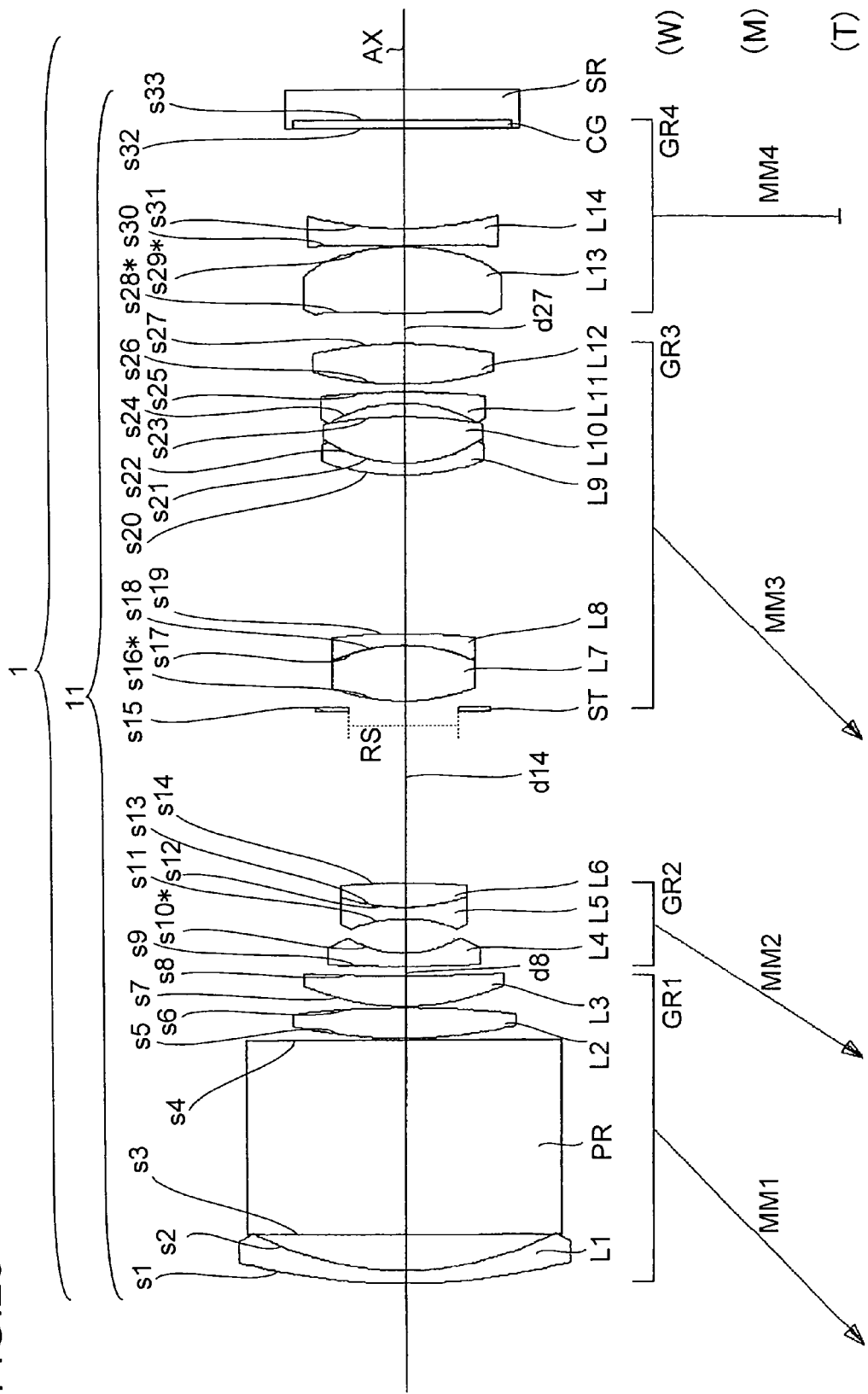
FIG. 23 is a lens construction diagram of a lens unit incorporating the variable-magnification optical system of Example 6 of the invention.

Variable-Magnification Optical System of Example 6 (See FIG. 23)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative meniscus lens element convex on the object side (and having an aspherical surface s10 as the image-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as si5; built integrally with the third lens group GR3), a seventh lens element L7, an eighth lens element L8, a ninth lens element L9, a tenth lens element L10, an eleventh lens element L11, and a twelfth lens element L12. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a negative meniscus lens element convex on the object side; and The tenth lens element L10 is a positive lens element convex on both sides;

The eleventh lens element L11 is a negative meniscus lens element concave on the object side; and The twelfth lens element L12 is a positive lens element convex on both sides.

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a thirteenth lens element L13, a fourteenth lens element L14, and a cover glass CG (having two surfaces s32 and s33). Used as these lens elements are as follows:

The thirteenth lens element L13 is a positive lens element convex on both sides (and having aspherical surfaces s28 and s29); and The fourteenth lens element LI4 is a negative lens element concave on both sides.

Construction Data of the Variable-Magnification Optical System (Example 6)

Tables 11 and 12 show the construction data of the variable-magnification optical system 11 of Example 6. In these tables, the same conventions apply as in Tables 1 and 2 described earlier.

Movement of the Individual Lens Groups in the Lens Unit

Zooming

In the variable-magnification optical system 11 of Example 6, as shown in FIG. 23, zooming is achieved by moving at least part of the lens groups (namely, the first to third lens groups GR1 to GR3) toward the object side. Accordingly, in FIG. 23, only those axial distances di that vary as zooming is performed are indicated by their respective symbols; specifically, only the axial distances d8, d14, and d27 are shown.

FIGS. 24A to 24C, 25A to 25C, and 26A to 26C show the aberrations observed in the variable-magnification optical system 11 of Example 6 at different zoom positions. In these diagrams, the same conventions apply as in FIGS. 2A to 2C, 3A to 3C, and 4A to 4C.

Figure 27:
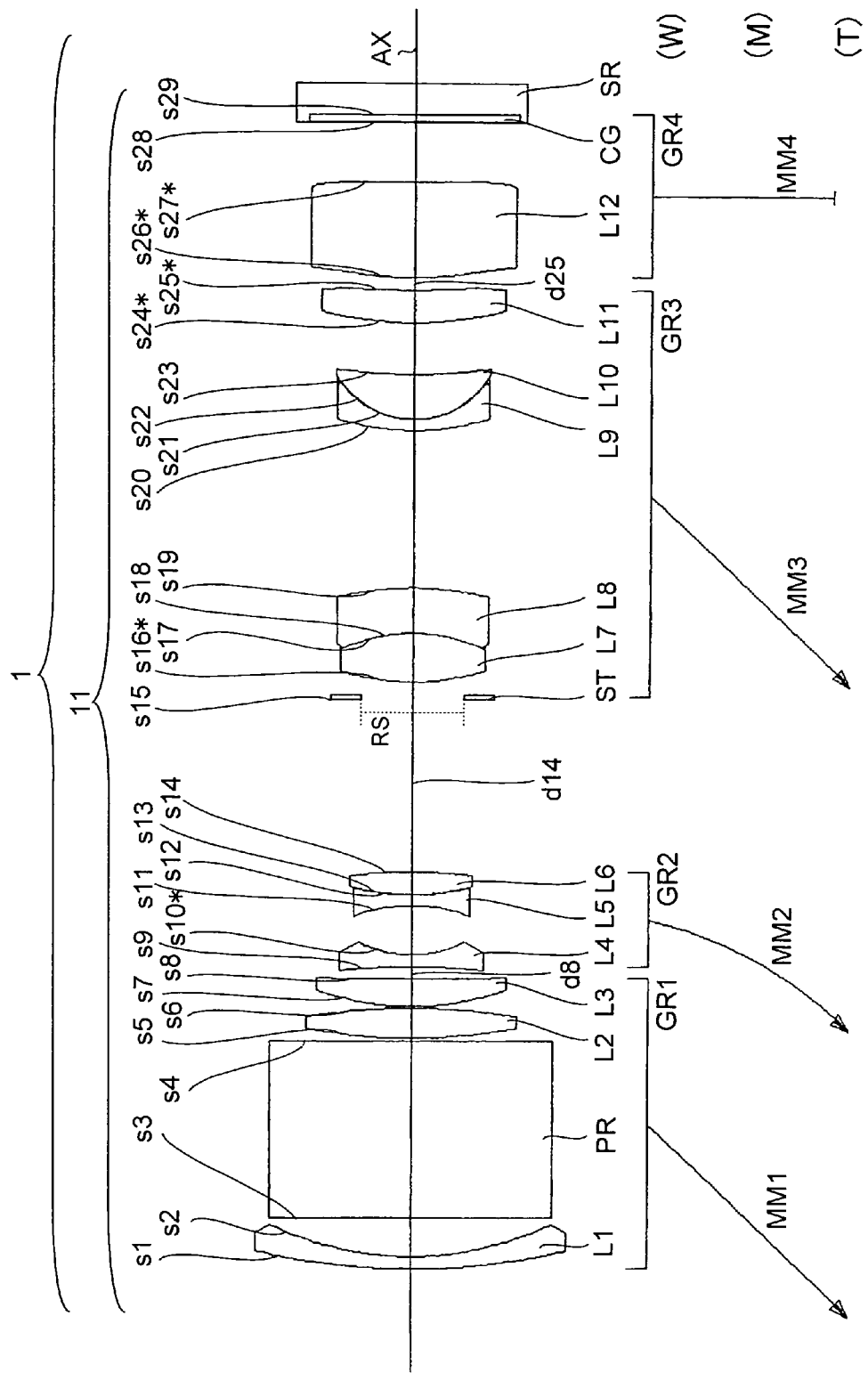
FIG. 27 is a lens construction diagram of a lens unit incorporating the variable-magnification optical system of Example 7 of the invention.
Figure 28A:
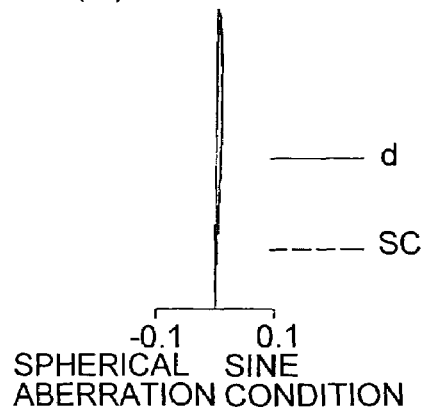
FIG. 28A is a spherical aberration diagram of the variable-magnification optical system of Example 7 at the wide-angle end (W)
Figure 28B:
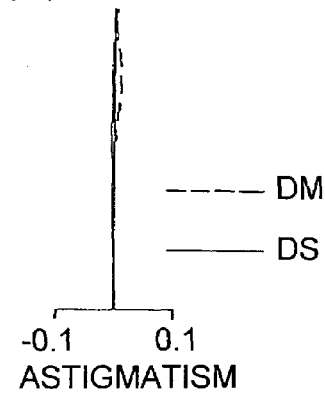
FIG. 28B is a astigmatism diagram of the variable-magnification optical system of Example 7 at the wide-angle end (W)
Figure 28C:
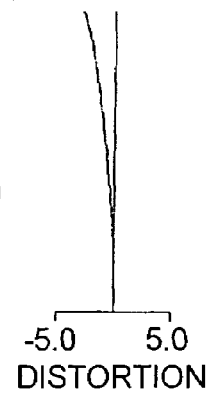
FIG. 28C is a distortion diagram of the variable-magnification optical system of Example 7 at the wide-angle end (W)
Figure 29A:
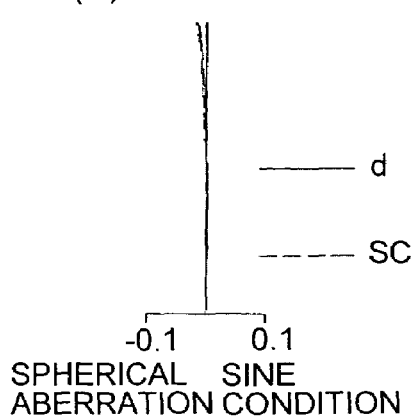
FIG. 29A is a spherical aberration diagram of the variable-magnification optical system of Example 7 at the middle-focal-length position (M)
Figure 29B:
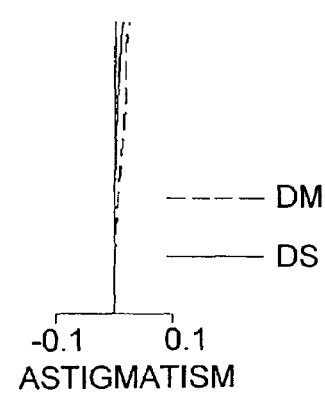
FIG. 29B is a astigmatism diagram of the variable-magnification optical system of Example 7 at the middle-focal-length position (M)
Figure 29C:
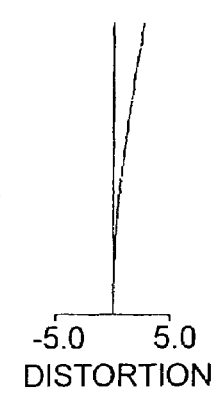
FIG. 29C is a distortion diagram of the variable-magnification optical system of Example 7 at the middle-focal-length position (M)
Figure 30A:
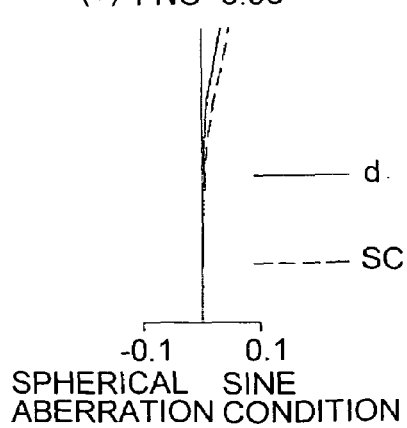
FIG. 30A is a spherical aberration diagram of the variable-magnification optical system of Example 7 at the telephoto end (T)
Figure 30B:
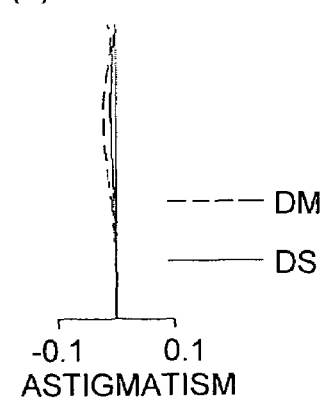
FIG. 30B is a astigmatism diagram of the variable-magnification optical system of Example 7 at the telephoto end (T)
Figure 30C:
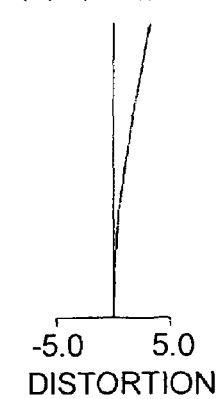
FIG. 30C is a distortion diagram of the variable-magnification optical system of Example 7 at the telephoto end (T)

Variable-Magnification Optical System of Example 7 (see FIG. 27)

First Lens Group

The first lens group GR1 includes, from the object side, a first lens element L1, an optical prism PR, a second lens element L2, and a third lens element L3. Used as these lens elements are as follows:
   The first lens element L1 is a negative meniscus lens element convex on the object side;
   The second lens element L2 is a positive lens element convex on both sides; and
   The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:
   The fourth lens element L4 is a negative lens element concave on both sides (and having an aspherical surface s10 as the image-side surface);
   The fifth lens element L5 is a negative lens element concave on both sides; and
   The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as s15; built integrally with the third lens group GR3), a seventh lens element L7, an eighth lens element L8, a ninth lens element L9, a tenth lens element L10, and an eleventh lens element L11. Used as these lens elements are as follows:
   The seventh lens element L7 is a positive lens element convex on both sides (and having an aspherical surface s16);
   The eighth lens element L8 is a negative meniscus lens element concave on the object side;
   The ninth lens element L9 is a negative meniscus lens element convex on the object side; and
   The tenth lens element L10 is a positive meniscus lens element convex on the object side; and
   The eleventh lens element L11 is a positive meniscus lens element convex on the object side (and having aspherical surfaces s24 and s25).

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a twelfth lens element L12 and a cover glass CG (having two surfaces s28 and s29). Used as this lens element is as follows:
   The twelfth lens element L12 is a positive lens element convex on the object side (having aspherical surfaces s26 and s27).

Construction Data of the Variable-Magnification Optical System (Example 7)

Tables 13 and 14 show the construction data of the variable-magnification optical system 11 of Example 7. In these tables, the same conventions apply as in Tables 1 and 2 described earlier.

Movement of the Individual Lens Groups in the Lens Unit

Zooming

In the variable-magnification optical system 11 of Example 7, as shown in FIG. 27, zooming is achieved by moving at least part of the lens groups (namely, the first to third lens groups GR1 to GR3) toward the object side. Accordingly, in FIG. 27, only those axial distances di that vary as zooming is performed are indicated by their respective symbols; specifically, only the axial distances d8, d14, and d25 are shown.

FIGS. 28A to 28C, 29A to 29C, and 30A to 30C show the aberrations observed in the variable-magnification optical system 11 of Example 7 at different zoom positions. In these diagrams, the same conventions apply as in FIGS. 2A to 2C, 3A to 3C, and 4A to 4C.

Figure 31:
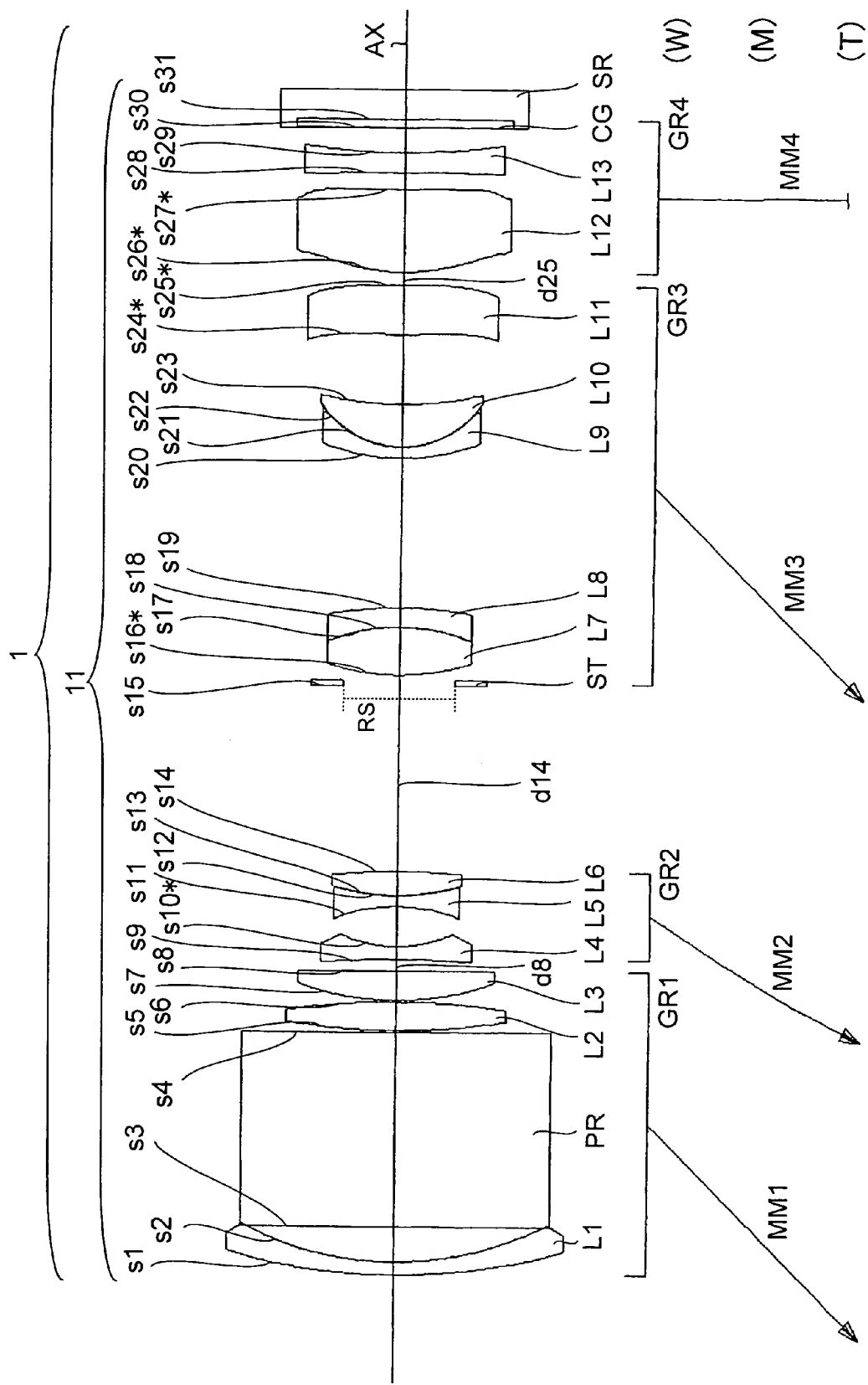
FIG. 31 is a lens construction diagram of a lens unit incorporating the variable-magnification optical system of Example 8 of the invention.
Figure 32A:
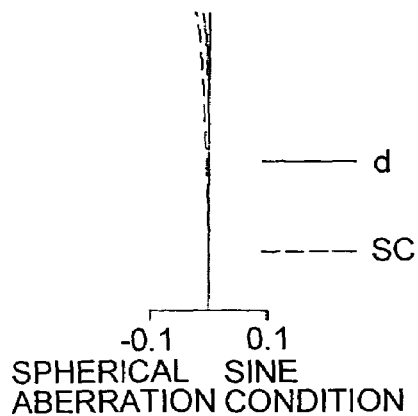
FIG. 32A is a spherical aberration diagram of the variable-magnification optical system of Example 8 at the wide-angle end (W)
Figure 32B:
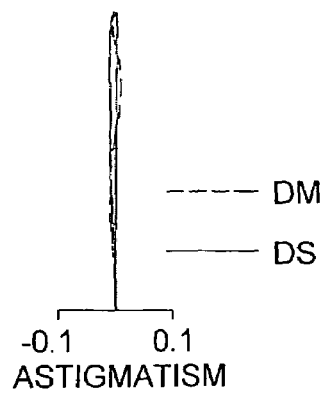
FIG. 32B is a astigmatism diagram of the variable-magnification optical system of Example 8 at the wide-angle end (W)
Figure 32C:
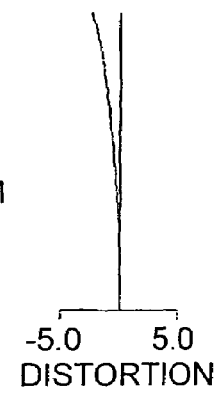
FIG. 32C is a distortion diagram of the variable-magnification optical system of Example 8 at the wide-angle end (W)
Figure 33A:
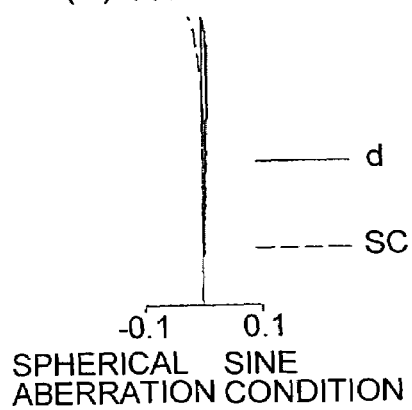
FIG. 33A is a spherical aberration diagram of the variable-magnification optical system of Example 8 at the middle-focal-length position (M)
Figure 33B:
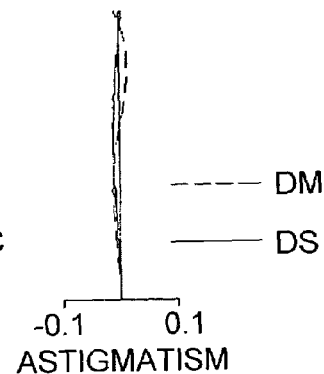
FIG. 33B is a astigmatism diagram of the variable-magnification optical system of Example 8 at the middle-focal-length position (M)
Figure 33C:
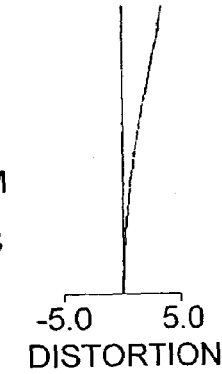
FIG. 33C is a distortion diagram of the variable-magnification optical system of Example 8 at the middle-focal-length position (M)
Figure 34A:
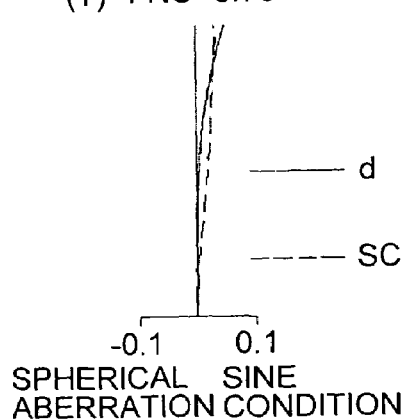
FIG. 34A is a spherical aberration diagram of the variable-magnification optical system of Example 8 at the telephoto end (T)
Figure 34B:
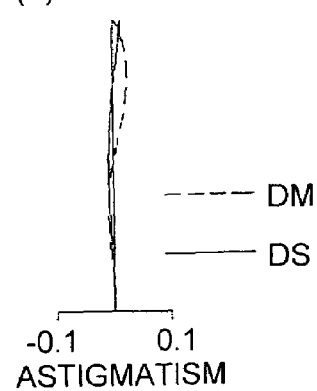
FIG. 34B is a astigmatism diagram of the variable-magnification optical system of Example 8 at the telephoto end (T)
Figure 34C:
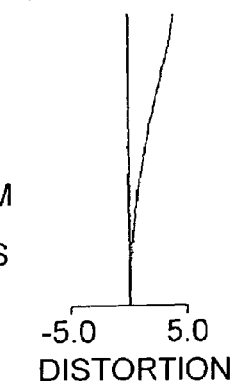
FIG. 34C is a distortion diagram of the variable-magnification optical system of Example 8 at the telephoto end (T)

Variable-Magnification Optical System of Example 8 (see FIG. 31)

First Lens Group

The first lens group GR1 includes, from the object side, a first lens element L1, an optical prism PR, a second lens element L2, and a third lens element L3. Used as these lens elements are as follows:
   The first lens element L1 is a negative meniscus lens element convex on the object side;
   The second lens element L2 is a positive lens element convex on both sides; and
   The third lens element L3 is a positive lens element convex on both sides.

Second Lens Group

The second lens group GR2 includes, from the object side, a fourth lens element (the most object-side lens element) L4, a fifth lens element L5, and a sixth lens element L6. Used as these lens elements are as follows:
   The fourth lens element L4 is a negative lens element concave on both sides (and having an aspherical surface s10 as the image-side surface);
   The fifth lens element L5 is a negative lens element concave on both sides; and
   The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as sl5; built integrally with the third lens group GR3), a seventh lens element L7, an eighth lens element L8, a ninth lens element L9, a tenth lens element L10, and an eleventh lens element L11. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a negative meniscus lens element convex on the object side; and The tenth lens element L10 is a positive meniscus lens element convex on the object side; and The eleventh lens element L11 is a positive lens element convex on both sides (and having aspherical surfaces s24 and s25).

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a twelfth lens element L12, a thirteenth lens element L13, and a cover glass CG (having two surfaces s30 and s31). Used as these lens elements are as follows:

The twelfth lens element L12 is a positive lens element convex on both sides (having aspherical surfaces s26 and s27); and The thirteenth lens element L13 is a negative lens element concave on both sides.

Construction Data of the Variable-Magnification Optical System (Example 8)

Tables 15 and 16 show the construction data of the variable-magnification optical system 11 of Example 8. In these tables, the same conventions apply as in Tables 1 and 2 described earlier.

Movement of the Individual Lens Groups in the Lens Unit

Zooming

In the variable-magnification optical system 11 of Example 8, as shown in FIG. 31, zooming is achieved by moving at least part of the lens groups (namely, the first to third lens groups GR1 to GR3) toward the object side. Accordingly, in FIG. 31, only those axial distances di that vary as zooming is performed are indicated by their respective symbols; specifically, only the axial distances d8, d14, and d25 are shown.

FIGS. 32A to 32C, 33A to 33C, and 34A to 34C show the aberrations observed in the variable-magnification optical system 11 of Example 8 at different zoom positions. In these diagrams, the same conventions apply as in FIGS. 2A to 2C, 3A to 3C, and 4A to 4C.

Figure 35:
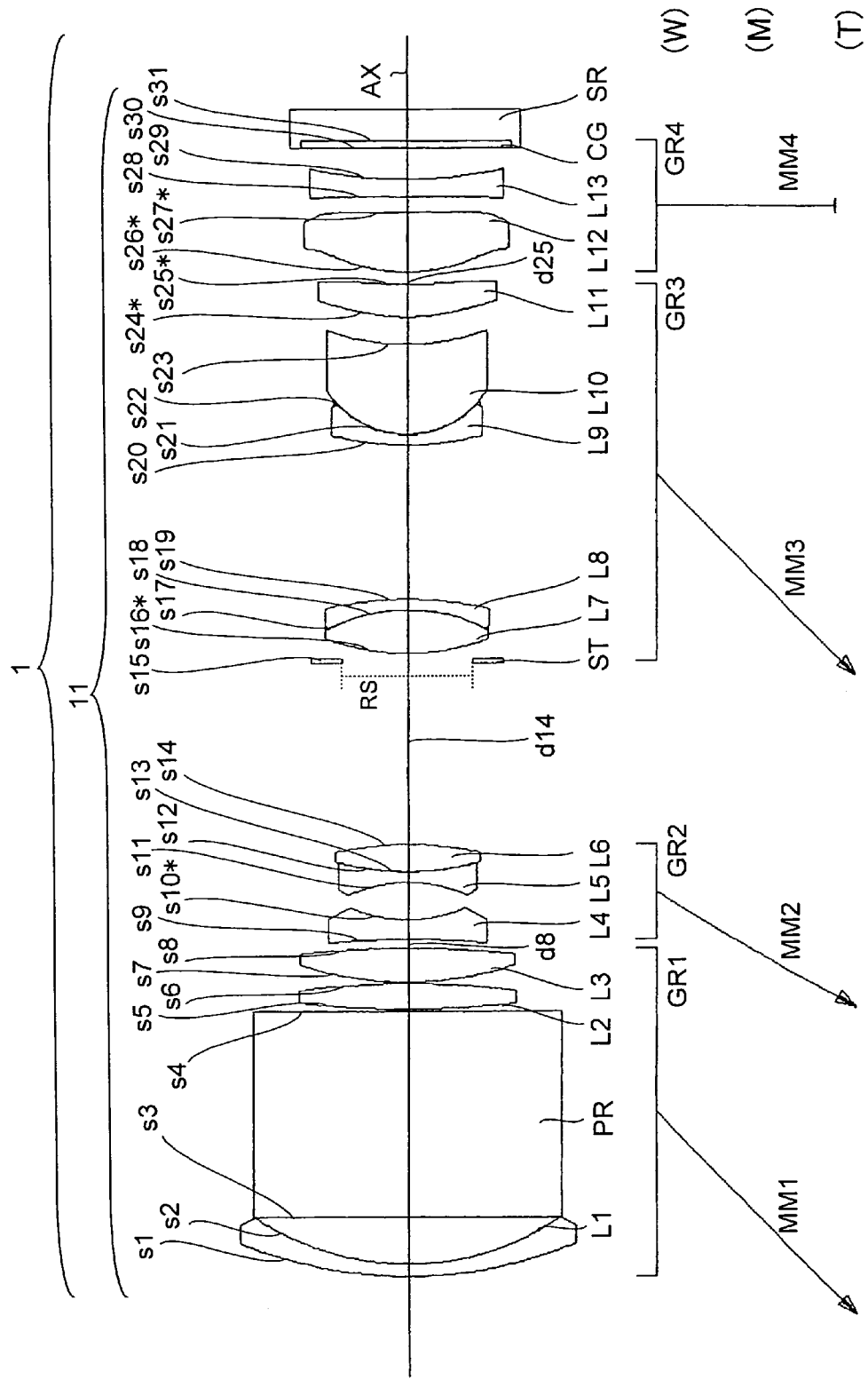
FIG. 35 is a lens construction diagram of a lens unit incorporating the variable-magnification optical system of Example 9 of the invention.

Variable-Magnification Optical System of Example 9 (See FIG. 35)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and

The third lens element L3 is a positive lens element convex on both sides.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative lens element concave on both sides (and having an aspherical surface s10 as the image-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as sl5; built integrally with the third lens group GR3), a seventh lens element L7, an eighth lens element L8, a ninth lens element L9, a tenth lens element L10, and an eleventh lens element L11. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a negative meniscus lens element convex on the object side; and The tenth lens element L10 is a positive meniscus lens element convex on the object side; and The eleventh lens element L11 is a positive meniscus lens element convex on the object side (and having aspherical surfaces s24 and s25).

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a twelfth lens element L12, a thirteenth lens element L13, and a cover glass CG (having two surfaces s30 and s31). Used as these lens elements are as follows:

The twelfth lens element L12 is a positive lens element convex on both sides (having aspherical surfaces s26 and s27); and The thirteenth lens element L13 is a negative lens element concave on both sides.

Construction Data of the Variable-Magnification Optical System (Example 9)

Tables 17 and 18 show the construction data of the variable-magnification optical system 11 of Example 9. In these tables, the same conventions apply as in Tables 1 and 2 described earlier.

Movement of the Individual Lens Groups in the Lens Unit

Zooming

In the variable-magnification optical system 11 of Example 9, as shown in FIG. 35, zooming is achieved by moving at least part of the lens groups (namely, the first to third lens groups GR1 to GR3) toward the object side. Accordingly, in FIG. 35, only those axial distances di that vary as zooming is performed are indicated by their respective symbols; specifically, only the axial distances d8, d14, and d25 are shown.

FIGS. 36A to 36C, 37A to 37C, and 38A to 38C show the aberrations observed in the variable-magnification optical system 11 of Example 9 at different zoom positions. In these diagrams, the same conventions apply as in FIGS. 2A to 2C, 3A to 3C, and 4A to 4C.

Figure 39:
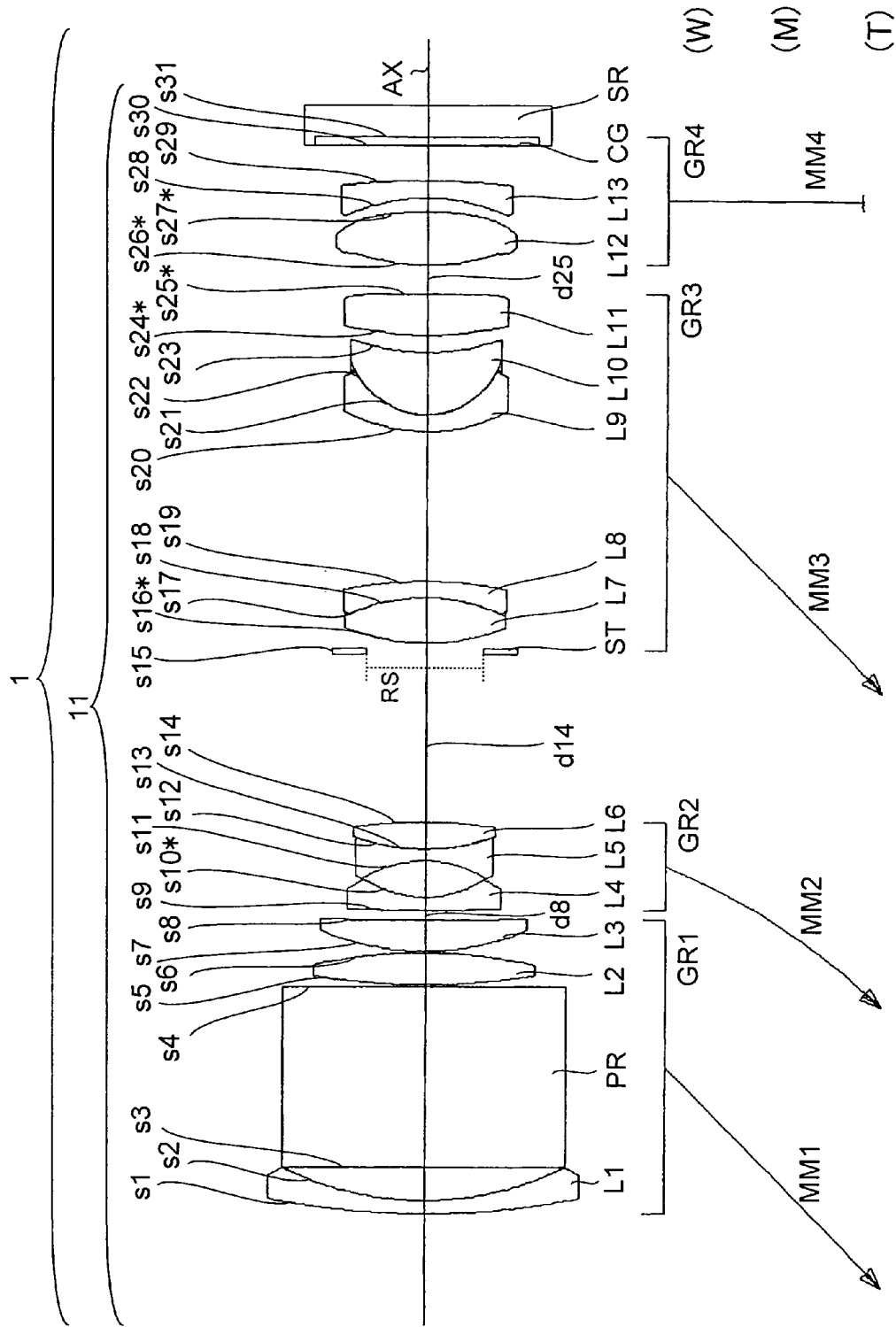
FIG. 39 is a lens construction diagram of a lens unit incorporating the variable-magnification optical system of Example 10 of the invention.

Variable-Magnification Optical System of Example 10 (see FIG. 39)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative meniscus lens element convex on the object side (and having an aspherical surface s10 as the image-side surface);

The fifth lens element L5 is a negative lens element concave on both sides; and The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as s15; built integrally with the third lens group GR3), a seventh lens element L7, an eighth lens element L8, a ninth lens element L9, a tenth lens element L10, and an eleventh lens element L11. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a negative meniscus lens element convex on the object side; and The tenth lens element L10 is a positive meniscus lens element convex on the object side; and The eleventh lens element L11 is a positive meniscus lens element convex on the object side (and having aspherical surfaces s24 and s25).

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a twelfth lens element L12, a thirteenth lens element L13, and a cover glass CG (having two surfaces s30 and s31). Used as these lens elements are as follows:

The twelfth lens element L12 is a positive lens element convex on both sides (having aspherical surfaces s26 and s27); and The thirteenth lens element L13 is a negative meniscus lens element concave on the object side.

Construction Data of the Variable-Magnification Optical System (Example 10)

Tables 19 and 20 show the construction data of the variable-magnification optical system 11 of Example 10. In these tables, the same conventions apply as in Tables 1 and 2 described earlier.

Movement of the Individual Lens Groups in the Lens Unit

Zooming

In the variable-magnification optical system 11 of Example 10, as shown in FIG. 39, zooming is achieved by moving at least part of the lens groups (namely, the first to third lens groups GR1 to GR3) toward the object side. Accordingly, in FIG. 39, only those axial distances di that vary as zooming is performed are indicated by their respective symbols; specifically, only the axial distances d8, d14, and d25 are shown.

FIGS. 40A to 40C, 41A to 41C, and 42A to 42C show the aberrations observed in the variable-magnification optical system 11 of Example 10 at different zoom positions. In these diagrams, the same conventions apply as in FIGS. 2A to 2C, 3A to 3C, and 4A to 4C.

Figure 43:
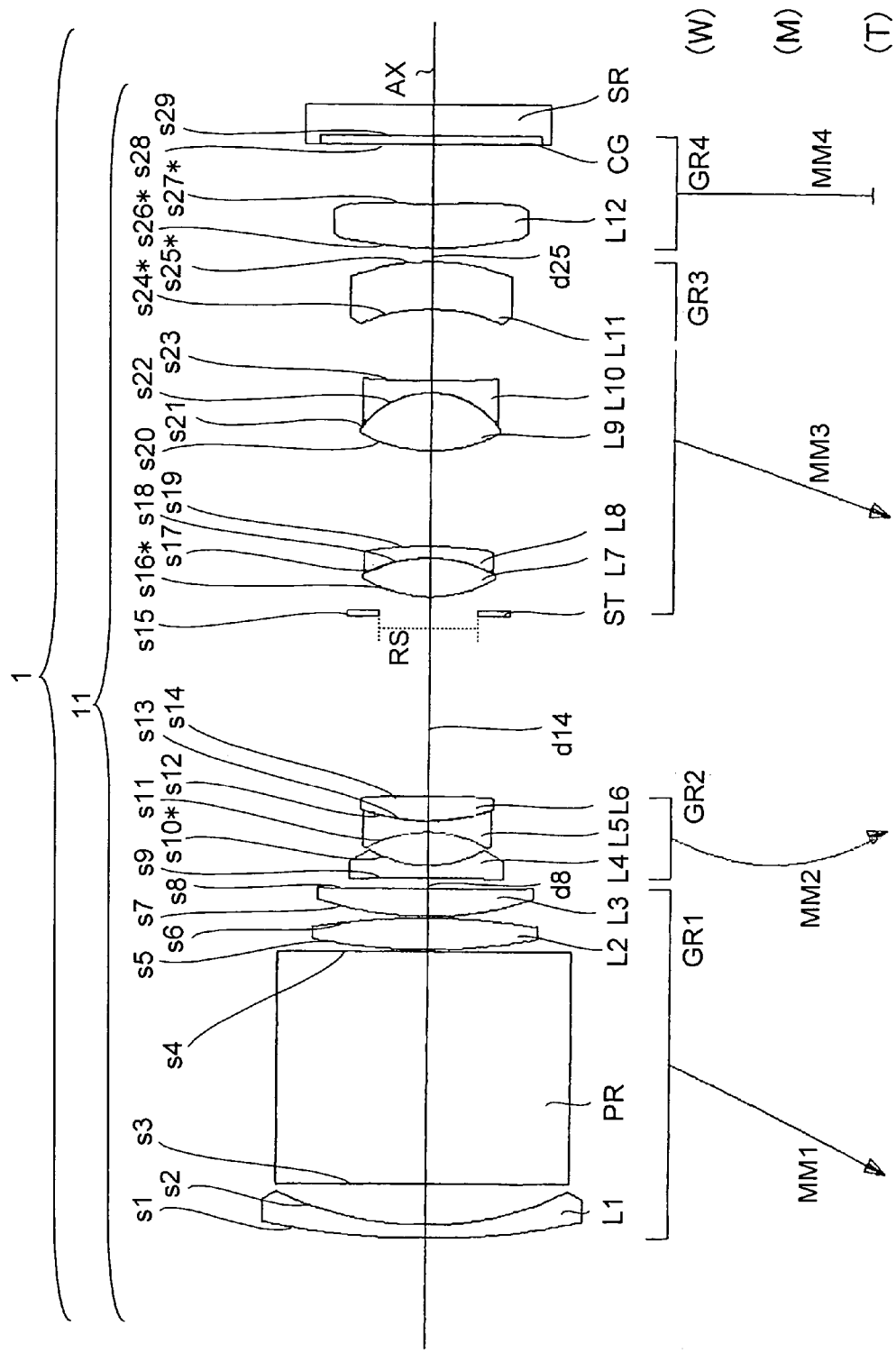
FIG. 43 is a lens construction diagram of a lens unit incorporating the variable-magnification optical system of Example 11 of the invention.
Figure 44A:
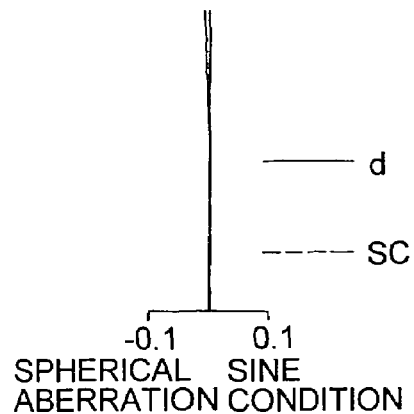
FIG. 44A is a spherical aberration diagram of the variable-magnification optical system of Example 11 at the wide-angle end (W)
Figure 44B:
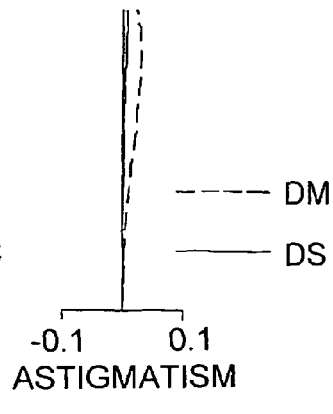
FIG. 44B is a astigmatism diagram of the variable-magnification optical system of Example 11 at the wide-angle end (W)
Figure 44C:
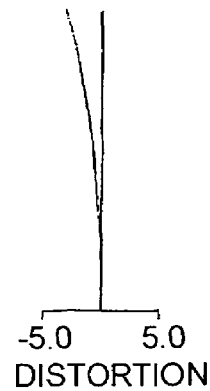
FIG. 44C is a distortion diagram of the variable-magnification optical system of Example 11 at the wide-angle end (W)
Figure 45A:
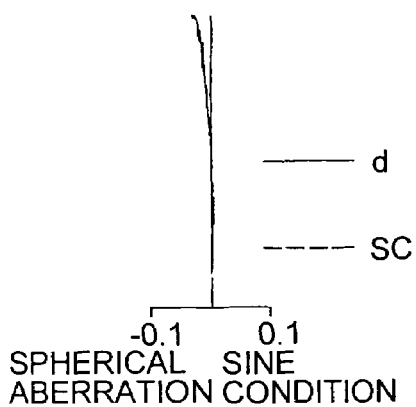
FIG. 45A is a spherical aberration diagram of the variable-magnification optical system of Example 11 at the middle-focal-length position (M)
Figure 45B:
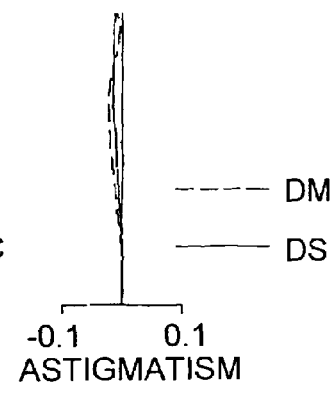
FIG. 45B is a astigmatism diagram of the variable-magnification optical system of Example 11 at the middle-focal-length position (M)
Figure 45C:
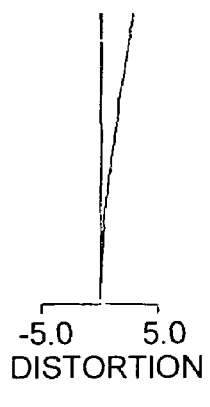
FIG. 45C is a distortion diagram of the variable-magnification optical system of Example 11 at the middle-focal-length position (M)
Figure 46A:
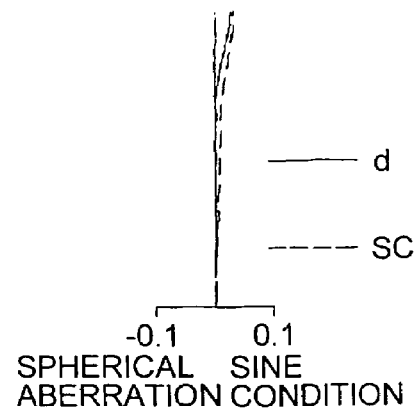
FIG. 46A is a spherical aberration diagram of the variable-magnification optical system of Example 11 at the telephoto end (T)
Figure 46B:
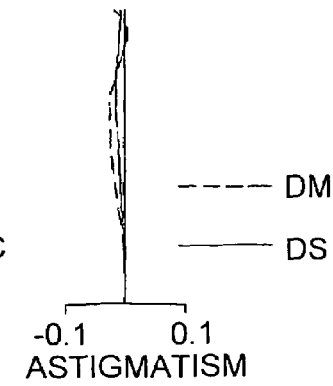
FIG. 46B is a astigmatism diagram of the variable-magnification optical system of Example 11 at the telephoto end (T)
Figure 46C:
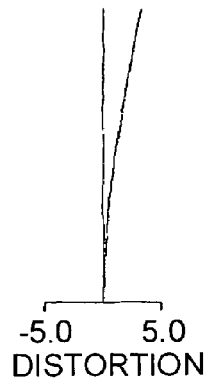
FIG. 46C is a distortion diagram of the variable-magnification optical system of Example 11 at the telephoto end (T).

Variable-Magnification Optical System of Example 11 (See FIG. 43)

First Lens Group

The first lens group GR1 includes, from the object side, a first lens element L1, an optical prism PR, a second lens element L2, and a third lens element L3. Used as these lens elements are as follows:

The first lens element L1 is a negative meniscus lens element convex on the object side;

The second lens element L2 is a positive lens element convex on both sides; and The third lens element L3 is a positive meniscus lens element convex on the object side.

Second Lens Group

The second lens group GR2 includes, from the object side, a fourth lens element (the most object-side lens element) L4, a fifth lens element L5, and a sixth lens element L6. Used as these lens elements are as follows:

The fourth lens element L4 is a negative lens element concave on both sides (and having an aspherical surface s10 as the image-side surface);

The fifth lens element L5 is a negative lens element concave on both sides; and

The sixth lens element L6 is a positive lens element convex on both sides.

The fifth and sixth lens elements L5 and L6 are cemented together at the surfaces s12 and s13 thereof to form a cemented lens element.

Third Lens Group

The third lens group GR3 includes, from the object side, an optical aperture stop ST (also indicated as sl5; built integrally with the third lens group GR3), a seventh lens element L7, an eighth lens element L8, a ninth lens element L9, a tenth lens element L10, and an eleventh lens element L11. Used as these lens elements are as follows:

The seventh lens element L7 is a positive lens element convex on both sides (and having an aspherical surface s16);

The eighth lens element L8 is a negative meniscus lens element concave on the object side;

The ninth lens element L9 is a positive lens element convex on both sides; and

The tenth lens element L10 is a negative lens element concave on both sides; and The eleventh lens element L11 is a negative meniscus lens element concave on the object side (and having aspherical surfaces s24 and s25).

The seventh and eighth lens elements L7 and L8 are cemented together at the surfaces s17 and s18 thereof to form a cemented lens element. The ninth and tenth lens elements L9 and L10 are cemented together at the surfaces s21 and s22 thereof to form a cemented lens element.

Fourth Lens Group

The fourth lens group GR4 includes, from the object side, a twelfth lens element L12 and a cover glass CG (having two surfaces s28 and s29). Used as this lens element is as follows:

The twelfth lens element L12 is a positive meniscus lens element convex on the object side (having aspherical surfaces s26 and s27).

Construction Data of the Variable-Magnification Optical System (Example 11)

Tables 21 and 22 show the construction data of the variable-magnification optical system 11 of Example 11. In these tables, the same conventions apply as in Tables 1 and 2 described earlier.

Movement of the Individual Lens Groups in the Lens Unit

Zooming

In the variable-magnification optical system 11 of Example 11, as shown in FIG. 43, zooming is achieved by moving at least part of the lens groups. Specifically, for zooming, the first to third lens groups GR1 to GR3 move toward the object side, except that the second lens group GR2 first moves toward the object side but then makes a U-turn to move back toward the image side. Accordingly, in FIG. 43, only those axial distances di that vary as zooming is performed are indicated by their respective symbols; specifically, only the axial distances d8, d14, and d25 are shown.

FIGS. 44A to 44C, 45A to 45C, and 46A to 46C show the aberrations observed in the variable-magnification optical system 11 of Example 11 at different zoom positions. In these diagrams, the same conventions apply as in FIGS. 2A to 2C, 3A to 3C, and 4A to 4C.

2. Examples of Various Features of the Present Invention

A lens unit 1 incorporating the variable-magnification optical system 1 of any of Examples 4 to 11 has a construction similar to that of Example 1, the main difference being that the most object-side lens element (the fourth lens element L4) of the second lens group GR2 has an aspherical surface as the image-side surface thereof (S10). It is therefore needless to say that such a lens unit 1 offers the same effects and benefits as described in connection with Example 1.

Moreover, using an aspherical surface as the image-side surface s10 of the most object-side lens element (the fourth lens element L4) in the second lens group GR2 as in a variable-magnification optical system 11 according to the invention makes it possible to set optical powers appropriately.

For example, using an aspherical surface of which the curvature is so set as to become increasingly gentle away from the optical axis AX makes it possible to set optical powers appropriately. Thus, with a variable-magnification optical system 11 according to the invention, it is possible to more effectively reduce the distortion and other aberrations resulting from an excessive or insufficient optical power of a lens element that refracts the off-axial rays (rays passing off the optical axis AX) exiting therefrom.

Other Embodiments

The present invention may be carried out in any manner other than specifically described above as embodiments, and many variations and modifications are possible within the scope and spirit of the invention. For example, it is preferable, though not essential, that the zoom ratio (magnification variation ratio) of a variable-magnification optical system 11 according to the invention fulfill conditional formula (E) below.

Conditional formula (E) (conditional formula (4)) is as shown below.

$$4.7 < ft/fw \quad (E)$$

where ft represents the focal length of the variable-magnification optical system (the entire system) at the telephoto end; and fw represents the focal length of the variable-magnification optical system at the wide-angle end.

Conditional formula (E) defines the room ratio of the variable-magnification optical system 11 (and thus of the lens unit 1). Fulfilling conditional formula (E) therefor achieves a high zoom ratio as compared with those (for example, about 3×) achieved by conventional digital cameras 29.

That is, according to the invention, it is possible to realize a variable-magnification optical system 11 that offers a high zoom ratio and in addition offers the effects described above. Thus, with a variable-magnification optical system 11 according to the invention, zoom performance (magnification variation performance) has a greater meaning, achieving user benefits.

In the course of the description given hereinbefore, conditional formulae (A) to (E) have been described. Table 23 shows the values of conditional formulae (A) to (C) and (E) as actually observed in each of Examples 1 to 11. For the value of conditional formula (D), reference is to be made to the tables that have been referred to in the course of the description given hereinbefore.

On the other hand, Table 24 shows the values of f2, f1, f3, $\sqrt{fw \times ft}$, ft, and fw, which need to be known for the calculation of the values of conditional formulae (A) to (C) and (E). As will be understood from Table 23, the variable-magnification optical system 11 of Examples 1 to 11 all fulfill conditional formulae (A) to (C) and (E).

An image-taking apparatus according to the invention is an optical apparatus that optically captures an image of a subject and that then outputs it in the form of an electrical signal. Such an image-taking apparatus is used as a main component of a camera that is used to shoot still and moving pictures of a subject.

Examples of such cameras include: digital cameras, video cameras, surveillance cameras, vehicle-mounted cameras, cameras for videophones, and cameras for intercoms. Further examples of such cameras include cameras incorporated in or externally attached to personal computers, portable information appliances (that is, compact, portable information appliance terminals such as mobile computers, cellular phones, and personal digital assistances (PDAs)), and peripheral devices therefor (such as mouses, scanners, printers, and memories).

As these examples show, not only is it possible to build cameras by the use of an image-taking apparatus, it is also possible to incorporate an image-taking apparatus in various appliances to add camera capabilities thereto. It is thereby possible to build, for example, a digital appliance equipped with an image-capturing capability, such as a cellular phone equipped with a camera.

In the past, the term "digital camera" was used to refer exclusively to cameras that are dedicated to the recording of still pictures; now that digital still cameras and home-use digital movie cameras are available that can handle both still and moving pictures, the term has come to be used with no such connotation.

Accordingly, in the present specification, the term "digital camera" is used to denote any camera, be it a digital still camera, a digital movie camera, or a web camera (a camera, either open or private, that is connected to a device connected to a network to permit exchange of pictures, irrespective of whether the camera is connected to the network directly or via a device, such as a personal computer, capable of image processing) that incorporates, as its main components, an image-taking apparatus including an image-taking lens system for forming an optical image, an image sensor for converting the optical image into an electrical image signal, and other components.

A variable-magnification optical system 11 according to the invention is used in various image-taking apparatuses (such as silver-halide-film cameras and digital still cameras) and digital input devices (such as digital appliances equipped with an image-taking apparatus). By the use of a variable-magnification optical system 11 according to the invention, it is possible to make such image-taking apparatuses and the like compact.

Moreover, in an image-taking apparatus or like, it is possible to reduce the volume occupied by the variable-magnification optical system 11 within the limited space inside the housing. This makes it possible to arrange various components (such as electrical components) within an ample space inside the housing of an image-taking apparatuses and the like (that is, it is possible to efficiently use the space inside the housing). This makes it possible to realize an image-taking apparatus incorporating various components for high performance.

A digital camera 29 as shown in FIGS. 5 and 6 may be so constructed that, while the image sensor SR is kept stationary, zooming or the like is achieved by moving the first and third lens groups GR1 and GR3, which include an optical axis changing element (a optical prism PR or a reflective mirror MR). Alternatively, a digital camera 29 may be so constructed that, while the first and third lens groups GR1 and GR3, which include an optical axis changing element, is kept stationary, zooming or the like is achieved by moving the image sensor SR.

The present invention is useful in variable-magnification optical systems and in image-taking apparatuses incorporating such optical systems, and can alternatively be expressed as follows.

For further compactness, in a variable-magnification optical system according to the invention, the third lens group may include a second optical axis changing element.

In that case, the second optical axis changing element bends the optical axis, for example, by reflection. This makes the variable-magnification optical system bent, instead of straight. Thus, according to the invention, it is possible to make a variable-magnification optical system compact in one direction (for example, in the direction of the total length thereof).

In a variable-magnification optical system according to the invention, when the first and third lens groups move for zooming, the group-to-group distance between the first and third lens groups may be kept constant. For example, the first and third lens groups are linked together with a linking member so that they move together for zooming.

In that case, the structure (arrangement structure) for the arrangement of those two lens groups is simplified. Thus, the two lens groups can be housed in the same lens barrel. This makes the lens barrel compact.

In a variable-magnification optical system according to the invention, for higher telecentricity in the light exiting therefrom, a fourth lens group having a positive optical power may be disposed on the image side of the third lens group.

Needless to say, incorporating a variable-magnification optical system as described above, an image-taking apparatus according to the invention is compact and high-performance.

The embodiments, examples, and the like specifically described above are merely intended to make the technical idea of the present invention clear. The present invention, therefore, should not be interpreted narrowly within the extent of what is specifically described above, but should be interpreted to allow many modifications and variations within the scope of the appended claims.

TABLE 1

| Example 1 | | Focal Length Position | | | (W)~(M)~(T) | | |
|---|---|---|---|---|---|---|---|
| | | f[mm] | | | 6.42~19.90~42.37 | | |
| | | FNO | | | 2.87~4.54~5.15 | | |
| i | ri[mm] | i | di[mm] | i | Ni | vi | Element |
| 1 | 25.845 | 1 | 0.800 | 1 | 1.84666 | 23.78 | L1    GR1 |
| 2 | 13.592 | 2 | 2.500 | | | | |
| 3 | ∞ | 3 | 10.500 | 2 | 1.84666 | 23.78 | PR |

TABLE 1-continued

| | | | | | | | | |
|---|---|---|---|---|---|---|---|---|
| 4 | ∞ | | 4 | 0.300 | | | | |
| 5 | 40.234 | | 5 | 1.518 | 3 | 1.62162 | 52.18 | L2 |
| 6 | −79.125 | | 6 | 0.100 | | | | |
| 7 | 19.655 | | 7 | 2.044 | 4 | 1.49393 | 68.98 | L3 |
| 8 | −37.690 | | 8 | 0.600~7.401~12.233 | | | | |
| 9 | −39.951 | * | 9 | 0.800 | 5 | 1.86550 | 30.54 | L4 | GR2 |
| 10 | 6.849 | | 10 | 2.919 | | | | |
| 11 | −5.372 | | 11 | 0.700 | 6 | 1.48750 | 70.00 | L5 |
| 12 | 26.191 | | 12 | 0.010 | 7 | 1.51400 | 42.83 | |
| 13 | 26.191 | | 13 | 1.703 | 8 | 1.84666 | 23.78 | L6 |
| 14 | −13.441 | | 14 | 12.433~5.632~0.800 | | | | |
| 15 | ∞ | | 15 | 0.500 | | | ST | GR3 |
| 16 | 10.075 | * | 16 | 2.864 | 9 | 1.68238 | 46.68 | L7 |
| 17 | −10.343 | | 17 | 0.010 | 10 | 1.51400 | 42.83 | |
| 18 | −10.343 | | 18 | 0.700 | 11 | 1.79879 | 31.79 | L8 |
| 19 | −1367.035 | | 19 | 9.000 | | | | |
| 20 | 11.366 | * | 20 | 4.388 | 12 | 1.48749 | 70.44 | L9 |
| 21 | −5.803 | | 21 | 0.010 | 13 | 1.51400 | 42.83 | |
| 22 | −5.803 | | 22 | 0.700 | 14 | 1.87344 | 34.53 | L10 |
| 23 | −27.680 | | 23 | 1.340~19.690~25.105 | | | | |
| 24 | −25.520 | | 24 | 0.800 | 15 | 1.86683 | 31.14 | L11 | GR4 |
| 25 | −123.336 | | 25 | 0.100 | | | | |
| 26 | 15.311 | * | 26 | 3.000 | 16 | 1.53048 | 55.72 | L12 |
| 27 | −29.644 | * | 27 | 8.521~2.600~3.114 | | | | |
| 28 | ∞ | | 28 | 0.500 | 17 | 1.51680 | 64.20 | CG | SU5 |
| 29 | ∞ | | | | | | | |

TABLE 2

Example 1

| Aspherical Surface Data of Surface 9(i = 9) | | Aspherical Surface Data of Surface 26(i = 26) | |
|---|---|---|---|
| ∊ | −57.2352 | ∊ | 1.0000 |
| A4 | 0.15882965E−03 | A4 | 0.17474167E−03 |
| A6 | −0.20931606E−05 | A6 | 0.45181466E−05 |
| A8 | 0.91486827E−08 | A8 | −0.99350042E−07 |
| A10 | −0.61919454E−09 | A10 | −0.13011353E−08 |

| Aspherical Surface Data of Surface 16(i = 16) | | Aspherical Surface Data of Surface 27(i = 27) | |
|---|---|---|---|
| ∊ | 1.0000 | ∊ | 1.0000 |
| A4 | −0.59577286E−04 | A4 | 0.29000283E−03 |

TABLE 2-continued

Example 1

| A6 | −0.17872322E−06 | A6 | 0.42202831E−05 |
|---|---|---|---|
| A8 | 0.99574761E−08 | A8 | −0.36866613E−07 |
| A10 | −0.10774847E−09 | A10 | −0.51991943E−08 |

| Aspherical Surface Data of Surface 20(i = 20) | |
|---|---|
| ∊ | 1.0000 |
| A4 | 0.24168919E−04 |
| A6 | 0.50164245E−05 |
| A8 | −0.50460778E−07 |
| A10 | 0.10596959E−07 |

TABLE 3

| Example 2 | | | Focal Length Position f[mm] FNO | | | (W)~(M)~(T) 6.42~19.89~42.36 2.74~4.30~5.24 | | |
|---|---|---|---|---|---|---|---|---|
| i | ri[mm] | i | di[mm] | i | Ni | νi | Element | |
| 1 | 25.626 | 1 | 0.800 | 1 | 1.84666 | 23.78 | L1 | GR1 |
| 2 | 13.501 | 2 | 2.500 | | | | | |
| 3 | ∞ | 3 | 10.500 | 2 | 1.84666 | 23.78 | PR | |
| 4 | ∞ | 4 | 0.300 | | | | | |
| 5 | 45.796 | 5 | 1.515 | 3 | 1.64959 | 50.15 | L2 | |
| 6 | −77.773 | 6 | 0.100 | | | | | |
| 7 | 21.317 | 7 | 2.037 | 4 | 1.49098 | 69.64 | L3 | |
| 8 | −33.075 | 8 | 0.600~7.807~12.362 | | | | | |
| 9 | −54.932 | * | 9 | 0.800 | 5 | 1.86327 | 29.57 | L4 | GR2 |
| 10 | 6.826 | 10 | 2.351 | | | | | |
| 11 | −5.382 | 11 | 1.122 | 6 | 1.48750 | 70.00 | L5 | |
| 12 | 21.534 | 12 | 0.010 | 7 | 1.51400 | 42.83 | | |
| 13 | 21.534 | 13 | 1.748 | 8 | 1.84666 | 23.78 | L6 | |
| 14 | −14.655 | 14 | 12.562~5.355~0.800 | | | | | |
| 15 | ∞ | 15 | 0.500 | | | | ST | GR3 |
| 16 | 10.875 | * | 16 | 3.845 | 9 | 1.68970 | 47.74 | L7 |
| 17 | −9.571 | 17 | 0.010 | 10 | 1.51400 | 42.83 | | |
| 18 | −9.571 | 18 | 0.700 | 11 | 1.81695 | 29.81 | L8 | |
| 19 | −70.155 | 19 | 9.000 | | | | | |
| 20 | 11.002 | * | 20 | 5.000 | 12 | 1.48749 | 70.44 | L9 |

TABLE 3-continued

| | | | | | | | |
|---|---|---|---|---|---|---|---|
| 21 | −5.356 | 21 | 0.010 | 13 | 1.51400 | 42.83 | |
| 22 | −5.356 | 22 | 0.700 | 14 | 1.87537 | 35.64 | L10 |
| 23 | −41.330 | 23 | 1.251~16.433~24.224 | | | | |
| 24 | 16.044 * | 24 | 5.000 | 15 | 1.48749 | 70.44 | L11   GR4 |
| 25 | −267.212 * | 25 | 4.899~2.629~2.200 | | | | |
| 26 | ∞ | 26 | 0.500 | 16 | 1.51680 | 64.20 | CG   SU5 |
| 27 | ∞ | | | | | | |

TABLE 4

Example 2

| Aspherical Surface Data of Surface 9(i = 9) | | Aspherical Surface Data of Surface 24(i = 24) | |
|---|---|---|---|
| $\epsilon$ | −46.8957 | $\epsilon$ | 1.0000 |
| A4 | 0.16612137E−03 | A4 | 0.34828366E−04 |
| A6 | −0.30195691E−05 | A6 | 0.26647497E−05 |
| A8 | 0.10294541E−06 | A8 | −0.24037181E−06 |
| A10 | −0.58985283E−08 | A10 | 0.31168919E−08 |

| Aspherical Surface Data of Surface 16(i = 16) | | Aspherical Surface Data of Surface 25(i = 25) | |
|---|---|---|---|
| $\epsilon$ | 1.0000 | $\epsilon$ | 1.0000 |
| A4 | −0.60435282E−04 | A4 | 0.11578483E−03 |

TABLE 4-continued

Example 2

| | | | |
|---|---|---|---|
| A6 | −0.14662407E−06 | A6 | 0.10989257E−04 |
| A8 | 0.89430287E−08 | A8 | −0.11450034E−05 |
| A10 | −0.57567701E−010 | A10 | 0.21945455E−07 |

| Aspherical Surface Data of Surface 20(i = 20) | |
|---|---|
| $\epsilon$ | 1.0000 |
| A4 | 0.99687280E−04 |
| A6 | 0.79377958E−05 |
| A8 | −0.13714060E−06 |
| A10 | 0.18930633E−07 |

TABLE 5

| Example 3 | | Focal Length Position f[mm] FNO | | (W)~(M)~(T) 6.20~19.22~40.92 2.95~3.89~5.15 | | |
|---|---|---|---|---|---|---|
| i | ri[mm] | i | di[mm] | i | Ni   vi | Element |
| 1 | 43.945 | 1 | 1.000 | 1 | 1.84666  23.78 | L1   GR1 |
| 2 | 14.738 | 2 | 2.500 | | | |
| 3 | ∞ | 3 | 10.500 | 2 | 1.84666  23.78 | PR |
| 4 | ∞ | 4 | 0.300 | | | |
| 5 | 29.047 | 5 | 2.211 | 3 | 1.50361  66.96 | L2 |
| 6 | −23.867 | 6 | 0.100 | | | |
| 7 | 19.166 | 7 | 1.792 | 4 | 1.59788  54.21 | L3 |
| 8 | −1103.887 | 8 | 0.618~8.058~11.141 | | | |
| 9 | −92.087 * | 9 | 0.800 | 5 | 1.88300  40.80 | L4   GR2 |
| 10 | 6.538 | 10 | 3.258 | | | |
| 11 | −5.464 | 11 | 0.700 | 6 | 1.48749  70.44 | L5 |
| 12 | 21.910 | 12 | 0.010 | 7 | 1.51400  42.83 | |
| 13 | 21.910 | 13 | 1.616 | 8 | 1.84666  23.78 | L6 |
| 14 | −16.381 | 14 | 11.723~4.283~1.200 | | | |
| 15 | ∞ | 15 | 0.500 | | | ST   GR3 |
| 16 | 9.712 * | 16 | 2.795 | 9 | 1.51965  53.34 | L7 |
| 17 | −10.625 | 17 | 0.010 | 10 | 1.51400  42.83 | |
| 18 | −10.625 | 18 | 0.700 | 11 | 1.84849  27.07 | L8 |
| 19 | −21.963 | 19 | 9.000 | | | |
| 20 | 18.366 * | 20 | 1.801 | 12 | 1.48750  70.00 | L9 |
| 21 | −29.054 | 21 | 0.100 | | | |
| 22 | 46.731 | 22 | 2.620 | 13 | 1.49700  81.61 | L10 |
| 23 | −5.291 | 23 | 0.010 | 14 | 1.51400  42.83 | |
| 24 | −5.291 | 24 | 0.700 | 15 | 1.86028  38.20 | L11 |
| 25 | −110.496 | 25 | 1.546~10.431~25.999 | | | |
| 26 | 12.244 * | 26 | 4.068 | 16 | 1.48749  70.44 | L12   GR4 |
| 27 | 52.879 | 27 | 7.807~10.947~6.070 | | | |
| 28 | ∞ | 28 | 0.500 | 17 | 1.51680  64.20 | CG   SU5 |
| 29 | ∞ | | | | | |

TABLE 6

| Example 3 | | | |
|---|---|---|---|
| Aspherical Surface Data of Surface 9(i = 9) | | Aspherical Surface Data of Surface 20(i = 20) | |
| ε | −371.38 | ε | 1.0000 |
| A4 | 0.13198863E−03 | A4 | 0.21611656E−03 |
| A6 | −0.16010305E−05 | A6 | 0.95781187E−05 |
| A8 | −0.62426729E−07 | A8 | −0.21006691E−06 |
| A10 | 0.18494727E−08 | A10 | 0.19977665E−07 |

TABLE 6-continued

| Example 3 | | | |
|---|---|---|---|
| Aspherical Surface Data of Surface 16(i = 16) | | Aspherical Surface Data of Surface 26(i = 26) | |
| ε | 1.0000 | ε | 1.0000 |
| A4 | −0.11924623E−03 | A4 | −0.26101522E−04 |
| A6 | −0.48997232E−06 | A6 | 0.13312555E−06 |
| A8 | 0.17242597E−07 | A8 | −0.58207864E−08 |
| A10 | −0.48425913E−09 | A10 | −0.83031131E−10 |

TABLE 7

| Example 4 | | Focal Length Position | | | (W)~(M)~(T) | | |
|---|---|---|---|---|---|---|---|
| | | f[mm] | | | 8.10~25.10~53.45 | | |
| | | FNO | | | 3.15~4.88~5.15 | | |
| i | ri[mm] | i | di[mm] | i | Ni | vi | Element |
| 1 | 50.950 | 1 | 0.800 | 1 | 1.84666 | 23.82 | L1 | GR1 |
| 2 | 21.173 | 2 | 2.500 | | | | |
| 3 | ∞ | 3 | 14.000 | 2 | 1.84666 | 23.78 | PR |
| 4 | ∞ | 4 | 0.300 | | | | |
| 5 | 58.530 | 5 | 2.142 | 3 | 1.53437 | 61.67 | L2 |
| 6 | −31.696 | 6 | 0.100 | | | | |
| 7 | 18.750 | 7 | 2.190 | 4 | 1.49700 | 81.61 | L3 |
| 8 | 451.038 | 8 | 0.601~8.131~13.990 | | | | |
| 9 | 397.251 | 9 | 0.800 | 5 | 1.77250 | 49.77 | L4 | GR2 |
| 10 | 7.579 * | 10 | 2.875 | | | | |
| 11 | −8.879 | 11 | 0.700 | 6 | 1.48749 | 70.44 | L5 |
| 12 | 13.313 | 12 | 0.010 | 7 | 1.51400 | 42.83 | |
| 13 | 13.313 | 13 | 1.696 | 8 | 1.84668 | 23.83 | L6 |
| 14 | −152.442 | 14 | 14.189~6.660~0.800 | | | | |
| 15 | ∞ | 15 | 0.500 | | | | ST | GR3 |
| 16 | 8.643 * | 16 | 2.567 | 9 | 1.69350 | 53.39 | L7 |
| 17 | ∞ | 17 | 0.010 | 10 | 1.51400 | 42.83 | |
| 18 | ∞ | 18 | 10.000 | 11 | 1.84666 | 23.78 | PR |
| 19 | ∞ | 19 | 0.380 | | | | |
| 20 | 12.454 | 20 | 2.480 | 12 | 1.48767 | 70.40 | L8 |
| 21 | −6.038 | 21 | 0.010 | 13 | 1.51400 | 42.83 | |
| 22 | −6.038 | 22 | 0.700 | 14 | 1.85011 | 24.89 | L9 |
| 23 | 216.003 | 23 | 0.453 | | | | |
| 24 | −24.235 | 24 | 0.800 | 15 | 1.87594 | 35.98 | L10 |
| 25 | 47.926 | 25 | 3.324 | | | | |
| 26 | 12.460 * | 26 | 2.031 | 16 | 1.62017 | 24.01 | L11 |
| 27 | 42.795 * | 27 | 1.468~17.723~20.079 | | | | |
| 28 | 12.815 * | 28 | 3.749 | 17 | 1.53048 | 55.72 | L12 | GR4 |
| 29 | −21.925 * | 29 | 1.000 | | | | |
| 30 | −19.794 | 30 | 1.000 | 18 | 1.84666 | 23.82 | L13 |
| 31 | −235.550 | 31 | 2.229~1.565~2.704 | | | | |
| 32 | ∞ | 32 | 0.500 | 19 | 1.51680 | 64.20 | CG | SU5 |
| 33 | ∞ | | | | | | |

TABLE 8

Example 4

| Aspherical Surface Data of Surface 10(i = 10) | | Aspherical Surface Data of Surface 27(i = 27) | |
|---|---|---|---|
| $\epsilon$ | 1.0000 | $\epsilon$ | 1.0000 |
| A4 | −0.41219237E−04 | A4 | −0.38494478E−03 |
| A6 | −0.13871421E−05 | A6 | −0.14104688E−04 |
| A8 | 0.26102532E−07 | A8 | 0.15157903E−06 |
| A10 | 0.38454974E−08 | A10 | −0.57939620E−08 |

| Aspherical Surface Data of Surface 16(i = 16) | | Aspherical Surface Data of Surface 28(i = 28) | |
|---|---|---|---|
| $\epsilon$ | 1.0000 | $\epsilon$ | 1.0000 |
| A4 | −0.99341543E−04 | A4 | 0.24897817E−05 |

TABLE 8-continued

Example 4

| | | | |
|---|---|---|---|
| A6 | −0.87994965E−06 | A6 | 0.83881297E−06 |
| A8 | 0.14095947E−07 | A8 | −0.14212718E−06 |
| A10 | −0.48483908E−09 | A10 | 0.18928651E−08 |

| Aspherical Surface Data of Surface 26(i = 26) | | Aspherical Surface Data of Surface 29(i = 29) | |
|---|---|---|---|
| $\epsilon$ | 1.0000 | $\epsilon$ | 1.0000 |
| A4 | −0.62593936E−03 | A4 | 0.10391893E−03 |
| A6 | −0.12198423E−04 | A6 | −0.45223886E−05 |
| A8 | 0.34700666E−07 | | |
| A10 | −0.78808573E−08 | | |

TABLE 9

| Example 5 | Focal Length Position | (W)~(M)~(T) |
|---|---|---|
| | f[mm] | 7.98~17.55~37.74 |
| | FNO | 3.31~4.13~5.20 |

| i | ri[mm] | i | di[mm] | i | Ni | vi | Element | |
|---|---|---|---|---|---|---|---|---|
| 1 | 43.419 | 1 | 0.800 | 1 | 1.92286 | 20.88 | L1 | GR1 |
| 2 | 19.667 | 2 | 2.150 | | | | | |
| 3 | ∞ | 3 | 12.349 | 2 | 1.88300 | 40.79 | PR | |
| 4 | ∞ | 4 | 0.100 | | | | | |
| 5 | 30.532 | 5 | 2.016 | 3 | 1.58913 | 61.25 | L2 | |
| 6 | −40.926 | 6 | 0.100 | | | | | |
| 7 | 16.808 | 7 | 1.757 | 4 | 1.49700 | 81.61 | L3 | |
| 8 | 99.776 | 8 | 0.745~5.910~9.810 | | | | | |
| 9 | −124.542 | 9 | 0.800 | 5 | 1.77250 | 49.77 | L4 | GR2 |
| 10 | 7.058 * | 10 | 2.378 | | | | | |
| 11 | −9.524 | 11 | 1.038 | 6 | 1.72916 | 54.67 | L5 | |
| 12 | 12.650 | 12 | 0.010 | 7 | 1.51400 | 42.83 | | |
| 13 | 12.650 | 13 | 1.476 | 8 | 1.92286 | 20.88 | L6 | |
| 14 | −48.404 | 14 | 10.048~4.883~0.984 | | | | | |
| 15 | ∞ | 15 | 0.500 | | | | ST | GR3 |
| 16 | 11.975 * | 16 | 4.379 | 9 | 1.69350 | 53.39 | L7 | |
| 17 | −10.341 | 17 | 0.010 | 10 | 1.51400 | 42.83 | | |
| 18 | −10.341 | 18 | 0.700 | 11 | 1.80518 | 25.46 | L8 | |
| 19 | −43.772 | 19 | 9.841 | | | | | |
| 20 | 18.390 | 20 | 0.700 | 12 | 1.88300 | 40.79 | L9 | |
| 21 | 10.262 | 21 | 0.010 | 13 | 1.51400 | 42.83 | | |
| 22 | 10.262 | 22 | 2.935 | 14 | 1.58144 | 40.89 | L10 | |
| 23 | −23.748 | 23 | 0.903 | | | | | |
| 24 | −9.495 | 24 | 1.271 | 15 | 1.80610 | 33.27 | L11 | |
| 25 | −55.610 | 25 | 0.432 | | | | | |
| 26 | 26.936 | 26 | 2.227 | 16 | 1.49700 | 81.61 | L12 | |
| 27 | −19.736 | 27 | 3.413~14.807~29.913 | | | | | |
| 28 | 19.346 * | 28 | 4.000 | 17 | 1.53048 | 55.72 | L13 | GR4 |
| 29 | −16.159 * | 29 | 0.270 | | | | | |
| 30 | −200.000 | 30 | 0.893 | 18 | 1.84666 | 23.78 | L14 | |
| 31 | 18.290 | 31 | 6.000 | | | | | |
| 32 | ∞ | 32 | 0.500 | 19 | 1.51680 | 64.20 | CG | |
| 33 | ∞ | | | | | | | |

TABLE 10

Example 5

| Aspherical Surface Data of Surface 10(i = 10) | | Aspherical Surface Data of Surface 28(i = 28) | |
|---|---|---|---|
| ε | 1.0000 | ε | 1.0000 |
| A4 | −0.10197203E−03 | A4 | −0.15307901E−04 |
| A6 | −0.59864948E−05 | A6 | −0.16093656E−04 |
| A8 | 0.63239314E−06 | A8 | 0.50352433E−06 |
| A10 | −0.22955553E−07 | A10 | −0.11138404E−07 |

TABLE 10-continued

Example 5

| Aspherical Surface Data of Surface 16(i = 16) | | Aspherical Surface Data of Surface 29(i = 29) | |
|---|---|---|---|
| ε | 1.0000 | ε | 1.0000 |
| A4 | −0.90047005E−04 | A4 | 0.19494141E−03 |
| A6 | 0.10298751E−05 | A6 | −0.12810081E−04 |
| A8 | −0.67772055E−07 | A8 | 0.18629352E−06 |
| A10 | 0.20176346E−08 | A10 | −0.38610777E−08 |

TABLE 11

| Example 6 | | Focal Length Position | | (W)~(M)~(T) | | |
|---|---|---|---|---|---|---|
| | | f[mm] | | 7.83~24.24~44.26 | | |
| | | FNO | | 3.32~4.59~5.50 | | |

| i | ri[mm] | | i | di[mm] | i | Ni | νi | Element | |
|---|---|---|---|---|---|---|---|---|---|
| 1 | 41.341 | | 1 | 0.800 | 1 | 1.92286 | 20.88 | L1 | GR1 |
| 2 | 20.309 | | 2 | 2.150 | | | | | |
| 3 | ∞ | | 3 | 12.000 | 2 | 1.88300 | 40.79 | PR | |
| 4 | ∞ | | 4 | 0.100 | | | | | |
| 5 | 32.423 | | 5 | 1.862 | 3 | 1.58913 | 61.25 | L2 | |
| 6 | −57.490 | | 6 | 0.100 | | | | | |
| 7 | 15.686 | | 7 | 1.857 | 4 | 1.49700 | 81.61 | L3 | |
| 8 | 122.827 | | 8 | 0.608~7.691~10.573 | | | | | |
| 9 | 105.786 | | 9 | 0.800 | 5 | 1.77250 | 49.77 | L4 | GR2 |
| 10 | 6.480 | * | 10 | 2.162 | | | | | |
| 11 | −8.696 | | 11 | 0.700 | 6 | 1.72916 | 54.67 | L5 | |
| 12 | 12.191 | | 12 | 0.010 | 7 | 1.51400 | 42.83 | | |
| 13 | 12.191 | | 13 | 1.481 | 8 | 1.92286 | 20.88 | L6 | |
| 14 | −46.939 | | 14 | 10.872~3.789~0.907 | | | | | |
| 15 | ∞ | | 15 | 0.500 | | | | ST | GR3 |
| 16 | 11.433 | * | 16 | 3.481 | 9 | 1.69350 | 53.39 | L7 | |
| 17 | −10.070 | | 17 | 0.010 | 10 | 1.51400 | 42.83 | | |
| 18 | −10.070 | | 18 | 0.700 | 11 | 1.80518 | 25.46 | L8 | |
| 19 | −42.498 | | 19 | 9.840 | | | | | |
| 20 | 15.469 | | 20 | 0.700 | 12 | 1.88300 | 40.79 | L9 | |
| 21 | 8.807 | | 21 | 0.010 | 13 | 1.51400 | 42.83 | | |
| 22 | 8.807 | | 22 | 2.839 | 14 | 1.58144 | 40.89 | L10 | |
| 23 | −28.176 | | 23 | 0.828 | | | | | |
| 24 | −9.309 | | 24 | 0.700 | 15 | 1.80610 | 33.27 | L11 | |
| 25 | −45.550 | | 25 | 0.486 | | | | | |
| 26 | 20.950 | | 26 | 2.449 | 16 | 1.49700 | 81.61 | L12 | |
| 27 | −25.746 | | 27 | 1.839~17.111~28.339 | | | | | |
| 28 | 47.082 | * | 28 | 4.000 | 17 | 1.53048 | 55.72 | L13 | GR4 |
| 29 | −13.563 | * | 29 | 0.122 | | | | | |
| 30 | −200.000 | | 30 | 1.000 | 18 | 1.84666 | 23.78 | L14 | |
| 31 | 22.980 | | 31 | 6.000 | | | | | |
| 32 | ∞ | | 32 | 0.500 | 19 | 1.51680 | 64.20 | CG | |
| 33 | ∞ | | | | | | | | |

TABLE 12

Example 6

| Aspherical Surface Data of Surface 10(i = 10) | | Aspherical Surface Data of Surface 28(i = 28) | |
|---|---|---|---|
| ϵ | 1.0000 | ϵ | 1.0000 |
| A4 | −0.99302225E−04 | A4 | −0.87972213E−04 |
| A6 | −0.70030523E−05 | A6 | −0.18945029E−04 |
| A8 | 0.67791112E−06 | A8 | 0.64601763E−06 |
| A10 | −0.22461986E−07 | A10 | −0.15667561E−07 |

TABLE 12-continued

Example 6

| Aspherical Surface Data of Surface 16(i = 16) | | Aspherical Surface Data of Surface 29(i = 29) | |
|---|---|---|---|
| ϵ | 1.0000 | ϵ | 1.0000 |
| A4 | −0.94093498E−04 | A4 | 0.21761696E−03 |
| A6 | 0.90824359E−06 | A6 | −0.16245656E−04 |
| A8 | −0.75884840E−07 | A8 | 0.30350491E−06 |
| A10 | 0.25367720E−08 | A10 | −0.57410322E−08 |

TABLE 13

| Example 7 | | Focal Length Position | | (W)~(M)~(T) | | |
|---|---|---|---|---|---|---|
| | | f[mm] | | 7.99~19.17~45.16 | | |
| | | FNO | | 3.35~4.42~5.93 | | |

| i | ri[mm] | | i | di[mm] | i | Ni | vi | Element | |
|---|---|---|---|---|---|---|---|---|---|
| 1 | 44.704 | | 1 | 0.800 | 1 | 1.92286 | 20.88 | L1 | GR1 |
| 2 | 21.386 | | 2 | 2.450 | | | | | |
| 3 | ∞ | | 3 | 11.400 | 2 | 1.88300 | 40.79 | PR | |
| 4 | ∞ | | 4 | 0.195 | | | | | |
| 5 | 36.489 | | 5 | 1.918 | 3 | 1.58913 | 61.25 | L2 | |
| 6 | −44.135 | | 6 | 0.129 | | | | | |
| 7 | 18.219 | | 7 | 1.757 | 4 | 1.49700 | 81.61 | L3 | |
| 8 | 214.691 | | 8 | 0.801~6.709~11.275 | | | | | |
| 9 | −48.164 | | 9 | 0.800 | 5 | 1.77250 | 49.77 | L4 | GR2 |
| 10 | 7.688 | * | 10 | 3.181 | | | | | |
| 11 | −10.526 | | 11 | 0.700 | 6 | 1.72916 | 54.67 | L5 | |
| 12 | 15.314 | | 12 | 0.010 | 7 | 1.51400 | 42.83 | | |
| 13 | 15.314 | | 13 | 1.471 | 8 | 1.92286 | 20.88 | L6 | |
| 14 | −33.140 | | 14 | 11.424~5.516~0.950 | | | | | |
| 15 | ∞ | | 15 | 1.000 | | | | ST | GR3 |
| 16 | 14.709 | * | 16 | 3.157 | 9 | 1.69350 | 53.39 | L7 | |
| 17 | −11.220 | | 17 | 0.010 | 10 | 1.51400 | 42.83 | | |
| 18 | −11.220 | | 18 | 2.948 | 11 | 1.80518 | 25.46 | L8 | |
| 19 | −21.569 | | 19 | 10.200 | | | | | |
| 20 | 16.714 | | 20 | 0.700 | 12 | 1.80518 | 25.46 | L9 | |
| 21 | 5.882 | | 21 | 0.010 | 13 | 1.51400 | 42.83 | | |
| 22 | 5.882 | | 22 | 2.854 | 14 | 1.48749 | 70.44 | L10 | |
| 23 | 36.212 | | 23 | 3.282 | | | | | |
| 24 | 20.118 | * | 24 | 2.054 | 15 | 1.60700 | 27.00 | L11 | |
| 25 | 37.298 | * | 25 | 0.800~11.677~25.629 | | | | | |
| 26 | 22.688 | * | 26 | 6.000 | 16 | 1.53048 | 55.72 | L12 | GR4 |
| 27 | ∞ | * | 27 | 3.797 | | | | | |
| 28 | ∞ | | 28 | 0.500 | 17 | 1.51680 | 64.20 | CG | |
| 29 | ∞ | | | | | | | | |

TABLE 14

Example 7

| Aspherical Surface Data of Surface 10(i = 10) | | Aspherical Surface Data of Surface 25(i = 25) | |
|---|---|---|---|
| ε | 1.0000 | ε | 1.0000 |
| A4 | −0.15663490E−03 | A4 | −0.41777597E−03 |
| A6 | −0.17225086E−05 | A6 | −0.19349262E−05 |
| A8 | 0.13760168E−07 | A8 | 0.15808145E−06 |
| A10 | −0.19099660E−08 | A10 | −0.91796432E−09 |

| Aspherical Surface Data of Surface 16(i = 16) | | Aspherical Surface Data of Surface 26(i = 26) | |
|---|---|---|---|
| ε | 1.0000 | ε | 1.0000 |
| A4 | −0.10403172E−03 | A4 | −0.85892111E−04 |

TABLE 14-continued

Example 7

| | | | |
|---|---|---|---|
| A6 | 0.29726559E−06 | A6 | 0.42881465E−05 |
| A8 | −0.15823879E−07 | A8 | −0.38774715E−06 |
| A10 | 0.39989178E−09 | A10 | 0.57234103E−08 |

| Aspherical Surface Data of Surface 24(i = 24) | | Aspherical Surface Data of Surface 27(i = 27) | |
|---|---|---|---|
| ε | 1.0000 | ε | 1.0000 |
| A4 | −0.27390750E−03 | A4 | 0.75585543E−04 |
| A6 | −0.15628240E−05 | A6 | 0.13968653E−04 |
| A8 | 0.19691831E−06 | A8 | −0.12010832E−05 |
| A10 | −0.74042374E−09 | A10 | 0.19260161E−07 |

TABLE 15

| Example 8 | | | Focal Length Position | | (W)~(M)~(T) | | |
|---|---|---|---|---|---|---|---|
| | | | f[mm] | | 7.99~24.73~52.67 | | |
| | | | FNO | | 3.19~4.69~5.78 | | |

| i | ri[mm] | i | di[mm] | i | Ni | νi | Element |
|---|---|---|---|---|---|---|---|
| 1 | 39.700 | 1 | 0.800 | 1 | 1.92286 | 20.88 | L1 GR1 |
| 2 | 20.903 | 2 | 2.150 | | | | |
| 3 | ∞ | 3 | 12.000 | 2 | 1.88300 | 40.79 | PR |
| 4 | ∞ | 4 | 0.149 | | | | |
| 5 | 44.432 | 5 | 1.768 | 3 | 1.58913 | 61.25 | L2 |
| 6 | −45.713 | 6 | 0.100 | | | | |
| 7 | 17.910 | 7 | 1.839 | 4 | 1.49700 | 81.61 | L3 |
| 8 | −2118.420 | 8 | 0.697~7.698~11.717 | | | | |
| 9 | −73.605 | 9 | 0.800 | 5 | 1.77250 | 49.77 | L4 GR2 |
| 10 | 7.922 * | 10 | 2.473 | | | | |
| 11 | −10.526 | 11 | 0.700 | 6 | 1.72916 | 54.67 | L5 |
| 12 | 13.422 | 12 | 0.010 | 7 | 1.51400 | 42.83 | |
| 13 | 13.422 | 13 | 1.496 | 8 | 1.92286 | 20.88 | L6 |
| 14 | −47.090 | 14 | 11.820~4.819~0.800 | | | | |
| 15 | ∞ | 15 | 0.500 | | | | ST GR3 |
| 16 | 13.501 * | 16 | 3.007 | 9 | 1.69350 | 53.39 | L7 |
| 17 | −11.543 | 17 | 0.010 | 10 | 1.51400 | 42.83 | |
| 18 | −11.543 | 18 | 1.205 | 11 | 1.80518 | 25.46 | L8 |
| 19 | −24.338 | 19 | 9.311 | | | | |
| 20 | 13.513 | 20 | 0.700 | 12 | 1.80518 | 25.46 | L9 |
| 21 | 6.079 | 21 | 0.010 | 13 | 1.51400 | 42.83 | |
| 22 | 6.079 | 22 | 2.618 | 14 | 1.48749 | 70.44 | L10 |
| 23 | 21.534 | 23 | 4.284 | | | | |
| 24 | 60.095 * | 24 | 3.000 | 15 | 1.60700 | 27.00 | L11 |
| 25 | −1816.893 * | 25 | 0.800~16.148~27.300 | | | | |
| 26 | 13.759 * | 26 | 5.034 | 16 | 1.53048 | 55.72 | L12 GR4 |
| 27 | −88.521 * | 27 | 1.000 | | | | |
| 28 | −200.000 | 28 | 1.206 | 17 | 1.84666 | 23.78 | L13 |
| 29 | 44.381 | 29 | 1.502 | | | | |
| 30 | ∞ | 30 | 0.500 | 18 | 1.51680 | 64.20 | CG |
| 31 | ∞ | | | | | | |

TABLE 16

Example 8

| Aspherical Surface Data of Surface 10(i = 10) | | Aspherical Surface Data of Surface 25(i = 25) | |
|---|---|---|---|
| $\epsilon$ | 1.0000 | $\epsilon$ | 1.0000 |
| A4 | −0.10347630E−03 | A4 | −0.52970460E−03 |
| A6 | 0.10571704E−07 | A6 | 0.17563218E−06 |
| A8 | −0.10147936E−06 | A8 | −0.61275210E−07 |
| A10 | 0.40490268E−08 | A10 | 0.86383888E−09 |

| Aspherical Surface Data of Surface 16(i = 16) | | Aspherical Surface Data of Surface 26(i = 26) | |
|---|---|---|---|
| $\epsilon$ | 1.0000 | $\epsilon$ | 1.0000 |
| A4 | −0.10745558E−03 | A4 | 0.82635382E−04 |

TABLE 16-continued

Example 8

| A6 | 0.94049800E−07 | A6 | −0.37172310E−05 |
|---|---|---|---|
| A8 | −0.72034064E−08 | A8 | −0.29629917E−07 |
| A10 | 0.24899348E−09 | A10 | −0.19532084E−08 |

| Aspherical Surface Data of Surface 24(i = 24) | | Aspherical Surface Data of Surface 27(i = 27) | |
|---|---|---|---|
| $\epsilon$ | 1.0000 | $\epsilon$ | 1.0000 |
| A4 | −0.48200103E−03 | A4 | 0.46636778E−03 |
| A6 | 0.23899796E−06 | A6 | 0.33804543E−05 |
| A8 | −0.14206418E−06 | A8 | −0.10852266E−05 |
| A10 | 0.27280903E−08 | A10 | 0.15300655E−07 |

TABLE 17

| Example 9 | Focal Length Position | (W)~(M)~(T) |
|---|---|---|
| | f[mm] | 8.10~25.10~53.45 |
| | FNO | 2.71~4.11~5.15 |

| i | ri[mm] | | i | di[mm] | i | Ni | vi | Element | |
|---|---|---|---|---|---|---|---|---|---|
| 1 | 28.794 | | 1 | 0.800 | 1 | 1.92286 | 20.88 | L1 | GR1 |
| 2 | 17.862 | | 2 | 3.024 | | | | | |
| 3 | ∞ | | 3 | 13.400 | 2 | 1.72916 | 54.67 | PR | |
| 4 | ∞ | | 4 | 0.200 | | | | | |
| 5 | 66.289 | | 5 | 1.652 | 3 | 1.62041 | 60.34 | L2 | |
| 6 | −56.704 | | 6 | 0.100 | | | | | |
| 7 | 21.375 | | 7 | 2.221 | 4 | 1.49700 | 81.61 | L3 | |
| 8 | −65.593 | | 8 | 0.600~7.765~11.935 | | | | | |
| 9 | −52.828 | | 9 | 1.281 | 5 | 1.77250 | 49.77 | L4 | GR2 |
| 10 | 9.133 | * | 10 | 2.444 | | | | | |
| 11 | −9.616 | | 11 | 0.700 | 6 | 1.83481 | 42.72 | L5 | |
| 12 | 16.877 | | 12 | 0.010 | 7 | 1.51400 | 42.83 | | |
| 13 | 16.877 | | 13 | 1.790 | 8 | 1.92286 | 20.88 | L6 | |
| 14 | −21.804 | | 14 | 12.135~4.970~0.800 | | | | | |
| 15 | ∞ | | 15 | 0.500 | | | | ST | GR3 |
| 16 | 13.775 | * | 16 | 2.868 | 9 | 1.69350 | 53.39 | L7 | |
| 17 | −11.093 | | 17 | 0.010 | 10 | 1.51400 | 42.83 | | |
| 18 | −11.093 | | 18 | 0.700 | 11 | 1.80518 | 25.46 | L8 | |
| 19 | −22.342 | | 19 | 10.082 | | | | | |
| 20 | 19.314 | | 20 | 0.700 | 12 | 1.80518 | 25.46 | L9 | |
| 21 | 6.173 | | 21 | 0.010 | 13 | 1.51400 | 42.83 | | |
| 22 | 6.173 | | 22 | 5.801 | 14 | 1.48749 | 70.44 | L10 | |
| 23 | 15.109 | | 23 | 1.734 | | | | | |
| 24 | 12.411 | * | 24 | 2.092 | 15 | 1.60700 | 27.00 | L11 | |
| 25 | 26.761 | * | 25 | 0.800~15.919~27.300 | | | | | |
| 26 | 12.442 | * | 26 | 3.808 | 16 | 1.53048 | 55.72 | L12 | GR4 |
| 27 | −43.564 | * | 27 | 0.999 | | | | | |
| 28 | −200.000 | | 28 | 1.090 | 17 | 1.84666 | 23.78 | L13 | |
| 29 | 29.288 | | 29 | 1.955 | | | | | |
| 30 | ∞ | | 30 | 0.500 | 18 | 1.51680 | 64.20 | CG | |
| 31 | ∞ | | | | | | | | |

TABLE 18

Example 9

| Aspherical Surface Data of Surface 10(i = 10) | | Aspherical Surface Data of Surface 25(i = 25) | |
|---|---|---|---|
| ε | 1.0000 | ε | 1.0000 |
| A4 | −0.11251572E−03 | A4 | −0.38660182E−03 |
| A6 | 0.81065978E−06 | A6 | −0.81368352E−05 |
| A8 | −0.20573522E−06 | A8 | 0.28754443E−06 |
| A10 | 0.89121016E−08 | A10 | −0.23391449E−08 |

| Aspherical Surface Data of Surface 16(i = 16) | | Aspherical Surface Data of Surface 26(i = 26) | |
|---|---|---|---|
| ε | 1.0000 | ε | 1.0000 |
| A4 | −0.11389588E−03 | A4 | 0.36504125E−03 |

TABLE 18-continued

Example 9

| A6 | 0.30155805E−06 | A6 | −0.74333710E−05 |
|---|---|---|---|
| A8 | −0.16602730E−07 | A8 | −0.41127534E−07 |
| A10 | 0.33990965E−09 | A10 | −0.34151284E−08 |

| Aspherical Surface Data of Surface 24(i = 24) | | Aspherical Surface Data of Surface 27(i = 27) | |
|---|---|---|---|
| ε | 1.0000 | ε | 1.0000 |
| A4 | −0.32855269E−03 | A4 | 0.98907401E−03 |
| A6 | −0.61225955E−05 | A6 | −0.70237988E−05 |
| A8 | 0.20169935E−06 | A8 | −0.12081571E−05 |
| A10 | −0.32385413E−09 | A10 | 0.18264023E−07 |

TABLE 19

| Example 10 | Focal Length Position | (W)~(M)~(T) |
|---|---|---|
| | f[mm] | 6.30~19.52~41.57 |
| | FNO | 2.66~3.90~5.15 |

| i | ri[mm] | i | di[mm] | i | Ni | vi | Eelement | |
|---|---|---|---|---|---|---|---|---|
| 1 | 48.110 | 1 | 0.800 | 1 | 1.92286 | 20.88 | L1 | GR1 |
| 2 | 19.270 | 2 | 2.000 | | | | | |
| 3 | ∞ | 3 | 10.800 | 2 | 1.88300 | 40.79 | PR | |
| 4 | ∞ | 4 | 0.127 | | | | | |
| 5 | 40.997 | 5 | 1.901 | 3 | 1.58913 | 61.25 | L2 | |
| 6 | −30.751 | 6 | 0.100 | | | | | |
| 7 | 15.739 | 7 | 1.871 | 4 | 1.49700 | 81.61 | L3 | |
| 8 | 170.924 | 8 | 0.600~6.966~10.150 | | | | | |
| 9 | 140.361 | 9 | 0.800 | 5 | 1.77250 | 49.77 | L4 | GR2 |
| 10 | 6.442 * | 10 | 2.185 | | | | | |
| 11 | −7.197 | 11 | 0.700 | 6 | 1.72916 | 54.67 | L5 | |
| 12 | 12.245 | 12 | 0.010 | 7 | 1.51400 | 42.83 | | |
| 13 | 12.245 | 13 | 1.641 | 8 | 1.92286 | 20.88 | L6 | |
| 14 | −30.167 | 14 | 10.377~4.012~0.827 | | | | | |
| 15 | ∞ | 15 | 0.500 | | | | ST | GR3 |
| 16 | 12.223 * | 16 | 2.758 | 9 | 1.69350 | 53.39 | L7 | |
| 17 | −10.946 | 17 | 0.010 | 10 | 1.51400 | 42.83 | | |
| 18 | −10.946 | 18 | 0.988 | 11 | 1.80518 | 25.46 | L8 | |
| 19 | −24.189 | 19 | 9.009 | | | | | |
| 20 | 10.533 | 20 | 1.000 | 12 | 1.80518 | 25.46 | L9 | |
| 21 | 4.830 | 21 | 0.010 | 13 | 1.51400 | 42.83 | | |
| 22 | 4.830 | 22 | 3.677 | 14 | 1.48749 | 70.44 | L10 | |
| 23 | 13.721 | 23 | 1.000 | | | | | |
| 24 | 15.633 * | 24 | 2.433 | 15 | 1.60700 | 27.00 | L11 | |
| 25 | 57.853 * | 25 | 1.704~14.872~28.205 | | | | | |
| 26 | 13.095 * | 26 | 3.158 | 16 | 1.53048 | 55.72 | L12 | GR4 |
| 27 | −16.163 * | 27 | 0.781 | | | | | |
| 28 | −11.990 | 28 | 1.000 | 17 | 1.84666 | 23.78 | L13 | |
| 29 | −45.718 | 29 | 2.052 | | | | | |
| 30 | ∞ | 30 | 0.500 | 18 | 1.51680 | 64.20 | CG | |
| 31 | ∞ | | | | | | | |

TABLE 20

Example 10

| Aspherical Surface Data of Surface 10(i = 10) | | Aspherical Surface Data of Surface 25(i = 25) | |
|---|---|---|---|
| ε  | 1.0000 | ε  | 1.0000 |
| A4 | −0.10732497E−03 | A4 | −0.56438517E−03 |
| A6 | 0.57313839E−06 | A6 | −0.13991709E−04 |
| A8 | −0.42087595E−06 | A8 | 0.48071072E−06 |
| A10 | 0.36617830E−07 | A10 | −0.10628856E−07 |

| Aspherical Surface Data of Surface 16(i = 16) | | Aspherical Surface Data of Surface 26(i = 26) | |
|---|---|---|---|
| ε  | 1.0000 | ε  | 1.0000 |
| A4 | −0.14050118E−03 | A4 | 0.94933667E−04 |

TABLE 20-continued

Example 10

| A6 | 0.15126826E−06 | A6 | −0.20612676E−05 |
|---|---|---|---|
| A8 | −0.17592819E−07 | A8 | −0.36313239E−06 |
| A10 | 0.61027539E−09 | A10 | −0.18922759E−07 |

| Aspherical Surface Data of Surface 24(i = 24) | | Aspherical Surface Data of Surface 27(i = 27) | |
|---|---|---|---|
| ε  | 1.0000 | ε  | 1.0000 |
| A4 | −0.39055016E−03 | A4 | 0.18297925E−03 |
| A6 | −0.83755556E−05 | A6 | 0.19313027E−04 |
| A8 | 0.34012017E−06 | A8 | −0.34461882E−05 |
| A10 | 0.10816659E−08 | A10 | 0.67376749E−07 |

TABLE 21

| Example 11 | Focal Length Position | (W)~(M)~(T) |
|---|---|---|
| | f[mm] | 7.99~19.17~45.16 |
| | FNO | 3.77~5.09~5.20 |

| i | ri[mm] | | i | di[mm] | i | Ni | νi | Element | |
|---|---|---|---|---|---|---|---|---|---|
| 1 | 47.775 | | 1 | 0.800 | 1 | 1.92286 | 20.88 | L1 | GR1 |
| 2 | 20.558 | | 2 | 2.450 | | | | | |
| 3 | ∞ | | 3 | 14.000 | 2 | 1.88300 | 40.79 | PR | |
| 4 | ∞ | | 4 | 0.100 | | | | | |
| 5 | 36.725 | | 5 | 1.908 | 3 | 1.63854 | 55.45 | L2 | |
| 6 | −42.803 | | 6 | 0.100 | | | | | |
| 7 | 21.430 | | 7 | 1.657 | 4 | 1.49700 | 81.61 | L3 | |
| 8 | 286.719 | | 8 | 0.649~7.285~14.915 | | | | | |
| 9 | −382.266 | | 9 | 0.800 | 5 | 1.77250 | 49.77 | L4 | GR2 |
| 10 | 7.035 | * | 10 | 2.004 | | | | | |
| 11 | −7.645 | | 11 | 0.700 | 6 | 1.51680 | 64.20 | L5 | |
| 12 | 12.557 | | 12 | 0.010 | 7 | 1.51400 | 42.83 | | |
| 13 | 12.557 | | 13 | 1.502 | 8 | 1.84666 | 23.78 | L6 | |
| 14 | −59.208 | | 14 | 11.167~6.009~0.950 | | | | | |
| 15 | ∞ | | 15 | 1.000 | | | | ST | GR3 |
| 16 | 7.807 | * | 16 | 2.332 | 9 | 1.58913 | 61.25 | L7 | |
| 17 | −8.642 | | 17 | 0.010 | 10 | 1.51400 | 42.83 | | |
| 18 | −8.642 | | 18 | 0.700 | 11 | 1.83500 | 42.98 | L8 | |
| 19 | −24.972 | | 19 | 5.765 | | | | | |
| 20 | 9.133 | | 20 | 3.437 | 12 | 1.48749 | 70.44 | L9 | |
| 21 | −5.326 | | 21 | 0.010 | 13 | 1.51400 | 42.83 | | |
| 22 | −5.326 | | 22 | 0.700 | 14 | 1.80610 | 33.27 | L10 | |
| 23 | 54.405 | | 23 | 4.240 | | | | | |
| 24 | −15.211 | * | 24 | 2.803 | 15 | 1.60700 | 27.00 | L11 | |
| 25 | −18.730 | * | 25 | 0.800~9.075~9.769 | | | | | |
| 26 | 19.006 | * | 26 | 2.650 | 16 | 1.53048 | 55.72 | L12 | GR4 |
| 27 | 467.395 | * | 27 | 3.471 | | | | | |
| 28 | ∞ | | 28 | 0.500 | 17 | 1.51680 | 64.20 | CG | |
| 29 | ∞ | | | | | | | | |

TABLE 22

Example 11

| Aspherical Surface Data of Surface 10(i = 10) | | Aspherical Surface Data of Surface 25(i = 25) | |
|---|---|---|---|
| $\epsilon$ | 1.0000 | $\epsilon$ | 1.0000 |
| A4 | −0.67799158E−04 | A4 | −0.97032523E−03 |
| A6 | 0.96058817E−06 | A6 | 0.16497548E−04 |
| A8 | 0.41344081E−07 | A8 | 0.34413689E−07 |
| A10 | −0.46262692E−08 | A10 | 0.17182245E−07 |

| Aspherical Surface Data of Surface 16(i = 16) | | Aspherical Surface Data of Surface 26(i = 26) | |
|---|---|---|---|
| $\epsilon$ | 1.0000 | $\epsilon$ | 1.0000 |
| A4 | −0.12912082E−03 | A4 | −0.37757354E−04 |
| A6 | 0.91847279E−06 | A6 | 0.89018556E−05 |
| A8 | −0.72780971E−07 | A8 | −0.19277655E−05 |
| A10 | 0.30673980E−08 | A10 | 0.47192370E−07 |

| Aspherical Surface Data of Surface 24(i = 24) | | Aspherical Surface Data of Surface 27(i = 27) | |
|---|---|---|---|
| $\epsilon$ | 1.0000 | $\epsilon$ | 1.0000 |
| A4 | −0.13966519E−02 | A4 | 0.29913138E−03 |
| A6 | 0.13278370E−04 | A6 | 0.10639857E−04 |
| A8 | 0.12272916E−05 | A8 | −0.27271667E−05 |
| A10 | 0.21670247E−07 | A10 | 0.62761401E−07 |

TABLE 23

| | Conditional Formula (A) | Conditional Formula (B) | Conditional Formula (C) | Conditional Formula (E) |
|---|---|---|---|---|
| Example 1 | 0.42 | 1.29 | 0.90 | 6.60 |
| Example 2 | 0.44 | 1.33 | 0.84 | 6.60 |
| Example 3 | 0.40 | 1.13 | 0.91 | 6.60 |
| Example 4 | 0.38 | 1.17 | 0.69 | 6.60 |
| Example 5 | 0.35 | 1.26 | 0.91 | 4.73 |
| Example 6 | 0.33 | 1.22 | 0.79 | 5.65 |
| Example 7 | 0.35 | 1.24 | 0.77 | 5.65 |
| Example 8 | 0.33 | 1.14 | 0.69 | 6.59 |
| Example 9 | 0.35 | 1.14 | 0.66 | 6.60 |
| Example 10 | 0.36 | 1.29 | 0.76 | 6.60 |
| Example 11 | 0.38 | 1.26 | 0.62 | 5.65 |

TABLE 24

| | f2 | f1 | f3 | $\sqrt{(fw \times ft)}$ | ft | fw |
|---|---|---|---|---|---|---|
| Example 1 | 6.927 | 21.276 | 14.844 | 16.493 | 42.37 | 6.42 |
| Example 2 | 7.256 | 21.933 | 13.852 | 16.491 | 42.36 | 6.42 |
| Example 3 | 6.371 | 17.999 | 14.495 | 15.928 | 40.92 | 6.20 |
| Example 4 | 7.907 | 24.345 | 14.357 | 20.807 | 53.45 | 8.10 |
| Example 5 | 6.074 | 21.866 | 15.792 | 17.354 | 37.74 | 7.98 |
| Example 6 | 6.143 | 22.712 | 14.707 | 18.616 | 44.26 | 7.83 |
| Example 7 | 6.648 | 23.554 | 14.627 | 18.995 | 45.16 | 7.99 |
| Example 8 | 6.770 | 23.386 | 14.155 | 20.514 | 52.67 | 7.99 |
| Example 9 | 7.283 | 23.720 | 13.733 | 20.807 | 53.45 | 8.10 |
| Example 10 | 5.826 | 20.876 | 12.299 | 16.183 | 41.57 | 6.30 |
| Example 11 | 7.218 | 23.934 | 11.777 | 18.995 | 45.16 | 7.99 |

What is claimed is:

1. A variable-magnification optical system comprising a plurality of lens groups through which light from an object is imaged on an image sensor, the plurality of lens groups including, from an object side to an image side, at least:
  a first lens group having a positive optical power;
  a second lens group having a negative optical power; and
  a third lens group having a positive optical power,
  wherein the first lens group includes a first optical axis changing element that changes an optical axis, and
  wherein conditional formula (1) below is fulfilled:

$$0.1 < |f2/\sqrt{fw \times ft}| < 0.45 \quad (1)$$

where
  f2 represents a focal length of the second lens group;
  fw represents a focal length of the entire variable-magnification optical system at a wide-angle end; and
  ft represents a focal length of the entire variable-magnification optical system at a telephoto end.

2. A variable-magnification optical system comprising a plurality of lens groups through which light from an object is imaged on an image sensor, the plurality of lens groups including, from an object side to an image side, at least:
  a first lens group having a positive optical power;
  a second lens group having a negative optical power; and
  a third lens group having a positive optical power,
  wherein the first lens group includes a first optical axis changing element that changes an optical axis, and
  wherein conditional formula (2) below is fulfilled:

$$0.5 < f1/\sqrt{fw \times ft} < 1.4 \quad (2)$$

where
  f1 represents a focal length of the first lens group;
  fw represents a focal length of the entire variable-magnification optical system at a wide-angle end; and
  ft represents a focal length of the entire variable-magnification optical system at a telephoto end.

3. A variable-magnification optical system comprising a plurality of lens groups through which light from an object is imaged on an image sensor, the plurality of lens groups including, from an object side to an image side, at least:
  a first lens group having a positive optical power;
  a second lens group having a negative optical power; and
  a third lens group having a positive optical power,
  wherein the first lens group includes a first optical axis changing element that changes an optical axis, and
  wherein conditional formula (3) below is fulfilled:

$$0.3 < f3/\sqrt{fw \times ft} < 1.0 \quad (3)$$

where
  f3 represents a focal length of the third lens group;
  fw represents a focal length of the entire variable-magnification optical system at a wide-angle end; and
  ft represents a focal length of the entire variable-magnification optical system at a telephoto end.

4. The variable-magnification optical system of claim 1, wherein the third lens group includes a second optical axis changing element.

5. The variable-magnification optical system of claim 2, wherein the third lens group includes a second optical axis changing element.

6. The variable-magnification optical system of claim 3, wherein the third lens group includes a second optical axis changing element.

7. The variable-magnification optical system of claim 1, wherein, when the first and third lens groups move for zooming, a group-to-group distance between the first and third lens groups remains constant.

8. The variable-magnification optical system of claim 2, wherein, when the first and third lens groups move for zooming, a group-to-group distance between the first and third lens groups remains constant.

9. The variable-magnification optical system of claim 3, wherein, when the first and third lens groups move for zooming, a group-to-group distance between the first and third lens groups remains constant.

10. The variable-magnification optical system of claim 1, wherein the first and third lens groups are linked together.

11. The variable-magnification optical system of claim 2, wherein the first and third lens groups are linked together.

12. The variable-magnification optical system of claim 3, wherein the first and third lens groups are linked together.

13. The variable-magnification optical system of claim 1, wherein a fourth lens group having a positive optical power is disposed on an image side of the third lens group.

14. The variable-magnification optical system of claim 2, wherein a fourth lens group having a positive optical power is disposed on an image side of the third lens group.

15. The variable-magnification optical system of claim 3, wherein a fourth lens group having a positive optical power is disposed on an image side of the third lens group.

16. The variable-magnification optical system of claim 1, wherein conditional formula (4) below is fulfilled:

$$4.7 < ft/fw.$$

17. The variable-magnification optical system of claim 2, wherein conditional formula (4) below is fulfilled:

$$4.7 < ft/fw.$$

18. The variable-magnification optical system of claim 3, wherein conditional formula (4) below is fulfilled:

$$4.7 < ft/fw.$$

19. An image-taking apparatus comprising a variable-magnification optical system,
wherein the variable-magnification optical system comprises a plurality of lens groups through which light from an object is imaged on an image sensor, the plurality of lens groups including, from an object side to an image side, at least:
a first lens group having a positive optical power;
a second lens group having a negative optical power; and
a third lens group having a positive optical power,
wherein the first lens group includes a first optical axis changing element that changes an optical axis, and
wherein conditional formula (1) below is fulfilled:

$$0.1 < |f2/\sqrt{fw \times ft}| < 0.45 \tag{1}$$

where
f2 represents a focal length of the second lens group;
fw represents a focal length of the entire variable-magnification optical system at a wide-angle end; and
ft represents a focal length of the entire variable-magnification optical system at a telephoto end.

20. An image-taking apparatus comprising a variable-magnification optical system,
wherein the variable-magnification optical system comprises a plurality of lens groups through which light from an object is imaged on an image sensor, the plurality of lens groups including, from an object side to an image side, at least:
a first lens group having a positive optical power;
a second lens group having a negative optical power; and
a third lens group having a positive optical power,
wherein the first lens group includes a first optical axis changing element that changes an optical axis, and
wherein conditional formula (2) below is fulfilled:

$$0.5 < f1/\sqrt{fw \times ft} < 1.4 \tag{2}$$

where
f1 represents a focal length of the first lens group;
fw represents a focal length of the entire variable-magnification optical system at a wide-angle end; and
ft represents a focal length of the entire variable-magnification optical system at a telephoto end.

21. An image-taking apparatus comprising a variable-magnification optical system,
wherein the variable-magnification optical system comprises a plurality of lens groups through which light from an object is imaged on an image sensor, the plurality of lens groups including, from an object side to an image side, at least:
a first lens group having a positive optical power;
a second lens group having a negative optical power; and
a third lens group having a positive optical power,
wherein the first lens group includes a first optical axis changing element that changes an optical axis, and
wherein conditional formula (3) below is fulfilled:

$$0.3 < f3/\sqrt{fw \times ft} < 1.0 \tag{3}$$

where
f3 represents a focal length of the third lens group;
fw represents a focal length of the entire variable-magnification optical system at a wide-angle end; and
ft represents a focal length of the entire variable-magnification optical system at a telephoto end.

* * * * *